(12) United States Patent
Uno et al.

(10) Patent No.: US 6,821,707 B2
(45) Date of Patent: Nov. 23, 2004

(54) OPTICAL INFORMATION RECORDING MEDIUM, PRODUCING METHOD THEREOF AND METHOD OF RECORDING/ERASING/REPRODUCING INFORMATION

(75) Inventors: Mayumi Uno, Osaka (JP); Noboru Yamada, Osaka (JP); Katsumi Kawahara, Osaka (JP); Hiroyuki Ohta, Osaka (JP); Eiji Ohno, Osaka (JP); Ken'ichi Nagata, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/390,228

(22) Filed: Sep. 3, 1999

(65) Prior Publication Data

US 2001/0041304 A1 Nov. 15, 2001

Related U.S. Application Data

(63) Continuation-in-part of application No. 09/050,762, filed on Mar. 30, 1998, now abandoned, and a continuation-in-part of application No. 08/815,301, filed on Mar. 11, 1997, now abandoned.

(30) Foreign Application Priority Data

| Mar. 11, 1996 | (JP) | ................................................ 8-052772 |
| Jul. 5, 1996 | (JP) | ................................................ 8-176061 |
| Sep. 4, 1996 | (JP) | ................................................ 8-234016 |
| Mar. 31, 1997 | (JP) | ................................................ 9-079477 |
| Aug. 12, 1997 | (JP) | ................................................ 9-217627 |
| Jan. 23, 1998 | (JP) | ................................................ 10-011776 |

(51) Int. Cl.[7] .............................................. G11B 7/24
(52) U.S. Cl. ............... 430/270.13; 430/945; 369/275.5; 369/275.2; 428/64.6
(58) Field of Search ........................... 430/945, 270.13; 369/275.2, 275.5; 428/64.6, 64.1

(56) References Cited

U.S. PATENT DOCUMENTS

| 4,461,807 A | 7/1984 | Mori et al. ................. 430/945 |
| 4,606,018 A | 8/1986 | Sugiki et al. ................ 369/279 |
| 4,661,420 A | 4/1987 | Nakamura et al. .......... 369/288 |
| 4,670,345 A | 6/1987 | Morimoto et al. .......... 430/945 |
| 4,680,742 A | 7/1987 | Yamada et al. .............. 369/13 |
| 4,744,055 A | 5/1988 | Hannessey .................. 365/113 |
| 4,913,949 A | 4/1990 | Steininger et al. .......... 430/945 |
| 4,954,379 A | 9/1990 | Nishida et al. .............. 430/945 |
| 4,984,231 A | 1/1991 | Yasuoka et al. ............. 369/288 |
| 5,098,761 A | 3/1992 | Watanabe et al. ........... 369/288 |
| 5,108,846 A | 4/1992 | Steininger .............. 204/192.16 |
| 5,194,363 A | 3/1993 | Yoshioka et al. ........... 430/945 |
| 5,221,588 A | 6/1993 | Morimoto et al. ............ 430/19 |
| 5,283,133 A * | 2/1994 | Tsutsumi et al. .............. 369/13 |
| 5,289,453 A | 2/1994 | Ohno et al. ................. 369/100 |
| 5,294,523 A | 3/1994 | Nagata et al. .......... 430/270.13 |
| 5,395,735 A | 3/1995 | Nagata et al. .......... 430/270.13 |
| 5,418,030 A | 5/1995 | Tominaga et al. ............ 428/64 |
| 5,424,106 A | 6/1995 | Yamada et al. ............. 428/64.1 |

(List continued on next page.)

FOREIGN PATENT DOCUMENTS

| EP | 375700 | 7/1990 |
| EP | 0 499 273 | 8/1992 |
| EP | 0 588 305 | 3/1994 |
| EP | 0 594 277 | 4/1994 |
| EP | 837017 | 2/1995 |
| EP | 0 644 537 | 3/1995 |
| EP | 0 706 177 | 4/1996 |
| EP | 0 732 690 | 9/1996 |
| EP | 0 825 595 | 2/1998 |

(List continued on next page.)

OTHER PUBLICATIONS

The Merck Index, front cover, Merck Co., Inc., 1983.*

Primary Examiner—Martin Angebranndt
(74) Attorney, Agent, or Firm—Merchant & Gould P.C.

(57) ABSTRACT

The present invention provides an optical information medium having excellent weather resistance and repeating characteristics. The optical information medium has a barrier layer between a protective layer and a recording layer. The barrier layer includes GeN or GeON, and at least one element selected from the group consisting of Al, B, Ba, Bi, C, Ca, Ce, Cr, Dy, Eu, Ga, H, In, K, La, Mn, N, Nb, Ni, Pb, Pd, S, Si, Sb, Sn, Ta, Te, Ti, V, W, Yb, Zn and Zr.

42 Claims, 19 Drawing Sheets

U.S. PATENT DOCUMENTS

| | | | |
|---|---|---|---|
| 5,431,978 A | 7/1995 | Nakamura et al. | 428/646 |
| 5,442,619 A | 8/1995 | Van Uijen et al. | 369/275.2 |
| 5,448,551 A | 9/1995 | Miyagawa et al. | 369/271 |
| 5,459,019 A | 10/1995 | Kato et al. | 430/271.1 |
| 5,484,686 A * | 1/1996 | Maeda et al. | 430/270.13 |
| 5,521,901 A | 5/1996 | Okada et al. | 369/275.2 |
| 5,545,454 A | 8/1996 | Yamada et al. | 428/64.1 |
| 5,580,632 A | 12/1996 | Ohkawa et al. | 428/64.1 |
| 5,581,539 A | 12/1996 | Horie et al. | 369/275.4 |
| 5,591,501 A | 1/1997 | Ovshinsky et al. | 428/64.1 |
| 5,652,037 A | 7/1997 | Ohkawa et al. | 428/64.1 |
| 5,726,969 A | 3/1998 | Moriya et al. | 369/275.1 |
| 5,733,622 A | 3/1998 | Starcke et al. | 428/64.1 |
| 5,745,475 A | 4/1998 | Ohno et al. | 369/275.1 |
| 5,764,619 A | 6/1998 | Nishiuchi et al. | 369/275.1 |
| 5,776,574 A | 7/1998 | Honguh et al. | 428/64.1 |
| 5,787,061 A | 7/1998 | Tsuchiya et al. | 369/58 |
| 5,811,217 A | 9/1998 | Akahira et al. | 430/270.13 |
| 5,818,808 A * | 10/1998 | Takada et al. | 369/116 |
| 5,878,018 A | 3/1999 | Moriya et al. | 369/275.1 |
| 5,882,759 A | 3/1999 | Hirotsune et al. | 428/64.1 |
| 5,914,214 A * | 6/1999 | Ohta et al. | 430/270.13 |
| 5,958,649 A | 9/1999 | Hirotsune | 430/207.13 |
| 5,976,659 A | 11/1999 | Abiko | 428/64.1 |
| 6,004,646 A | 12/1999 | Ohno et al. | 428/64.1 |
| 6,096,399 A | 8/2000 | Yoshinari | 428/64.1 |
| 6,153,063 A | 11/2000 | Yamada et al. | 204/192.22 |
| 6,268,034 B1 * | 7/2001 | Kitaura et al. | 430/270.13 |
| 6,503,690 B1 * | 1/2003 | Uno et al. | 430/270.13 |

FOREIGN PATENT DOCUMENTS

| | | |
|---|---|---|
| EP | 0 849 729 | 6/1998 |
| JP | 56-145530 | 11/1981 |
| JP | 57-50330 | 3/1982 |
| JP | 61-89889 | 5/1986 |
| JP | 62-196181 | 8/1987 |
| JP | 63-50931 | 3/1988 |
| JP | 63-63153 | 3/1988 |
| JP | 63-103453 | 5/1988 |
| JP | 63-151486 | 6/1988 |
| JP | 63-171453 * | 7/1988 |
| JP | 1-211249 | 8/1989 |
| JP | 01-276453 * | 11/1989 |
| JP | 02-037548 * | 2/1990 |
| JP | 2-78041 | 3/1990 |
| JP | 02-078041 * | 3/1990 |
| JP | 2-105351 | 4/1990 |
| JP | 2-265051 | 10/1990 |
| JP | 2-265052 | 10/1990 |
| JP | 3-40244 | 2/1991 |
| JP | 3-104038 | 5/1991 |
| JP | 3-113844 | 5/1991 |
| JP | 03-248338 * | 11/1991 |
| JP | 4-52188 | 2/1992 |
| JP | 4-78032 | 3/1992 |
| JP | 04-069833 * | 3/1992 |
| JP | 4-102243 | 4/1992 |
| JP | 04-143937 | 5/1992 |
| JP | 4-219650 | 8/1992 |
| JP | 4-321948 | 11/1992 |
| JP | 5-2769 | 1/1993 |
| JP | 5-62193 | 3/1993 |
| JP | 5-159360 | 6/1993 |
| JP | 5-217211 | 8/1993 |
| JP | 05-274726 * | 10/1993 |
| JP | 5-282705 | 10/1993 |
| JP | 5-290408 | 11/1993 |
| JP | 5-298747 | 11/1993 |
| JP | 5-298748 | 11/1993 |
| JP | 5-325261 | 12/1993 |
| JP | 06195747 | 7/1994 |
| JP | 6-195747 | 7/1994 |
| JP | 7-21583 | 1/1995 |
| JP | 7-105574 | 4/1995 |
| JP | 07326073 | 12/1995 |
| JP | 8-85261 | 4/1996 |
| JP | 8-190734 | 7/1996 |
| JP | 8-329528 | 12/1996 |
| JP | 8-329529 | 12/1996 |
| JP | 10-49916 | 2/1998 |
| WO | WO 96/00441 | 1/1996 |
| WO | WO 97/34298 | 9/1997 |

* cited by examiner

A1(Ge100)

B1(Ge90N10) B2(Ge89.7N9.8O0.5) B3(Ge86.6N6.7O6.7) B4(Ge83.4N3.3O13.3) B5(Ge80O20)

C1(Ge65N35) C2(Ge64.4N33.8O1.8) C3(Ge58.8N20.6O20.6) C4(Ge53.9N9.2O36.9) C5(Ge50O50)

D1(Ge60N40) D2(Ge59.5N38.5O2.0) D3(Ge53.8N23.1O23.1) D4(Ge48.8N10.2O41.0) D5(Ge45O55)

E1(Ge50N50) E2(Ge49.6N47.9O2.5) E3(Ge45.4N27.3O27.3) E4(Ge42.3N11.5O46.2) E5(Ge40O60)

F1(Ge42.9N57.1) F2(Ge42.4N54.7O2.9) F3(Ge38.4N30.8O30.8) F4(Ge35.5N12.9O51.6) F5(Ge33.3O66.7)

G1(Ge35N65) G2(Ge34.8N62.0O3.2) G3(Ge32.6N33.7O33.7) G4(Ge31.1N13.8O55.1) G5(Ge30O70)

H2(N95O5) H3(N50O50) H4(N20O80)

OPTICAL INFORMATION RECORDING MEDIUM, PRODUCING METHOD THEREOF AND METHOD OF RECORDING/ERASING/REPRODUCING INFORMATION

This application is a Continuation-in-Part of Application Ser. No. 09/050,762 filed Mar. 30, 1998, now abandoned, and a Continuation-in-Part of application Ser. No. 08/815,301 filed Mar. 11, 1997 now abandoned.

BACKGROUND OF THE INVENTION

1. Field of the Invention

The present invention relates to an optical information recording medium provided with an optically detectable information recording layer, the producing method thereof and a method of recording/erasing/reproducing information.

2. Description of the Prior Art

A recording material thin film layer comprising a metal thin film and an organic thin film is formed on a disc-shaped or a card-shaped substrate. A high energy beam focused on a micro light spot having a submicron order diameter is irradiated onto the recording material layer, thereby a local variation is generated on recording material layer. Thereby, such a technique so that an information signal is stored is already well known. More specifically, when an optical magnetic material thin film and a phase change material thin film are used for a recording layer, it is easy to rewrite the signal. Accordingly, this technique has been actively studied and developed. For example, in case of the optical magnetic recording medium, a difference of a rotating angle on a polarized surface of a reflected light generated due to the difference of a magnetization state is used as the record. Furthermore, in case of the phase change recording medium, an amount of a reflected light relative to a light having a specific wavelength in a crystalline state is different from that in an amorphous state, thereby the difference is used as the record. A laser output is modulated between a record level having a relatively higher power and an erasure level having a relatively lower power, and the modulated output is only irradiated on a recording medium. Thereby similarly to a magnetic disk, there is such a characteristic that the record erasure and the record of a new signal can be simultaneously performed (it is possible to overwrite the record). The information signal can be rewritten for a short time.

Usually, the optical magnetic recording medium and the phase change recording medium comprise, for example, a multi-layer film shown in FIG. 1. That is, on a substrate 1 comprising a resin plate of a polycarbonate and PMMA (polymethyl-methacrylate), a glass plate, or the like, usually, a recording layer 3 having an optical absorption comprising the phase change material and the optical magnetic material inserted between protective layers 2 and 4 comprising a dielectric material is formed. Furthermore, a metallic reflecting layer 5 comprising an alloy of Au and Al for increasing an optical absorption efficiency on the recording layer 3 and for acting as a thermal diffusion layer is formed on the protective layer 4. These layers are sequentially laminated by a sputtering method, a vacuum deposition method, or the like. Furthermore, an overcoat layer 6 is formed on an uppermost layer in such a manner that a scratch and dusts are not attached to these layers. Usually, a laser beam is incident from a side of the substrate 1. In many cases, a front surface of the substrate 1 is provided with a concave-convex groove track or a concave-convex pit sequence as guide means for guiding the laser beam to a predetermined position on the disk.

A function of each layer and a concrete example of materials forming each layer are as follows.

In case of the recording layer 3, when the phase change material is used, chalcogenite thin film whose base comprises Te and Se, for example, a Ge—Sb—Te alloy thin film, a Ge—Sb—Te—Se alloy thin film, an In—Sb—Te alloy thin film, an Ag—In—Sb—Te alloy thin film, an In—Se alloy thin film, and the like are reported. In the medium using such phase change materials, the laser beam is irradiated, thereby the signal is recorded and reproduced. As already described, while the power of the laser beam is being modulated at a strong level and a weak level, the laser beam is irradiated onto a revolving recording medium. A portion irradiated with the strong power is locally melt in an instant, thenceforth, the portion is quenched. Thereby the portion is amorphized, and the signal is recorded. Furthermore, at the portion irradiated with a relatively weak power, the amorphous-state portion is annealed, thereby the portion is crystallized, and the recorded signal is erased. In order to reproduce the signal, the power of the laser beam is reduced enough in such a manner that the recording film is not changed, and the laser beam is irradiated. At this time, a strength of the reflected light is detected, and whether the portion irradiated with the laser beam is in the crystalline state or the amorphous state is judged, thereby the signal is reproduced.

The functions of the protective layers 2 and 4 comprising a dielectric material are, for example, as follows:

1) the recording layer is protected from an external mechanical damage;
2) a thermal damage such as a roughness on the surface of the substrate, a break of the recording layer and an evaporation, etc. occurred due to repeatedly rewriting the signal are reduced, thereby a repetition of rewriting the signal can be increased;
3) an interference effect of a multipath reflection is used so that an optical change can be enhanced;
4) an influence from an outside air is intercepted so that a chemical change can be prevented.

As the material comprising the protective layer for satisfying the above objects, heretofore, an oxide such as $SiO_2$, $Al_2O_3$ or the like, a nitride such as $Si_3N_4$, AlN or the like, an acid nitride such as Si—O—N or the like (for example, disclosed in Japanese Patent Application Laid-open No. 3-104038), a sulfide such as ZnS or the like, a carbide such as SiC or the like, or a mixed material such as ZnS—$SiO_2$ or the like (disclosed in Japanese Patent Application Laid-open No. 63-103453) is proposed, and one part of them is practically used.

Two layers are provided to the protective layer, thereby the characteristic thereof can be enhanced. The example of the phase change recording medium is disclosed in Japanese Patent Application Laid-open No. 5-217211. That is, the dielectric layer comprising the nitride (SiN, AlN) and the carbide (SiC) is used at the side contacted to the optical recording layer as the protective layer of the optical recording layer including Ag, and ZnS or a compound including ZnS is used as the outer layer of the dielectric layer. The above SiN, SiC, AlN layer is used, thereby a combination of Ag included in the recording layer and S in the protective layer is prevented. As disclosed in Japanese Patent Application Laid-open No. 5-217211, a film thickness of the SiN, AMN, SiC layer is ranging from 5 nm to 50 nm. Furthermore, as disclosed in Japanese Patent Application Laid-open No. 6-195747, the protective layer has two layers inserted between the recording layer and the substrate, where one layer contacted to the recording layer comprises $Si_3N_4$ layer and the other layer contacted to the substrate comprises $ZnS-SiO_2$ layer, thereby two dielectric layers are formed. The $Si_3N_4$ layer facilitates a crystallization of the phase change material layer.

The example of the optical magnetic recording medium is disclosed in Japanese Patent Application Laid-open No. 4-219650. Here, the dielectric layer contacted to the substrate has two layers, and one layer contacted to the substrate is a silicon oxide film, thereby an addhesiveness of the substrate and the dielectric layer is enhanced. Furthermore, the other layer contacted to the recording layer comprises the compound of the carbide and the nitride, thereby it is possible to prevent a corrosion of the magnetic recording layer occurred due to that oxygen from the silicon oxide layer and water passing through the substrate are penetrated into the recording layer. As disclosed in Japanese Patent Application Laid-open No. 4-219650, preferably, the nitride comprises Sn—N, In—N, Zr—N, Cr—N, Al—N, Si—N, Ta—N, V—N, Nb—N, Mo—N and W—N, and the film thickness thereof is ranging from 10 nm to 20 nm. Furthermore, as disclosed in Japanese Patent Application Laid-open No. 4-321948, in the same view of Japanese Patent Application Laid-open No. 4-219650, the dielectric layer contacted to the substrate has two layers. Here, one layer near the substrate comprises at least one kind of oxides selected from a group of Si, Zr, Y, Mg, Ti, Ta, Ca and Al, thereby the adhesiveness of the dielectric layer and the substrate is enhanced. Furthermore, the other layer contacted to the optical magnetic recording film comprises the nitride layer comprising at least one kind of nitrides selected from the group of Si, Zr, Y, Mg, Ti, Ta, Ca and Al, thereby it is suppressed that oxygen and water from the oxide layer are penetrated and diffused into the recording film layer. As disclosed in Japanese Patent Application Laid-open No. 4-321948, the film thickness of the nitride layer is ranging from 50 nm to 200 nm.

It is known that the protective layer is formed of a complex material comprising different substances so as to provide the film with good quality. For example, Japanese Laid-Open Patent Publication (Tokkai-Sho) No. 63-50931 discloses an example including a protective layer with good quality such as excellent adhesiveness with a substrate by adding at least either one of aluminum oxide and silicon oxide to a complex dielectric of aluminum nitride and silicon nitride and by defining the refractive index.

Japanese Laid-Open Patent Publication (Tokkai-Hei) No.2-105351 discloses an example including a protective layer having excellent adhesiveness with a substrate and excellent ductility formed of a complex dielectric comprising a nitride of silicon and indium.

Furthermore, Japanese Laid-Open Patent Publication (Tokkai-Hei) Nos. 2-265051, 2-265052 disclose examples including a protective layer formed of Si, N and an element having a smaller specific electric resistance than Si, so that the protective layer is hardly cracked and protects the recording layer sufficiently.

In general, the reflecting layer 5 comprises a metal such as Au, Al, Cr, Ni, Ag or the like and the alloy based upon these metals, and the reflecting layer 5 is disposed in such a manner that a radiation effect and an effective optical absorption of the recording thin film can be obtained.

As described above, in general, a sputtering method, a vacuum deposition method or the like is used as the method of preparing the recording medium. Furthermore, a reactive sputtering method is used so that the nitride can be contained in the thin film.

For example, as the method of producing an ablation type write once medium, such a method that N is contained in the Te-containing recording layer by the reactive sputtering is disclosed in Japanese Patent Application Laid-open No. 63-151486. As disclosed in Japanese Patent Application Laid-open No. 63-151486, a mixed gas of Ar and nitride is discharged relative to a telluric selenium alloy target. After the recording film containing tellurium, selenium and nitride on the substrate is formed by the reactive sputtering method, a nitrogen gas is introduced, and a nitrogen plasma is generated, thereby a surface layer having a high nitrogen density than an inside of the recording layer is formed. The surface of the recording film is nitrided, thereby a weatherproofness and a sensitivity are enhanced, and further a power tolerance is increased. The nitrogen density of the nitride layer is ranging from 2% to 10%, preferably, it is ranging from 2% to 20%. Preferably, the thickness of the surface layer is ranging about from 1 nm to 10 nm.

Furthermore, the example of the ablation type recording material is also disclosed in Japanese Patent Application Laid-open No.63-63153. The target comprising a material containing Te and Se is sputtered in a nitriding-oxide gas, a nitric dioxide gas or a gas containing a nitric dioxide, thereby the layer containing Te, Se and N is formed in the recording layer.

Furthermore, as disclosed in Japanese Patent Application Laid-open No. 4-78032, the surface of a metallic target is sputtered by Ar gas, and on the surface of the metallic element substrate is reacted with oxygen gas or nitrogen gas, thereby a metallic oxide film or a metallic nitride film is formed.

Furthermore, although omitted in the drawings, in order that an oxidization of the optical information recording medium or an attachment of dusts, etc. is prevented, such a structure that the overcoat layer is placed on the metallic reflecting layer 5, such a structure that an ultraviolet curing resin is used as an adhesive so that a dummy substrate is laminated, or the like is proposed.

However, it is known that the phase change optical recording medium has the following problems. That is, when the thin film comprising a material whose base is Te, Se, etc. containing Ge, Sb, In, etc. is used as the recording layer, and further the thin film comprising an oxide system material including such as $SiO_2$ representatively, the thin film comprising a sulfide system material including such as ZnS representatively, or the thin film comprising a mixture system material including $ZnS-SiO_2$ between the above two thin films is used as the protective layer, a laser irradiation is carried out. Thereby, the record and erasure of the information signal, and the like are repeated, thereby optical characteristics of the recording layer and the protective layer (such as a reflectivity, an absorptivity and the like) are changed. Accordingly, such a phenomenon that a recording characteristic or an erasure characteristic is changed. That is, the signal is repeatedly rewritten, thereby the reflectance of the medium is reduced, an amplitude of the signal is gradually reduced, or a jitter value at a marked position of a recording mark becomes larger, thereby an error rate of the recording signal becomes higher. Therefore, when the signal is reproduced, a readout error is occurred. Accordingly, there is such a problem that a possible times of rewriting is limited.

Principal causes of this change are as follows. That is, one cause is that an S component and an O component are diffuse and penetrate from the protective layer to the recording layer, on the contrary, the component such as Te, Se, etc. having a relatively high vapor pressure among the components of which the recording layer consists of diffuse from the recording layer to the protective layer. Furthermore, another cause is that one part of the protective layer material is chemically reacted with the recording layer. It is considered that the change is occurred due to either of the above causes, or a combination of the above causes.

In fact, according to an experiment by inventors, etc., in the optical disk applying a Ge—Sb—Te recording film and a ZnS—$SiO_2$ protective layer, the S component is discharged from the protective layer due to the laser irradiation. Consequently, it is observed that an S atom is penetrated from the protective layer to the recording layer. Furthermore, it is also observed that the other Zn atom, Si atom and O atom are also diffused to the recording layer. In this case, although it is assumed that other elements are easy to move by a separation of the S atom, the mechanism thereof is not clear.

The phenomenon and the mechanism have not been clearly reported. In case that the nitride thin film including $Si_3N_4$ and AlN is used as the protective layer, the S component is not discharged, differently from the above example. On the other hand, an adherence to the recording layer of such a nitride is lower than that of ZnS—$SiO_2$ film. For example, under an environment having a high temperature and a high humidity, there is another problem that a peeling is occurred. That is, when oxide such as $SiO_2$, $Ta_2O_5$, $Al_2O_3$ and the like and nitride such as $Sl_3N_4$ AlN and the like are used as a dielectric material, since such a dielectric, material is less adhesive to a phase change type recording material, for example, under the high-temperature and high-humidity environment, the peeling and crack are occurred. Thereby, there is further problem that oxide such as $SiO_2$, $Ta_2O_5$, $Al_2O_3$ and the like and nitride such as $Si_3N_4$, AlN and the like cannot be applied to a dielectric layer material.

A deterioration mechanism is summarized. In the first place, the more the times of repeating is increased, the more the above atom diffusion and chemical reaction are proceeded. Consequently, a composition in the recording layer is largely varied, thereby variations of the reflectance, the absorption and the like, and the variation of the recording characteristic (an amorphization sensitivity) and the erasure characteristic (a crystallization sensitivity and a crystallization rate) are actualized. It is supposed that in the protective layer, accompanied by the change of the optical characteristic, the composition changed, thereby such a change that a mechanical strength is reduced occurs. It can be considered a ZnS—$SiO_2$ film widely applied as an excellent protective layer has a high adhesiveness between the protective layer and the recording layer and this results from the atomic diffusion. Furthermore, it is also considered that such a protective layer substantially contains a limit of the repeating times.

Relating to a material containing Ag and S, that is, the elements which are easy to chemically react, the method of suppressing the reaction is disclosed in Japanese Patent Application Laid-open No. 5-217211. However, the following view is not disclosed in the above prior art. That is, relative to the phase change recording medium such as Ge—Sb—Te system, In—Sb—Te system and the like being developed for an application as the most possible material system, in order to enhance the cycle performance thereof, the layer comprising the material such as nitride, nitriding-oxide, etc. is formed between a dielectric protective layer and a phase change recording layer. The formed layer acts as a barrier layer for preventing an interdiffusion and the chemical reaction between the recording layer and the protective layer. Furthermore, more specifically, Ge—N or Ge—N—O is superior as the dielectric protective layer material which does not substantially have the above problem. This material has also an excellent performance as the barrier layer. This is not also disclosed in the prior art.

SUMMARY OF THE INVENTION

That is, a layer structure for realizing an excellent repeating characteristic and an excellent weather-proofness is not yet achieved. In order to solve the above problems, it is an object of the present invention to provide a medium structure for realizing a phase change optical recording medium having the excellent repeating characteristic and weather-proofness, the producing method thereof, and a method of recording and reproducing an information signal by using the recording medium.

In order to solve above problems, according to one aspect of the present invention, there is provided an optical information recording medium comprising a recording layer generating a reversible phase change which can be optically detected according to an irradiation of an energy beam, and a material layer which is named a barrier layer formed in contact with at least one surface of the recording layer, wherein an atomic diffusion and a chemical reaction occurred between the protective layer and the recording layer are suppressed by the barrier layer.

A material constituting the barrier layer (a barrier material) itself can be applied to a protective layer material as it is. In this case, it is expressed as "the protective layer using the barrier material".

According to another aspect of the present invention, preferably, there is provided an optical information recording medium, wherein a barrier material layer is disposed at both sides of a recording layer.

According to a structure in which the barrier material is applied to a substrate side of the recording layer, an effect for suppressing the atomic diffusion and the chemical reaction between the recording layer and the protective layer is higher, thereby a cycle performance is enhanced. According to the structure in which the barrier material is applied to the side opposite to the substrate of the recording layer, the effect for enhancing a stability of rewrite performance is higher, thereby a reliability is enhanced. Not only the structure in which the barrier material is applied to both sides of the recording layer combines both characteristics, but also both performances are further enhanced.

According to further aspect of the present invention, preferably, there is provided an optical information recording medium, wherein when the barrier material is represented by $M_aX_b$ (where, M denotes an aggregate of non-gas elements $M_1$, $M_2$, . . . , and X denotes the aggregate of gas elements $X_1$, $X_2$, . . . ), regarding a ratio of a gas component b/(a+b), the ratio of the barrier material layer at the substrate side is relatively higher than that of the barrier material layer at the side opposite to the substrate.

According to further aspect of the present invention, preferably, there is provided an optical information recording medium further comprising a metallic reflecting layer.

According to further aspect of the present invention, preferably, there is provided an optical information recording medium, wherein the protective layer using the barrier material" having a thin thickness of 60 nm or less is applied between the metallic reflecting layer and the recording layer for a quenching. Thereby, since the number of layers can be reduced, a preparing process can be simplified. Furthermore, since a cooling effect is enhanced, thereby a thermal interference between recording marks is reduced, an information signal can be densely recorded. That is, the structure is advantageous to a high density recording. More preferably, in this case, the barrier layer is also applied to the substrate side of the recording layer. Thereby, it is possible to obtain the medium which can realize a higher cycle performance and a higher density recording.

According to further aspect of the present invention, preferably, there is provided an optical information recording medium, wherein "the structure (a rather slow cooling structure) necessary for a dielectric layer having a thickness of 80 nm or more between the metallic reflecting layer and the recording layer, the barrier layer is applied to at least one side of the recording layer. Thereby, usually, in the rather slow cooling structure having a tendency of high heat-storing effect and a large thermal damage, the cycle performance can be largely enhanced.

According to further aspect of the present invention, there is provided an optical information recording medium, wherein the thickness of the barrier layer is at least more than 1 nm to 2 nm. Thereby, the above effect can be obtained. Preferably, the thickness is 5 nm or more. Thereby, even if a laser power used for recording is higher, the effect can be obtained. Thereby, a further effect can be obtained. Furthermore, more preferably, the thickness is 20 nm or more. Thereby, a higher reproducibility can be obtained in preparing.

According to further aspect of the present invention, there is provided an optical information recording medium, wherein the barrier material layer containing Ge—N or Ge—N—O is used as the barrier material.

According to further aspect of the present invention, preferably there is provided an optical information recording medium, wherein when Ge—N or Ge—N—O material layer is applied at both sides of the recording layer as the barrier layer or the protective layer, regarding a density of a gas element in Ge—N or Ge—N—O layer, that is, (N+O)/(Ge+N+O), the density in Ge—N or Ge—N—O layer at the substrate side of the recording layer is relatively larger than that in Ge—N or Ge—N—O layer at the side opposite to the substrate of the recording layer.

According to further aspect of the resent invention, preferably there is provided an optical information recording medium, wherein Ge—N composition region having a Ge density ranging from 35% to 90% is selected. More preferably, the range from 35% to 65% is selected.

According to further aspect of the present invention, preferably there is provided an optical information recording medium, wherein in case that the a Ge—N layer is applied to the substrate side of the recording layer (at the side which a laser beam is incident on), the Ge density ranging from 35% to 60% is selected. In case that the Ge—N layer is applied to the side opposite to the substrate of the recording layer, the Ge density ranging from 42.9% to 90% (preferably, 42.9% to 65%) is selected.

According to further aspect of the present invention, preferably there is provided an optical information recording medium, wherein in a triangular diagram in FIG. 5 showing three-element composition of Ge—N—O, Ge—N—O composition region is within a range surrounded by four composition points, B1($Ge_{90.0}N_{10.0}$), B4($Ge_{83.4}N_{3.30}\ O_{13.3}$), G4($Ge_{31.1}\ N_{13.8}\ O_{55.1}$), G1($Ge_{0.35}\ N_{0.65}$). In this region, there are such effects that the cycle performance is enhanced and an erasure performance is enhanced.

According to further aspect of the present invention, preferably there is provided an optical information recording medium, wherein in case that the Ge—N—O layer is applied to the substrate side of the recording layer (at the side which the laser beam is incident on), the region surrounded by four composition points D1($Ge_{60.0}\ N_{40.0}$), D4 ($Ge_{48.8}\ N_{10.2}\ O_{41.0}$), G1 ($Ge_{35.0}\ N_{65.0}$), G4($Ge_{31.1}\ N_{13.8}\ O_{55.1}$) is appropriate. In case that the Ge—N—O layer is applied to the side opposite to the substrate of the recording layer, the region surrounded by four composition points B1 ($Ge_{65.0}\ N_{35.0}$), B4 ($Ge_{54.3}\ N_{9.1}\ O_{36.6}$), F1 ($Ge_{42.9}\ N_{57.1}$), F4 ($Ge_{35.5}\ N_{12.9}\ O_{51.6}$) is appropriate. In this case, preferably, the region surrounded by four composition points C1 ($Ge_{65.0}\ N_{35.0}$), C4 ($Ge_{53.0}\ N_{9.2}\ O_{36.9}$), F1 ($Ge_{42.9}\ N_{57.1}$), F4 ($Ge_{35.5}\ N_{12.9}\ O_{51.6}$) is appropriate.

Similarly to the case of the Ge—N layer, when the Ge—N—O layer is formed at the side opposite to the substrate of the recording layer (at the side which the laser beam is not incident on), in a process of recording and erasing, there is less possibility that a Ge atom is included in the recording layer. The layer can be also applied to the composition region having a considerably high Ge density. On the contrary, when the Ge—N—O layer is formed at the substrate side of the recording layer (at the side which the laser beam is incident on), there is more possibility that the Ge atom is included in the recording layer. It is not preferable that the layer is applied to the composition region having a considerably high Ge density.

As described above, the Ge—N layer or the Ge—N—O layer is acted in such a manner that the atomic interdiffusion and chemical reaction generated between the recording layer and the protective layer usually comprising a dielectric material are suppressed. There is such an advantage that the Ge—N layer or the Ge—N—O layer has a higher adhesiveness to the recording layer, compared to other nitride films such as $Si_3N_4$, AlN, etc. and a carbide film such as SiC, etc. The reason that the Ge—N layer or the Ge—N—O layer has a higher adhesiveness is as follows. Compared to other nitride films such as $Si_3N_4$, AlN, etc., the Ge—N layer or the Ge—N—O layer enables to form the film with a relatively lower power at a high speed (for example, when a distance between a target and the substrate is 200 mm, if the target whose diameter is 100 mm is used, the film can be formed with 500 W at 40 nm to 50 nm/minute). Accordingly, it is assumed that since an internal stress in the film is lower, the Ge—N layer or the Ge—N—O layer has a higher adhesiveness. However, this is not clear.

According to further aspect of the present invention, preferably there is provided an optical information recording medium, wherein a complex refractive index value n+ik applies the Ge—N or Ge—N—O layer satisfying the range of $1.7 \leq n \leq 3.8$ and $0 \leq k \leq 0.8$. More preferably, when the barrier material layer is formed at the substrate side of the recording layer, the Ge—N or Ge—N—O layer satisfying the range of $1.7 \leq n \leq 2.8$ and $0 \leq k \leq 0.3$ is applied. When the barrier material layer is formed at the side opposite to the substrate, the Ge—N or Ge—N—O layer satisfying the range of $1.7 \leq n \leq 3.8$ and $0 \leq k \leq 0.8$ is applied. An optical constant is changed according to a ratio of O to N in the film, when O is less, the optical constant becomes larger. When O is more, the optical constant becomes smaller.

According to further aspect of the present invention, preferably there is provided an optical information recording medium, wherein a material thin film whose main component is Ge—Sb—Te is used as the recording layer.

According to further aspect of the present invention, preferably there is provided an optical information recording medium, wherein the material thin film whose main component is ZnS—SiO$_2$ is used as a dielectric protective layer material used together with the barrier layer.

According to further aspect of the present invention, preferably there is provided an optical information recording medium, wherein a material layer containing a main component comprising a nitride or a nitriding-oxide having at least one kind of element selected from the elements constituting the recording layer is used as the barrier material layer.

In general, although a nitride material is less adhesive to a chalcogenite material, the barrier layer containing a nitride or nitriding-oxide of the element included in the recording layer is used, thereby the elements in the barrier layer is common to the component element in the recording layer. Accordingly, the adhesiveness can be enhanced. In this case, it is possible to suppress the interdiffusion and the chemical reaction between the recording layer and the protective layer whose main component is the dielectric material. Thereby, the phase change optical recording medium having the excellent repeating performance and excellent weather-proofness can be realized.

According to further aspect of the present invention, preferably there is provided an optical information recording medium, wherein at least one surface of the recording layer is nitrided or nitric-oxidized, thereby the barrier layer is formed.

In this case, since the recording layer and the nitride layer or the nitric-layer have the films having a high continuity to each other, there is less problem relating to the adhesiveness. Accordingly, the optical information recording medium having the excellent repeating performance and the excellent weather-proofness can be obtained.

According to further aspect of the present invention, a method of preparing an optical information recording medium for solving the above problems, comprising a vacuum deposition method, a DC sputtering method, a magnetron sputtering method, a laser sputtering method, an ion plating method, a CVD method and the like.

According to further aspect of the present invention, a method of preparing an optical information recording medium, preferably, wherein a sputtering method is used, a single target comprising the main component M of the barrier material, a nitride target comprising M, a nitric-oxide target, or an oxide target is used in order that the barrier material layer is formed, so that a reactive sputtering is carried out in a mixed gas of a rare gas and the gas containing a nitride component or the mixed gas of the gas containing the rare gas and the nitride component and the gas containing an oxide component, thereby the barrier material layer is formed.

According to further aspect of the present invention, a method of preparing an optical information recording medium, preferably, wherein Ar and Kr are used as the rare gas.

According to further aspect of the present invention, a method of preparing an optical information recording medium, preferably, wherein N$_2$ is used as the gas containing the nitride component, and O$_2$ is used as the gas containing the oxide component.

When the barrier material layer is formed at either sides of the recording layer, an N$_2$ density in case that the barrier material layer is formed at the side opposite to the substrate of the recording layer is highly set than that in case that the barrier material layer is formed at the substrate side of the recording layer. Thereby, the structure having a further higher weather-proofness can be obtained.

According to further aspect of the present invention, a method of preparing an optical information recording medium, preferably, wherein Ge is used as the main component M of the barrier material, a Ge target, a Ge—N target, a Ge—N—O target or a Ge—O target is used so that the reactive sputtering is carried out, thereby the barrier material layer is formed. More preferably, a Ge$_3$N$_4$ composition is used as the Ge—N target, a GeO composition is used as the Ge—O target, and Ge$_3$N$_4$—GeO mixed target is used as the Ge—O—N target. According to further aspect of the present invention, a method of preparing an optical information recording medium, more preferably, wherein Ge is used as the main component M of the barrier material, when the reactive sputtering is carried out, a total pressure of a sputter gas is more than 1 mTorr, and it is 50 mTorr or less. Within this range, a high sputter rate and a stable discharge can be obtained.

According to further aspect of the present invention, a method of preparing an optical information recording medium, preferably, wherein Ge is used as the main component M of the barrier material, when the reactive sputtering is carried out, the sputter gas is the mixed gas containing at least Ar and N$_2$, a partial pressure ratio of N$_2$ is ranging from 5% to 60%. Thereby, a better repeating performance and a better weather-proofness can be obtained. In this case, when the barrier layer is used at the substrate side of the recording layer, the partial pressure ratio of N$_2$ is ranging from 12% to 60% (preferably, 50% or less). Furthermore, when the barrier layer is used at the side opposite to the substrate, the partial pressure ratio of N$_2$ is ranging from 5% to 60% (preferably, 40% or less, more preferably, 33% or less).

Regarding the repeating performance, when a nitride partial pressure in the sputter gas is low, since much surplus Ge not combined to a nitrogen exists in the protective layer, the composition in the recording film is changed, accompanied with rewriting the signal, thereby a better characteristic cannot be obtained. Furthermore, when the nitrogen partial pressure in the sputter gas gets too high, much surplus nitrogen exists in the film, thereby similarly to the above case, the better repeating characteristic cannot be obtained.

Regarding the weather-proofness (adhesiveness), when the nitrogen partial pressure in the sputter gas is high and much surplus nitrogen exists in the film, after an acceleration test, a peeling is occurred. However, when the nitrogen partial pressure is low and the surplus Ge not combined to the nitrogen exists, the peeling is not occurred. It is assumed that since Ge contributes to a combination with the recording film, the peeling is not occurred.

According to further aspect of the present invention, a method of preparing an optical information recording medium, preferably, wherein Ge is used as the main component M of the barrier material, when the reactive sputtering is carried out, the sputter gas is the mixed gas containing at least Ar and N$_2$ a sputter power density is more than 1.27 W/cm$^2$, and a film forming rate is 18 nm/minute or more.

According to further aspect of the present invention, a method of preparing an optical information recording medium, preferably, wherein Ge is used as the main component M of the barrier material, when the reactive sputtering is carried out, the sputter gas is the mixed gas containing at least Ar and N$_2$ the film is formed in such a manner that the complex refractive index value n+ik may satisfy the range $1.7 \leq n \leq 3.8$, $0 \leq k \leq 0.8$. More specifically, when the barrier material layer is formed at the substrate side of the recording layer, such a film forming condition as to satisfy the range 1.7≦n≦2.8, 0≦k≦0.3 is selected. When the barrier material layer is formed at the side opposite to the substrate, such a film forming condition as to satisfy the range 1.7≦n≦3.8, 0≦k≦0.8 is selected.

According to further aspect of the present invention, a method of preparing an optical information recording medium, preferably, wherein at least one element among the materials constituting the recording layer is used as the main component of the barrier material layer, its single element target, its nitride target, its nitriding-oxide target or its oxide target is used, so that the reactive sputtering is carried out in the mixed gas of the rare gas and the gas containing the nitrogen component or the mixed gas of the rare gas and the gas containing the nitrogen component and the gas containing the oxygen component, thereby the film is formed.

According to further aspect of the present invention, a method of preparing an optical information recording medium, preferably, wherein the material itself constituting the recording layer is used as it is as the main component of the barrier material layer, the target for forming the recording layer, its nitride target, its nitriding-oxide target, or its oxide target is used, so that the reactive sputtering is carried out the mixed gas of the rare gas and the gas containing the nitrogen component or in the mixed gas of the rare gas, the gas containing the nitrogen component and the gas containing the oxygen component, thereby the film is formed.

According to further aspect of the present invention, a method of preparing an optical information recording medium, preferably, wherein the material itself constituting the recording layer is used as it is as the main component of the barrier material layer, in at least either a recording layer formation start time or a recording layer formation completion time, either a process of forming the recording layer in which the density of the gas containing the nitride component in the sputter gas is enhanced, or a process of forming the recording layer in which the densities of the gas containing the nitride component and the gas containing the oxide component are enhanced is used, thereby the recording layer formation can be achieved.

According to the above processes, a supply of the gas constituting the nitride component and the oxide component may be stopped when a recording layer portion is formed in the recording layer formation process.

An optical information recording medium of one embodiment in the present invention includes a barrier layer, a first protective layer, and a recording layer generating a reversible phase-change which can be optically detected according to an irradiation of an energy beam. The barrier layer is formed between the first protective layer and the recording layer and in contact with the first protective layer and the recording layer. The barrier layer includes either one selected from the group consisting of GeN and GeNO, and at least one element selected from the group consisting of Al, B, Ba, Bi, C, Ca, Ce, Cr, Dy, Eu, Ga, H, In, K, La, Mn, N, Nb, Ni, Pb, Pd, S, Si, Sb, Sn, Ta, Te, Ti, V, W, Yb, Zn and Zr.

In an optical information recording medium of another embodiment in the present invention, the barrier layer is formed between the first protective layer and the recording layer and in contact with the first protective layer and the recording layer. The barrier layer is composed of a barrier material having a non-stoichiometric composition.

An optical information recording medium of one embodiment in the present invention includes a recording layer having reversibly changeable optical characteristics and a Ge-containing layer comprising either one selected from the group consisting of GeXN and GeXON as a main component, where X is at least one element selected from the group consisting of elements belonging to Groups IIIa, IVa, Va, VIa, VIIa, VIII, Ib and IIb and C. This makes it possible to provide a medium having excellent weather resistance and excellent characteristics in repetitive recording.

According to another aspect of the present invention, a method for producing an optical information recording medium includes the steps of: forming a recording layer having reversibly changeable optical characteristics, and forming a Ge-containing layer comprising either one selected from the group consisting of GeXN and GeXON as a main component, where X is an element as described above. The Ge-containing layer is produced by reactive sputtering with a target including at least Ge and X in a mixed gas comprising a rare gas and nitrogen. This makes it possible to produce efficiently an optical information recording medium having excellent weather resistance and excellent characteristics in repetitive recording.

These and other advantages of the present invention will become apparent to those skilled in the art upon reading and understanding the following detailed description with reference to the accompanying figures.

DETAILED DESCRIPTION OF THE PREFERRED EMBODIMENTS

Figure 2:
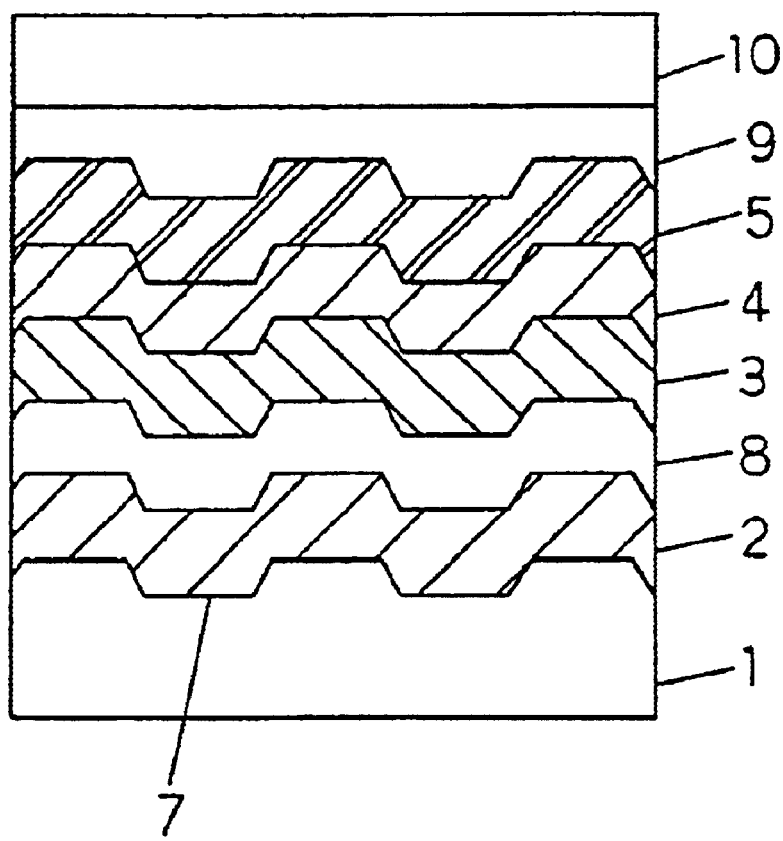
FIG. 2 is a cross-sectional view showing an structure example of an optical information recording medium according to the present invention.

An embodiment of an optical information recording medium according to the present invention is shown in FIG. 2. FIG. 2 shows the embodiment in case that a barrier layer is used at a substrate side of a recording layer.

According to the embodiment, a substrate 1 is a disc-shaped polycarbonate resin substrate having a thickness of 0.6 mm and a diameter of 120 mm. Since a polycarbonate has such merits as a low humidity, a low cost and the like, the polycarbonate is superior as a material used for the substrate. Aside from the polycarbonate resin, a glass, an acrylic resin, a polyolefin resin, a vinyl chloride and the like can be also used. Although a metal can be also used, the medium must be designed in such a manner that a light is incident from the side where a film is formed. Any way, a kind of the substrate is not limited to the present invention.

A surface of the substrate is optically sufficiently flat. Furthermore, a spiral-shaped concave-convex groove track 7, for example, having a depth of 70 nm, a groove portion width of 0.74 $\mu$m and a land portion width of 0.74 $\mu$m is formed all over the surface where a multi-layer film is formed. The concave-convex shape of the groove is operated as a guide, thereby a laser beam for recording and reproducing an information signal can be moved to an optional position. As a method of guiding the laser beam, a continuous servo method using the spiral-shaped groove or a concentrically formed groove and a sample servo method tracing a periodically arranged signal pit sequence are known. According to the method of guiding the laser beam, although the groove is appropriately formed on the substrate 1, this does not also relate to a a substance of the present invention.

According to the above embodiment, sequentially a protective layer 2 comprising a ZnS—SiO$_2$ (SiO$_2$: 20 mol %) mixture layer, a barrier layer 8 containing Ge—N or Ge—N—O, a recording layer 3 comprising a Ge$_2$Sb$_{2.3}$Te$_5$ alloy thin film, a protective layer 4 comprising a ZnS—SiO$_2$ (SiO$_2$:20 mol %) mixture layer and a metallic reflecting layer 5 is formed on a surface where the concave-convex groove track 7 of the substrate 1 is formed by a sputter method. An ultraviolet curing resin is used as an adhesive layer 9, thereby the same resin plate as the substrate 1 is laminated as a defense plate 10. When the barrier layer 8 is Ge—N, in an order from the protective layer 2 to the metallic reflecting layer 5, the thickness of each layer is sequentially 91 nm, 5 nm, 20 nm, 18 nm and 150 nm, respectively. When the barrier layer 8 is Ge—N—O, similarly, the thickness of each layer is sequentially 86 nm, 20 nm, 20 nm, 18 nm and 150 nm, respectively.

In general, the material forming the protective layers 2 and 4 is a dielectric material, which is sometimes called a dielectric protective layer. Aside from ZnS—SiO$_2$, the materials which are conventionally used for the protective layer of the optical recording medium can be applied to the protective layer as it is. For example, an oxide layer comprising a single oxide or a compound oxide etc. such as Al, Mg, Si, Nb, Ta, Ti, Zr, Y, etc., a nitride layer comprising a nitride such as Al, B, Nb, Si, Ta, Ti, Zr, etc., a sulfide layer comprising a sulfide such as ZnS, PbS, etc., a serenide layer comprising ZnSe, etc., a carbide layer comprising SiC, etc., a fluoride comprising CaF$_2$, LaF, etc., or a mixture of the above materials such as a material layer comprising ZnSe—SiO$_2$, Si—N—O, etc. can be used.

The material forming the recording layer 3 is a phase change material to be changed into a reversible state by receiving an irradiation of an energy beam such as a laser beam, etc. More specifically, preferably, the material is reversibly changed between an amorphous state and a crystalline state by the irradiation of the laser light beam. Typically, a system containing Ge—Sb—Te, Ge—Te, In—Sb—Te, Sb—Te, Ge—Sb—Te—Pd, Ag—Sb—In—Te, Ge—Bi—Sb—Te, Ge—Bi—Te, Ge—Sn—Te, Ge—Sb—Te—Se, Ge—Bi—Te—Se, Ge—Te—Sn—Au, Ge—Sb—Te—Cr, In—Se, In—Se—Co and the like, or the system resulted from adding a gas admixture such as oxygen, nitrogen, etc. to these systems can be used.

When these thin films are formed, the thin films are in the amorphous state. When the films absorbs an energy such as the laser beam, etc., the films are crystallized. If the films are practically used as the recording medium, the recording film being in the amorphous state when the film is formed is previously crystallized by using such a method as a laser beam irradiation, a flush light irradiation, or the like. The laser beam is thinly focused, and the crystallized recording film is irradiated with the focused light beam. Accordingly, the irradiated portion is amorphized, so that the optical constant is changed, thereby the record is carried out. By the above change, the changed portion where the above record is carried out is irradiated with such a weakened laser beam not as to further change the recording layer. A variation of a reflecting light strength or the variation of a transmitted light strength is detected, thereby the information is reproduced. When the information is rewritten, the laser light beam is irradiated, and the amorphous portion is re-crystallized, thereby a recording mark is erased. After the erasure, a new recording mark is formed. As described below, such an overwrite that an erasure operation and a recording operation are carried out during one rotation of the recording medium can be performed.

As described above, the material layer located between the protective layer 2 and the recording layer 3 as the barrier layer 8 is operated in such a manner that an atomic diffusion and a chemical reaction between the recording layer and the protective layer are prevented. Compared to the recording layer, the material layer is needed to comprise the material having a higher melting point and a higher density. Furthermore, it is necessary that the material layer comprises the material which is hard to react with the material constituting the recording layer and the dielectric protective layer and to generate the atomic diffusion. Moreover, it is necessary that the material layer comprises the material which is not peeled from any layers and further is hard to generate a crack, etc. For example, the material provided with the above characteristic among the nitride, the oxide, the carbide, the nitriding-oxide, an carbide of oxygen, a carbide of nitrogen and the like is appropriate. Preferably, any material has slightly less oxygen and nitrogen than a stoichiometric compound composition. That is, for example, when a stoichiometric nitrogen compound composition of the element M and the nitriding-oxide are defined as $M_aN_b$, $M_aN_b$—$M_cO_d$ (where, a, b, c and d denote a natural number), the composition of the material layer used for the barrier layer is required to be expressed as $M_aN_{b1}$ (b1≦b) and $M_aN_{b1}$—$M_cO_{d1}$ (b1≦b and d1≦d). More specifically, when the barrier layer is applied at the side opposite to the substrate of the recording layer, preferably, $M_aN_{b2}$ (b2≦b) and $M_aN_{b2}$—$M_cO_{d2}$ (b2≦b and d2≦d).

Accordingly, even in case of such a composition as Si—N, Al—N, Si—O—N, or the like, the composition is expressed as $Si_3Nm_1(m_1<4$, preferably $m_1≦4)$, $AlNm_2$ ($m_2≦1$, preferably $m_2<1$), $Si_3$—$Nm_3$—$SiOm_4$ ($m_3≦4$ and $m_4<2$, preferably $m_3<4$ and $m_4≦2$, or $m_3≦4$ and $m_4<2$), thereby there is increased a possibility that the composition can be applied to the barrier layer.

Furthermore, when the barrier layer is formed at both the sides of the recording layer, an adhesiveness to the recording layer at the substrate side is different from that at the side opposite to the substrate. The substrate side of the recording layer has a relatively high adhesiveness, and the opposite side has a low adhesiveness. From an experimental result, when the barrier layer is formed at the substrate side of the recording layer, it is largely shifter from the stoichiometric composition. That is, when the barrier material is represented by $M_aX_b$ (where, M denotes an aggregate of non-gas elements $M_1, M_2, \ldots$, and X denotes the aggregate of gas elements $X_1, X_2, \ldots$ ), regarding a ratio of a gas component b/(a+b), the ratio of the barrier material layer at the substrate side is relatively higher than that of the barrier material layer at the side opposite to the substrate. Accordingly, the medium having an excellent weather-proofness can be constructed.

Here, typically, the example using Ge—N or Ge—N—O is shown.

A Ge—N layer or a Ge—N—O layer includes at least Ge and N, or Ge, N and O. The Ge—N layer or the Ge—N—O layer may also include other elements such as Ge—Si—N—(O), Ge—Sb—N—(O), Ge—Cr—N—(O), Ge—Ti—N—(O), or the like. The other elements are, for example, Al, B, Ba, Bi, C, Ca, Ce, Cr, Dy, Eu, Ga, H, In, K, La, Mn, N, Nb, Ni, Pb, Pd, S, Si, Sb, Sn, Ta, Te, Ti, V, W, Yb, Zn, Zr, or the like.

Furthermore, as described below, the material forming the barrier layer may be replaced by the nitride and the nitriding-oxide of the material composing recording layer. For example, when the main component of the recording layer consists of the elements among Ag, In, Sb and Te, a barrier layer can be Ag—N—(O), Sb—N—(O), In—N—(O), Te—N—(O) or a mixture of them such as Ag—Sb—N—(O). When the main component of the recording layer is Te—Si—Ge, the barrier layer can be Si—N—(O), Ge—N—(O), Te—N—(O) or the mixture of them, for example, Ge—Si—N—(O). Cr and Al are added to Ge—N and Ge—N—O, thereby the adhesiveness can be enhanced. More specifically, the addition of Cr enables to obtain a remarkable effect. At an additive density of about 5% or more, the adhesiveness can be enhanced. A preparing condition which can form the barrier layer having an excellent adhesiveness is expanded. When the additive density exceeds 50%, the cycle performance tends to be reduced.

The reflecting layer 5 comprises the material having a high reflectance and a low corrosiveness. Instead of an Al—Cr alloy, a single Au, Al, Ag, Pd, Ni, Cr, Ta, Ti, Si, Co, etc. or the alloy whose base consists of them can be used. For example, Au—Cr, Au—Co, Al—Ta, Al—Ti, Ag—Cr, Ni—Cr, Au—Pd, and the like are preferable.

According to the above explanation, as a position where the barrier layer is applied, such an example that the barrier layer is applied to the interface between the dielectric protective layer at the substrate side and the recording layer is shown. Aside from the example of FIG. 2, there are different variations shown in FIGS. 3A to 3H and FIGS. 4A to 4H as another example of FIG. 2. The shape of the groove, a contact layer and the defense plate shown in FIG. 2 are omitted. Although the structure of FIG. 3A is the same as that of FIG. 2, for simplify by a comparison among FIG. 3A and FIGS. 3B to 3H, FIG. 3A is again shown.

For example, when the barrier layer is used, even if not only the barrier layer is used at the substrate side of the recording layer as shown in FIG. 3A, but also the barrier layer is used at the reflecting layer side (shown in FIG. 3B) or at both sides (shown in FIG. 30, a similar effect can be obtained. Furthermore, even if this layer is applied all over a lower protective layer (shown in FIG. 3D), all over an upper protective layer (shown in FIG. 3E), or all over the lower and upper protective layers (shown in FIG. 3F) not as the barrier layer, but as the protective layer using the barrier material, the similar effect can be obtained. For example, in FIG. 3F, the total dielectric protective layers 2 and 4 at both sides of the recording layer 3 are formed by the material layer containing the barrier material, Ge—N or Ge—N—O. In this case, this material layer has a numeral 8.

Furthermore, according to such a structure that the barrier layer (where, a Ge—N layer or a Ge—N—O layer) is used at the substrate side of the recording layer 3 and the total protective layer 4 comprises the barrier material (where, the Ge—N layer or the Ge—N—O layer) at the side of the reflecting layer 5 (shown in FIG. 3G), the similar effect can be obtained. According to such a structure that the total protective layer 2 comprises the barrier material (where, the Ge—N layer or the Ge—N—O layer) at the substrate side and the barrier layer (where, the Ge—N layer or the Ge—N—O layer) is applied at the reflecting layer side (shown in FIG. 3H), the similar effect can be obtained.

The upper protective layer is thinned, thereby the structure is designed in such a manner that the distance between the recording layer and the metallic reflecting layer is reduced. This structure is called a quenching structure. According to the quenching structure, if two or more layers are formed at the upper side, since very thin layers must be deposited, two or more layers are not preferable in view of an accuracy administration of a film thickness, thereby it is difficult to prepare. In this case, the upper side comprises a single Ge—N layer or Ge—N—O layer, thereby there is generated such a merit that it is easy to prepare.

Figure 3:
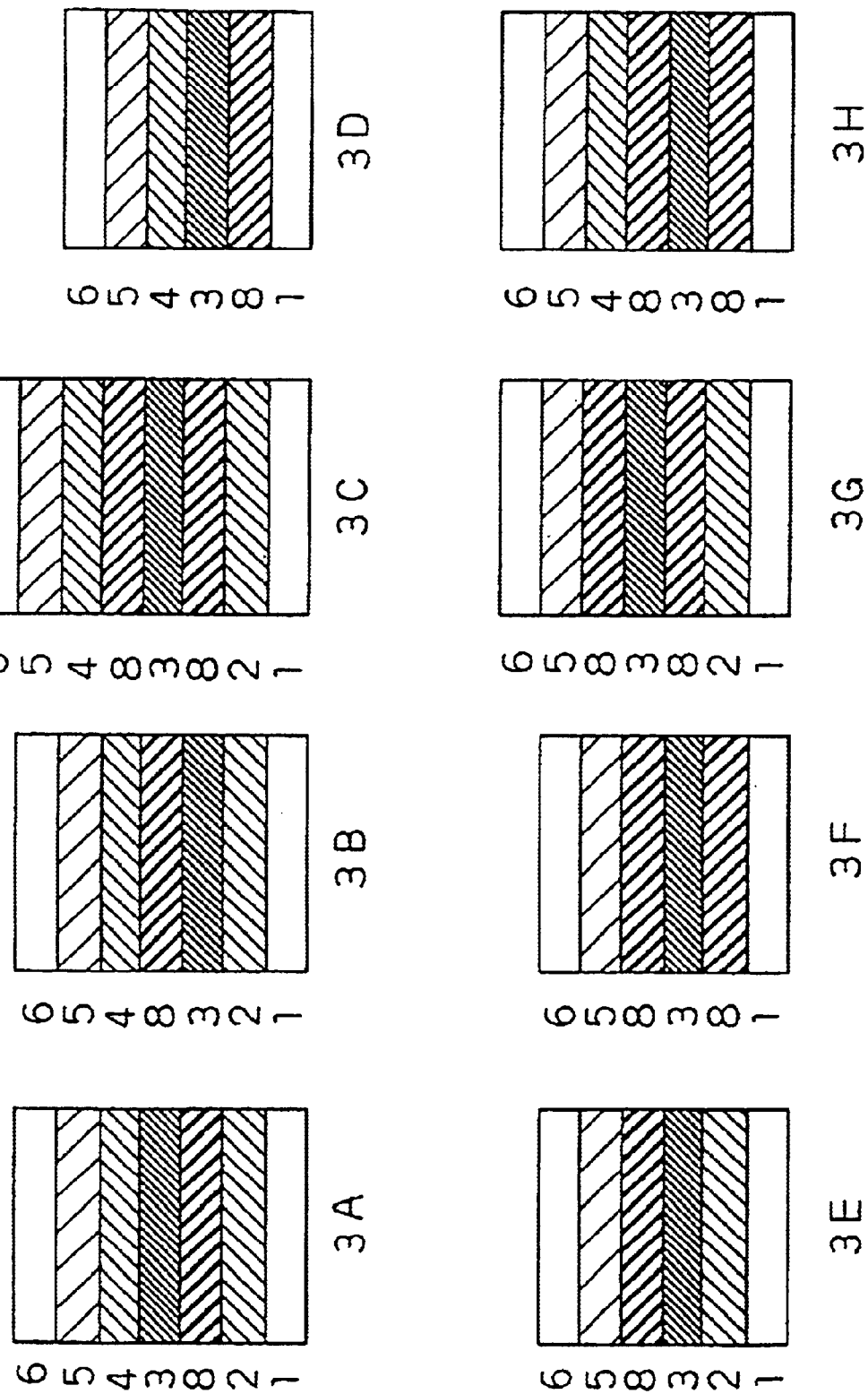
FIG. 3 is a cross-sectional view showing another structure example of the optical information recording medium according to the present invention.
Figure 4:
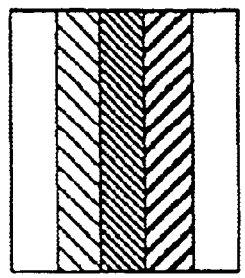
FIG. 4 is a cross-sectional view showing another structure example of the optical information recording medium according to the present invention.
Figure 4:
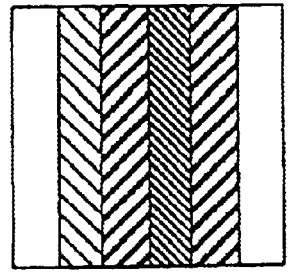
Figure 4:
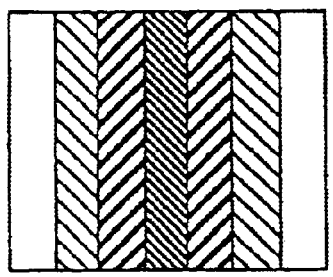
Figure 4:
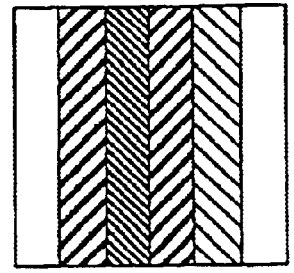
Figure 4:
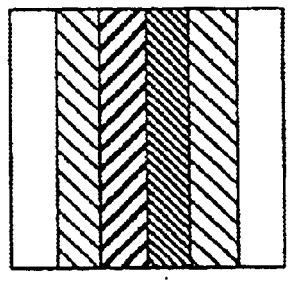
Figure 4:
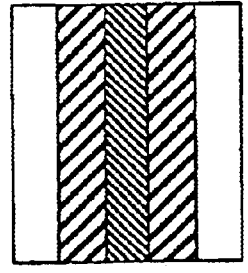
Figure 4:
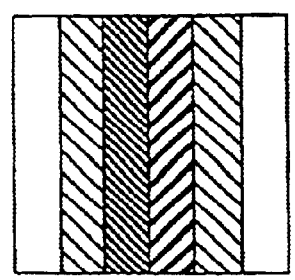
Figure 4:
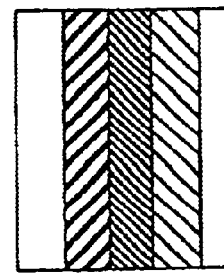

FIG. 4 shows the structure when the reflecting layer is removed from the structure in FIG. 3. FIGS. 4A to 4H correspond to FIGS. 3A to 3H, respectively. Furthermore, according to the structures shown in FIGS. 3 and 4, in various views, such a structure that a semitransparent reflecting layer comprising Au and a semiconductor material (for example, Si, Ge or the alloy whose base is Si, Ge) is added to the substrate side (the side which the light is incident on) of the recording layer can be used (not shown).

FIGS. 3 and 4 show such a structure that an uppermost layer is provided with the overcoat layer 6. The overcoat layer 6 is disposed in order only to suppress an influence due to water, dusts and the like relative to the protective layer and the recording layer of the optical information recording medium. Accordingly, for example, such a structure that a dummy substrate is laminated, such a structure that two plates are laminated with the over coat layer surface faced to an inner side, or the like is appropriately used according to a usual method. Furthermore, although the drawing is omitted, in order to laminate plates, a hot melt adhesive and an adhesive of the ultraviolet curing resin or the like are applied.

In order that the cycle performance can be enhanced, more effectively, the barrier layer 8, that is, the Ge—N layer or the Ge—N—O layer is formed at the substrate 1 side of the recording layer 3. Since the laser beam is incident on the substrate side, a temperature at the substrate side tends to rise, thereby the composition change is easy to generate. Accordingly, it is assumed that the effect of the barrier layer becomes considerable.

Furthermore, in another view, when the barrier layer, that is, the Ge—N layer or the Ge—N—O layer is formed at the reflecting layer side of the recording layer, in addition to such a merit as to enhance the cycle performance, such a merit as to enhance the erasure performance can be obtained. This relates to the following phenomenon. That is, when the recording layer is irradiated with the laser beam so that the film is amorphaized, in general, a solidification starts from the portion whose temperature is lower. That is, it is assumed that the structure of the recording film composition and the interface at the side (usually, the reflecting layer side) where a cooling starts is a principal factor for determining the condition of a generated amorphous solid. That is, it is assumed that the barrier layer enables to suppress the atomic diffusion from the protective layer to the recording layer, the recording film composition at the interface is also held in a cycle recording.

Accordingly, since the substrate 1 comprises the material such as the metal in which the light cannot be transmitted, when the light cannot be incident from the substrate side, note that this case is contrary to the above description. That is, in this case, in order that the cycle performance may be enhanced, effectively, the barrier layer, that is, the Ge—N layer or the Ge—N—O layer is formed at the side opposite to the substrate 1 of the recording layer 3. On the other hand, in order that the erasure performance may be enhanced, effectively, the barrier layer, that is, the Ge—N layer or the Ge—N—O layer is formed at the substrate 1 side of the recording layer 3. Any way, if the Ge—N layer or the Ge—N—O layer is formed at both sides of the recording layer, the above two merits can be simultaneously achieved.

Table 1 shows a layer structure corresponding to FIGS. 3A to 3H and FIGS. 4A to 4H. In the table, Sub denotes a substrate, DL denotes a protective layer, BL denotes a barrier layer (GeNO), AL denotes a recording layer, RL denotes a reflecting layer, and OC denotes an overcoat layer. Furthermore, in the protective layer, the layer applying the barrier material, that is, the Ge—N layer or the Ge—N—O layer is represented by DL(GeNO), and the layer not applying the barrier material layer is represented by only DL.

TABLE 1

An example of layer structures of the recording medium

| FIG. | layer structures | | | | |
|---|---|---|---|---|---|
| 3A | Sub\|DL | \|BL(GeNO) | \|AL\| | \|DL | \|RL\|OC |
| 3B | Sub\|DL | | \|AL\|BL(GeNO) | \|DL | \|RL\|OC |
| 3C | Sub\|DL | \|BL(GeNO) | \|AL\|BL(GeNO) | \|DL | \|RL\|OC |
| 3D | Sub\|DL(GeNO) | | \|AL\| | \|DL | \|RL\|OC |
| 3E | Sub\|DL | | \|AL\| | \|DL(GeNO) | \|RL\|OC |
| 3F | Sub\|DL(GeNO) | | \|AL\| | \|DL(GeNO) | \|RL\|OC |
| 3G | Sub\|DL | \|BL(GeNO) | \|AL\| | \|DL(GeNO) | \|RL\|OC |
| 3H | Sub\|DL(GeNO) | | \|AL\|BL(GeNO) | \|DL | \|RL\|OC |
| 4A | Sub\|DL | \|BL(GeNO) | \|AL\| | \|DL | \|OC |
| 4B | Sub\|DL | | \|AL\|BL(GeNO) | \|DL | \|OC |
| 4C | Sub\|DL | \|BL(GeNO) | \|AL\|BL(GeNO) | \|DL | \|OC |
| 4D | Sub\|DL(GeNO) | | \|AL\| | \|DL | \|OC |
| 4E | Sub\|DL | | \|AL\| | \|DL(GeNO) | \|OC |
| 4F | Sub\|DL(GeNO) | | \|AL\| | \|DL(GeNO) | \|OC |
| 4G | Sub\|DL | \|BL(GeNO) | \|AL\| | \|DL(GeNO) | \|OC |
| 4H | Sub\|DL(GeNO) | | \|AL\|BL(GeNO) | \|DL | \|OC |

Figure 5:
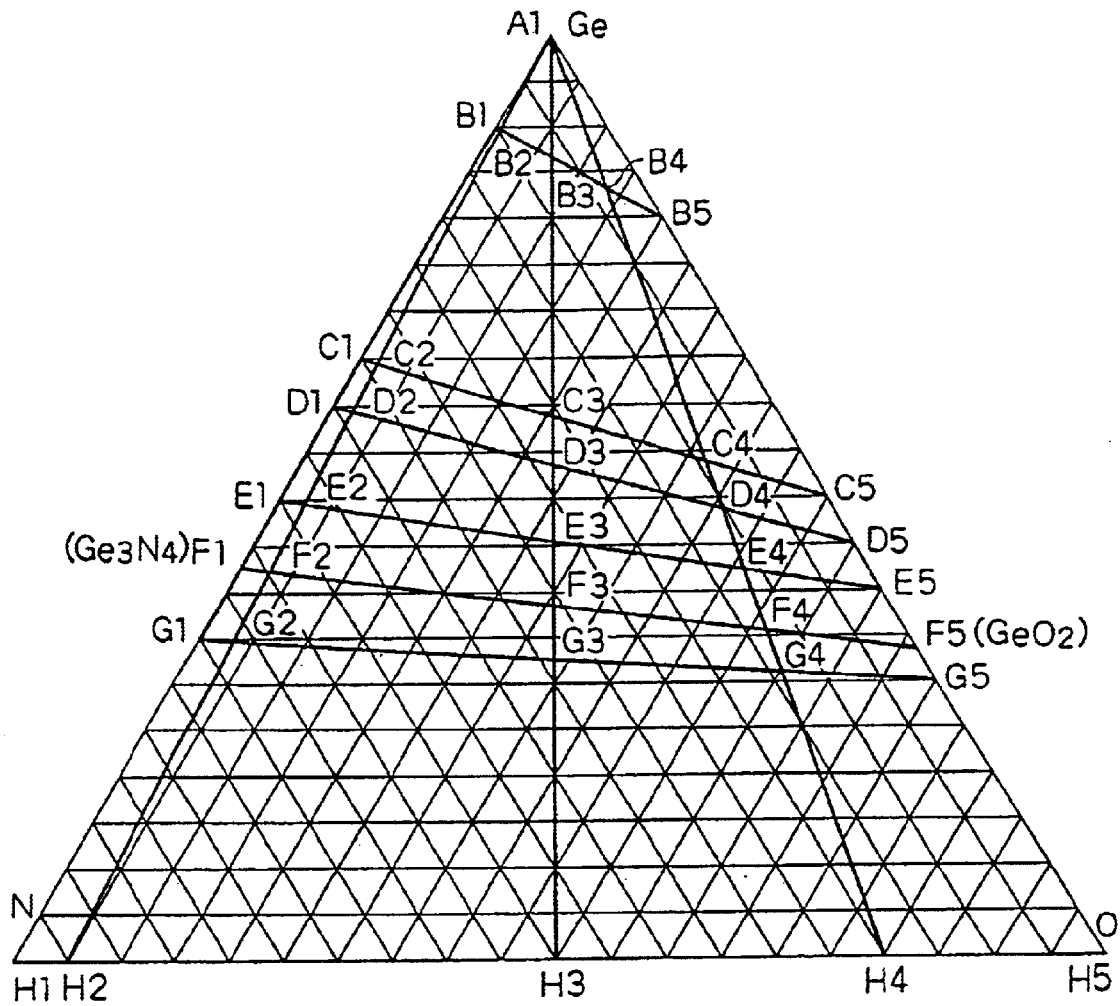
FIG. 5 is a composition diagram for explaining an appropriate composition range of a Ge—N layer or a Ge—N—O material layer applied to the optical information recording medium according to the present invention.

Next, as a typical barrier material, an appropriate composition range of the Ge—N layer or the Ge—N—O layer will be described below. FIG. 5 is a triangular diagram showing the composition range of the Ge—N layer or the Ge—N—O applied to the present invention. In the appropriate composition of the Ge—N material which does not contain oxygen, the Ge density has a lowest limit value of 35% to 40%. If the lowest limit value is reduced to less than 35% to 40%, the adhesiveness to the recording layer is reduced. According to an acceleration environment test, a peeling phenomenon are exhibited.

Furthermore, the Ge density has a supremum value of about 90%. If the supremum value exceeds 90%, in a process of repeating recording and erasing, Ge is included in the recording film, thereby the cycle performance tends to be reduced. The appropriate Ge density in case that the Ge—N layer is formed at the substrate side of the recording layer is more or less different from that in case that the Ge—N layer is formed at side opposite to the substrate. The latter is little more highly set than the former, thereby the adhesiveness is higher.

For example, the appropriate region of the Ge density of the former is 35% to 60%, on one hand, the appropriate region of the latter is 40% to 90% (preferably, 40% to 65%).

When the former and the latter are formed under the same condition, the appropriate Ge density is ranging from 40% to 60%. According to the present invention, since it is not necessary that both of them are formed under the same condition, the appropriate Ge density whose is within the range from 35% to 90% (preferably, from 35% to 65%) is the effective composition region. Within the range from 65% to 90%, the cycle performance tends to be relatively reduced.

Ge—N—O system containing oxygen is described below. An average composition ratio of Ge to N to O in the Ge—N—O protective layer is shown in the triangular diagram showing the three-element composition Ge—N—O in FIG. 5. The average composition ratio can be explained by using each composition point, that is, A1, B1 to B5, C1 to C5, D1 to D5, E1 to E5, F1 to F5, G1 to G5 and H1 to H3.

B2 ($Ge_{89.7}$ $N_{9.8}$ $O_{0.5}$), B3($Ge_{86.6}$ $N_{6.7}$ $O_{6.7}$), B4($Ge_{83.4}$ $N_{3.3}$ $O_{13.3}$), C2($Ge_{64.4}$ $N_{33.8}$ $O_{1.8}$), C3($Ge_{58.8}$ $N_{20.6}$ $O_{20.6}$), C4($Ge_{53.9}$ $N_{9.2}$ $O_{36.9}$), D2($Ge_{59.5}$ $N_{38.5}$ $O_{2.0}$), D3($Ge_{53.8}$ $N_{23.1}$ $O_{23.1}$), D4($Ge_{48.8}$ $N_{10.2}$ $O_{41.0}$), E2($Ge_{49.6}$ $N_{47.9}$ $O_{2.5}$), E3($Ge_{45.4}$ $N_{27.3}$ $O_{27.3}$), E4($Ge_{42.3}$ $N_{11.5}$ $O_{46.2}$), F2($Ge_{42.4}$ $N_{54.7}$ $O_{2.9}$), F3($Ge_{38.4}$ $N30.8$ $O_{30.8}$), F4($Ge_{35.5}$ $N_{12.9}$ $O_{51.6}$), and G2($Ge_{34.8}$ $N_{62.0}$ $O_{3.2}$), G3($Ge_{32.6}$ $N_{33.7}$ $O_{33.7}$), G4($Ge_{31.1}$ $N_{13.8}$ $O_{55.1}$) are defined as the composition points at which the following composition lines crosses one another. The composition lines are as follows:

a composition line B1-B5 connecting the composition point B1($Ge_{90.0}$ $N_{10.0}$) to the composition point B5($Ge_{80.0}$ $N_{20.0}$), a composition line C1-C5 connecting the composition point C1($Ge_{65.0}$ $N_{35.0}$) to the composition point C5($Ge_{50.0}$ $N_{50.0}$), a composition line D1-D5 connecting the composition point D1($Ge_{60.0}$ $N_{40.0}$) to the composition point D5($Ge_{45.0}$ $N_{55.0}$), a composition line E1-E5 connecting the composition point E1($Ge_{50.0}$ $N_{50.0}$) to the composition point E5($Ge_{40.0}$ $N_{60.0}$), a composition line F1-F5 connecting the composition point F1($Ge_{42.9}$ $N_{57.1}$) to the composition point F5($Ge_{33.3}$ $N_{66.7}$), a composition line G1-G5 connecting the composition point G1($Ge_{35.0}$ $N_{65.0}$) to the composition point G5($Ge_{30.0}$ $N_{70.0}$), a composition line A1-H2 connecting the composition point A1($Ge_{100}$) to the composition point H2($N_{95.0}$ $O_{5.0}$), a composition line A1-H3 connecting the composition point A1($Ge_{100}$) to the composition point H3($N_{50.0}$ $O_{50.0}$) and a composition line A1-H4 connecting the composition point A1($Ge_{100}$) to the composition point H4($N_{20.0}$ $O_{80.0}$)

That is, preferably the average composition ratio of Ge to N to O in the Ge—N—O layer is within the range surrounded by four composition points, that is, B1, B4, G4, G1 in the triangular diagram showing the three-element composition Ge—N—O shown in FIG. 5. Within this range, there are such an effect that the cycle performance and the erasure performance can be enhanced as described above.

Similarly to the case of the Ge—N layer, in case of the Ge—N—O layer, when the barrier layer is formed at the side opposite to the substrate of the recording layer (at the side which the laser beam is not incident on), in the process of recording and erasing, there is less possibility that the Ge atom is included in the recording layer. Accordingly, the layer can be applied to the composition region whose Ge density is considerably high. On the contrary, when the barrier layer is formed at the substrate side of the recording layer (at the side which the laser beam is incident on), there is more possibility that the Ge atom is included in the recording layer. Accordingly, it is not preferable that the layer is applied to the composition region whose Ge density is considerably high.

Accordingly, even within the composition region B1—B4—G4—G1, when the barrier layer is formed at the substrate side of the recording layer (at the side which the laser beam is incident on), the composition region surrounded by the four composition points, D1, D4, G4, G1 is preferable. When the barrier layer is formed at the side opposite to the substrate of the recording layer (at the side which the laser beam is not-incident on), the composition region surrounded the four composition points B1, B4, F4, F1 (preferably, C1, C4, F4, F1) is more preferable.

When the Ge density exceeds the composition line B1-B4, there is more possibility that the Ge atom is included in the recording layer, thereby sometimes the characteristic of the recording layer is changed. On the contrary, when the Ge density is too less than the composition line G1-G4, gas-state oxygen and nitrogen included in the film are increased. Accordingly, for example, when a laser-heating is performed, the oxygen and nitrogen is outgassed relative to the interface to the recording layer, thereby sometimes there is occurred such a problem that the Ge—N—O protective layer is peeled from the recording layer, etc. However, any way, if the Ge—N—O protective layer is formed at least one side of the recording layer, a predetermined effect can be obtained.

The component ratio of oxygen to nitrogen can be selected according to the optical constant (refractive index) when the structure of a recording device is determined. For example, in case of $Ge_3N_4$—$GeO_2$ composition line, the closer a real part n and an imaginary part k of the complex refractive index n+ik approach to the $Ge_3N_4$ side, the larger they become. The closer the real part n and the imaginary part k approach to the $GeO_2$ side, the smaller they become. Accordingly, when larger n, k are necessary, the composition containing much nitrogen can be selected. When smaller n, k are necessary, the composition containing much oxygen can be selected.

However, the higher the $GeO_2$ density becomes, the lower the melting point of the film becomes. When the melting point becomes too low, since a deformation is occurred due to the repeated laser irradiation, and the protective layer is mixed with the recording layer, an excessively low melting point is not preferable as the protective layer. Furthermore, since $GeO_2$ itself is subject to melt into water, when $GeO_2$ density becomes higher, there is such a problem that a moisture-proof of the protective layer is reduced.

In the composition region surrounded by the composition points B1, B4, G4, G1 (in addition to the composition points B1, B4, C1, C4, G4, G1, for example $Ge_{35}N_{30}O_{35}$, $Ge_{37}N_{18}O_{45}$, $Ge_{40}N_{55}O_5$), the good moisture-proof and cycle performance can be confirmed. In view of a repeating performance, in the region B1-B3-G3-G1 having a relatively less oxygen component (in addition to the composition points B1, B3, G3, G1, for example $Ge_{40}N_{40}O_{20}$, $Ge_{42}N_{53}O_5$, $Ge_{35}N_{35}O_{30}$), a good repeating performance can be confirmed.

In the composition whose oxygen density is low, for example, in the composition having a less oxygen component than the composition line A1-H2, the rigidity becomes little larger. Accordingly, compared to the composition having more oxygen component, the composition having less oxygen density has a little tendency to generate the crack and the peeling. However, a little oxygen is added to the composition having less oxygen density, thereby such an effect that the peeling and the crack are prevented can be obtained. As described below, even in the composition having less oxygen than the composition line A1-H2, if the thickness of the Ge—N—(O) layer is about 300 nm, there is no practical problem. Accordingly, this region can be applied.

When the Ge—N layer or the Ge—N—O layer is applied to the barrier layer, the film thickness thereof is needed to be at least 1 nm or more, preferably 2 nm or more, more preferably 5 nm or more. When the film thickness is less than 1 nm, such an effect that the diffusion is suppressed is reduced. Furthermore, the difference between 2 nm and 5 nm is an allowance relative to the power. Even if the thickness of 5 nm needs a higher power than 2 nm, such an effect that the cycle performance is enhanced can be obtained according to the diffusion and the chemical reaction. When the film thickness is 5 nm, a basic diffusion suppression effect can be sufficiently obtained. If the thickness is 20 nm or more, the above effect can be more reproducibly obtained.

When the Ge—N layer or the Ge—N—O layer is used as the protective layer, it is necessary that the thickness thereof is formed in such a manner that it is thicker than thickness of the layer used for the barrier layer. In case of a usual optical disk, the film thickness of the dielectric protective layer can be only formed in order to have at most 300 nm. Accordingly, the thickness of about 300 nm is applied to the film thickness of the Ge—N protective layer or the Ge—N—O protective layer. In case of Ge—N layer or the Ge—N—O layer, there is no problem, and the crack and the like are not observed. Furthermore, in this point of view, there is such an advantage that the material system containing oxygen is not subject to crack. It is assumed that oxygen is included, thereby a structure flexibility is enhanced.

Next, a method of preparing the optical information recording medium will be explained. The multi-layer film constituting the recording medium according to the present invention can be formed by a gas phase deposition method such as a vacuum deposition method, a DC sputtering method, a magnetron sputtering method, a laser sputtering method, an ion plating method, a CVD method and the like. Here, the example using the DC sputtering method and the magnetron sputtering method will be described.

Figure 6:
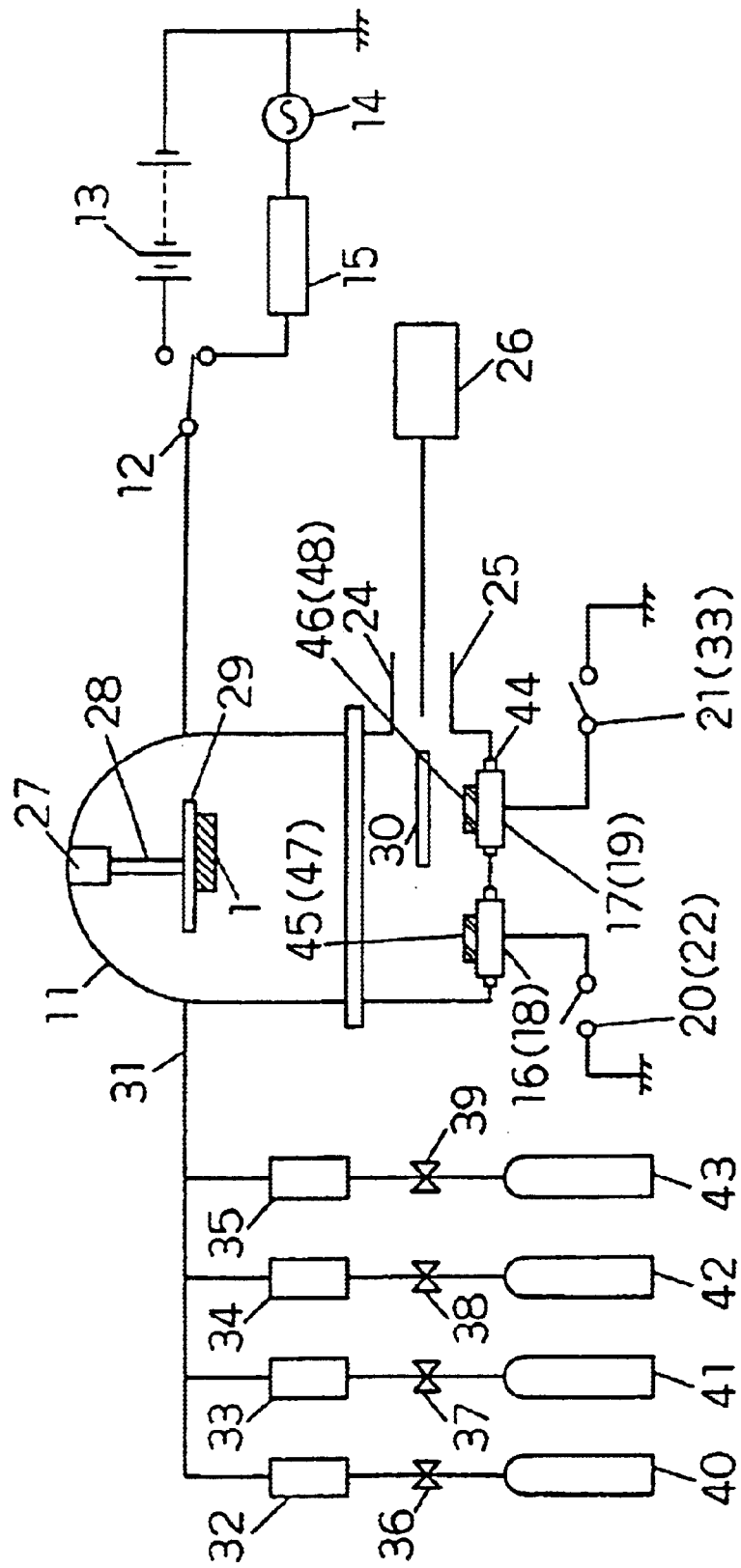
FIG. 6 shows a structure example of an apparatus of preparing the optical information recording medium according to the present invention.

FIG. 6 shows an embodiment of an apparatus for preparing the optical information recording medium. FIG. 6 shows a generally schematic structure. In the first place, a vacuum tank 11 of a sputter chamber is a positive electrode. The vacuum tank 11 is connected to a plus of a direct current power source 13 via a power source switch 12. Furthermore, the vacuum tank 11 is switching-connected to a matching circuit 15 connected to a high-frequency power source 14. Thereby, both of the DC sputtering using a direct current discharge and an RF sputtering using a high-frequency discharge can be carried out. The matching circuit 15 matches an impedance in the sputter chamber to the impedance at the power source.

A bottom portion of the vacuum tank 11 is provided with four negative electrodes 16, 17, 18, 19 (negative electrodes 18, 19 not shown) which also serve as a water cooler. An insulating material 44 is disposed around each negative electrode 16, 17, 18, 19, thereby the negative electrodes 16, 17, 18, 19 are insulated from the positive electrode. Furthermore, the negative electrodes 16, 17, 18, 19 can be grounded via switches 20, 21, 22, 23 (switches 22, 23 not shown).

A Ge—Sb—Te alloy target 45 bonded to a copper backing plate, a ZnS—SiO$_2$, (SiO$_2$:20 mol %) mixture target 46, an Al—Cr (Cr:3 atoms %) alloy target 47 and a Ge target 48 are fixed to the negative electrodes 16, 17, 18, 19 via an O ring by a screw, respectively. Each target is disc-shaped, having a diameter of 100 mm and a thickness of 6 mm. Furthermore, a permanent magnet (not shown) is accommodated in the negative electrodes 16, 17, 18, 19, thereby a magnetron discharge can be carried out.

An air outlet 24 is disposed at a side surface the vacuum tank 11. A vacuum pump 26 is connected to the air outlet 24 via a pipe 25, thereby an exhaust can be carried out in such a manner that the sputter chamber is high vacuum. An upper portion of the vacuum tank 11 is provided with a rotating apparatus 27. A disk holder 29 is mounted to a rotary shaft 28 of the rotating apparatus 27. The substrate 1 is attached to the disk holder 29. A numeral 30 denotes a shutter. The shutter 30 is closed so that a pre-sputter is carried out. Furthermore, the shutter 30 is opened and closed, thereby a sputter start and a sputter completion are controlled.

One side of a gas pipe 31 for providing a sputter gas is connected to the vacuum tank 11. The other side of the gas pipe 31 is connected to an Ar gas cylinder 40, a Kr gas cylinder 41, an O$_2$ gas cylinder 42 and an N$_2$ gas cylinder 43 via a mass flow meters 32, 33, 34, 35 and valves 36, 37, 38, 39, respectively. Thereby, aside from the usual sputtering in an Ar gas atmosphere, the sputtering in a Kr gas atmosphere, a mixed gas of Ar gas, Kr gas and N$_2$ gas atmosphere (for example, Ar+N$_2$), a mixed gas of Ar gas, Kr gas, N$_2$ gas and O$_2$ gas atmosphere (for example, Ar+N$_2$+O$_2$) can be carried out. The gas containing the nitrogen component is not limited to the N$_2$ gas, for example, ammonia, etc. is also included in the gas containing the nitrogen component. However, considering an apparatus contamination, etc., in general, the N$_2$ gas is preferable. When the Ge—N—O layer is formed, N$_2$O$_2$, NO, NO$_2$ or the like is used as the gas containing both of N and O, and the sputtering can be also carried out in the mixed gas of Ar and them.

The method of preparing the optical information recording medium having the structure shown in FIG. 3A as an embodiment of the optical information recording medium according to the present invention by using this apparatus will be described below. Here, simultaneously, such an example that the Ge—N layer or the Ge—N—O layer as the barrier layer is disposed at the substrate side of the recording layer will be explained (henceforth, in case of no particular explanation, an explanation is made in an order of Ge—N, Ge—N—O).

In the first place, the vacuum pump 26 is actuated, thereby the vacuum tank is exhausted to a high vacuum of $1 \times 10^{-6}$ Torr or less. Next, a main valve is throttled, and at the same time. Ar gas is introduced into the vacuum tank, thereby a degree of vacuum reaches to 1 mTorr. The disk holder 29 is rotated, and the power source switch is turned on, thereby RF discharge is started by the ZnS—SiO$_2$ target 46 and the negative electrode 17. The pre-sputter is carried out with 500W power for five minutes, and after the discharge is stabled, the shutter 30 is opened. After a ZnS—SiO$_2$ film having a predetermined thickness (according to the embodiment, as described above, 91 nm or 86 nm) is deposited on the substrate 1, the shutter 30 is closed. The protective layer 2 comprising the ZnS—SiO$_2$ film is formed on the substrate 1 provided with the groove track portion 7.

After the discharge is completed, once the main valve is entirely opened, the degree of vacuum is returned to $1 \times 10^{-6}$ Torr. Thenceforth, the main valve is throttled again, the Ar gas and the N$_2$ gas are introduced at the ratio of 50% to 50%, thereby the total pressure is set to 20 mTorr. Next, the RF discharge is started by the Ge target 48 and the negative electrode 19. After five-minute pre-sputtering, the shutter 30 is opened, and the reactive sputter is carried out with 500W The barrier layer 8 whose main component is Ge—N having a predetermined thickness (according to the embodiment, as described above, 5 nm or 20 nm) is formed on the previously formed ZnS—SiO$_2$ protective layer 2 (since the opening and closing operation of the shutter 30 and the valve operation are similar to the case of forming the following layers, the explanation is omitted). When the barrier layer whose main component is Ge—N—O is formed, in the above process, instead of introducing the Ar gas and the N$_2$ gas at the ratio of 50% to 50%, the Ar gas, the N$_2$ gas and the O$_2$ gas can be only introduced at the pressure ratio of 49.5% to 49.5% to 1%. Only this point is different from the above case. Similarly, the succeeding process is carried out.

Since Ge has more tendency to form the oxide rather than the nitride, for example, the O$_2$ density can be set considerably less than the N$_2$ density. In some cases, the mixed gas of the Ar gas and the gas containing an N component can be only used as an introducing gas, thereby the Ge—N film containing oxygen, that is, the Ge—N—O layer can be formed. In this case, such an administration that the degree of vacuum is set within a predetermined range before introducing the gas, etc. is carried out, thereby the O density in the Ge—N—O layer can be controlled in such a manner that a desired O density is obtained.

The composition of the Ge—N layer and the Ge—N—O layer can be identified by a combination of an auger electron spectral method (AES), a Ruthurford back scattering method (RBS), an Inductive Combination high-frequency plasma spectral method (ICP), and the like. The compositions in this case are Ge$_{44}$N$_{56}$, Ge$_{40}$N$_{40}$O$_{20}$, respectively.

Next, DC discharge is started by the Ge—Sb—Te target 45 and the negative electrode 16, thereby the recording layer 3 is formed. The Ar gas is introduced so that the degree of vacuum is set to 0.5 mTorr. The sputtering is carried out with 100 W power in such a manner that a predetermined film thickness (according to the embodiment, as described above, 20 nm) can be obtained. The formed recording layer 3 is in amorphous state.

Next, the ZnS—SiO$_2$ film of the upper protective layer 4 is formed under the same condition as the lower protective layer 2 of a first layer in such a manner that a predetermined film thickness (according to the embodiment, as described above; 18 nm) can be obtained. Finally, the Al—Cr target 47 is DC sputtered in the Ar gas atmosphere of 2 mTorr with 300 W power. The Al—Cr alloy film of the metallic reflecting layer 5 is also deposited at a predetermined thickness (according to the embodiment, as described above, 150 nm), thereby the multi-layer film having a predetermined five-layer structure is formed on the substrate 1.

The formed medium is taken out the vacuum tank 11, and the metallic reflecting layer 5 is covered with the ultraviolet curing resin. The dummy substrate is laminated on the covered metallic reflecting layer 5 so carefully not as to generate a bubble. In this state, the ultraviolet is irradiated, and a coated layer of the ultraviolet curing resin is cured, thereby an adhesive structure provided with a contact layer 9 and a protective defense plate 10.

According to the above example, as the method of forming the Ge—N layer or the Ge—N—O layer, the metal Ge is used as the target, and the mixed gas of the Ar gas and the nitrogen gas or the mixed gas of the Ar gas, the nitrogen gas and the oxygen gas are used so that the film is formed by the reactive sputtering method. However, there are other methods.

Other methods are as follows. Instead of the metal Ge, a Ge—N compound (preferably, Ge$_3$N$_4$) is used as the target. The reactive sputtering is carried out in the mixed gas containing the rare gas and the nitrogen so that the film is prepared. Furthermore, a Ge—O compound (preferably, GeO, GeO$_2$) is used as the target. The reactive sputtering is carried out in the mixed gas of the rare gas and the nitrogen, or in the mixed gas of the rare gas, the nitrogen-containing gas and the oxygen-containing gas so that the film is prepared. Furthermore, a Ge—N—O compound (for example, the compound of Ge$_3$N$_4$ and GeO$_2$ or GeO) is used as the target. The reactive sputtering is carried out in the mixed gas of the rare gas and the nitrogen-containing gas, or in the mixed gas of the rare gas, the nitrogen-containing gas and the oxygen-containing gas so that the film is formed.

When the film is formed, in case that impurities such as Ar, H, Si, C, etc. contained in the sputter gas and the chamber are contained in the barrier layer 8, if the impurity density is 10 at % or less, the similar effect to the case that the impurity is not contained can be obtained. That is, preferably, the impurity density contained in the nitride and the oxide forming the barrier layer 8 is about 10 at % or less. In case of an admixture for positively enhancing the characteristic, the density is not limited to this range. For example, Cr can be added up to the same density as the Ge density at maximum, thereby Cr largely contributes to enhancing the adhesiveness to the recording layer, etc.

As a second method of forming the barrier layer, for example, the material of the recording layer is applied to the target, and the nitride and nitriding-oxide being the constituent elements of the recording layer are formed, thereby the barrier layer can be formed. For example, in case of a Ge—Sb—Te system recording layer, the Ge—Te—Sb alloy target is used so that Ge—Sb—Te—N and Ge—Sb—Te—N—O can be formed. In case of this method, for example, in the first place, after the protective layer is formed, the Ge—Sb—Te target is used, and the reactive sputtering is carried out in the mixed gas of Ar+N$_2$ thereby the Ge—Sb—Te—N film is formed in order to have a predetermined thickness. After then, Ar is used as the sputter gas, and the Ge—Sb—Te recording layer is formed. By this process, only one target is used, thereby the barrier layer and the recording layer can be formed.

According to the embodiment, such an example that the process of forming the recording layer is performed in inactive gas is shown. The nitrogen can be contained in the recording layer. In this case, the N$_2$ partial pressure is appropriately adjusted. In case of forming the recording layer, compared to the case of forming the barrier layer, a low N$_2$ density is selected, thereby the recording layer containing the nitrogen and the barrier layer can be laminated. Here, the example of preparing the optical information recording medium having the structure shown in FIG. 3A is shown. For example, as shown in FIG. 3F, in case of the structure having the protective layers comprising the barrier material at both sides of the recording layer 3, the protective layer comprising the nitride and nitriding-oxide, the recording layer and the protective layer comprising the nit ride and nitriding-oxide can be formed according to the above process.

Furthermore, for example, as shown in FIG. 3E, when the protective layer comprising the barrier material is formed on only the upper surface of the recording layer 3, naturally, the films can be formed in the order of the recording layer, the protective layer comprising the nitride and nitriding-oxide. In case of this method, since the composition of the recording layer is common to that of the barrier layer or the protective layer, there is less fear that the chemical reaction and the interdiffusion are occurred. Accordingly, a higher adhesiveness can be easily obtained. Extending this view, for example, when the Ge—Sb—Te recording layer is used, it is advantageous that the constituent elements of the Ge—Sb—Te recording layer, that is, the nitride and nitriding-oxide such as Te and Sb are used as the barrier layer and the protective layer themselves. In this case, the metal Te and the metal Sb are used as the target, and Te—N, Te—N—O and Sb—N, Sb—N—O can be selectively independently formed, respectively. In any case, the effect corresponding to the Ge—N—O layer can be obtained. In case of the barrier layer and the protective layer using the nitride and the nitriding-oxide, for example, as shown by the case of Ge—N—O, the composition ratio of the nitrogen element, the oxygen element and the metal element is not limited to the stoichiometric composition.

According to the present invention, when a heat is applied, in the constituent element of the recording layer and/or the constituent element of the dielectric material layer, a material movement is suppressed. The layer having a higher adhesiveness to the recording layer and/or the dielectric material layer is adhesively formed on at least one surface of the recording layer. If this requirement can be only satisfied, the constituent element of the recording layer is not limited to nitriding-oxide. Accordingly, even if the constituent element of the recording layer is a carbide or a fluoride, the constituent element can be applied. For example, the constituent element of the recording layer may be the same as the constituent element (for example, Zn—N, Zn—N—O, etc.) of the dielectric protective layer. Furthermore, it is expected that the mixture of the compound except for nitriding-oxide can be applied. Even if In—Sb—Te and Ag—In—Sb—Te systems etc. which do not contain Ge are used as the recording material, the Ge—N film and the Ge—N—O film are effective.

Next, the formed recording medium is initialized. The initialization is carried out by the laser irradiation, as described below. Any other method, for example, the method using a flush exposure can be applied. Here, the disk medium is rotated at linear rate of 5 m/s at uniform rate, and the laser beam having a wavelength of 780 nm is formed in such a manner that an oblong spot of 1 $\mu$m×100 $\mu$m (a half value width) is formed on the disk. The disk medium is located in such a manner that the longitudinal direction of the oblong spot thereof is a radius direction. The crystallization is sequentially carried out at a pitch of 30 $\mu$m/rotation from an outer diameter to an inner diameter.

Thereby, the method of preparing the optical information recording medium according to one embodiment of the present invention is shown. If the number of layers and the layer thickness of the disk are changed, the above method is substantially similar. Furthermore, the medium having various structures as shown in FIGS. 3A to 3H and FIGS. 4A to 4H can be similarly formed.

Furthermore, a disk comprising a plurality of laminated recording layers in which a multi-layer recording can be carried out, and a disk comprising two laminated disks with rear surfaces thereof in which the record can be reproduced at both sides can be applied to the present invention.

Next, the signal is recorded on the optical information medium prepared by the above method, and the method of reproducing the record will be explained. In order to estimate the recording and reproducing characteristic, a deck is used. The deck is provided with a semiconductor laser light source whose wavelength is 680 nm, an optical head mounting an objective lens whose numerical aperture is 0.6, a linear motor for guiding the optical head to an optional position of the recording medium, a tracking servo mechanism for controlling a positioning, a circuit for the tracking servo mechanism, a focusing servo mechanism for controlling an attitude of the optical head and for irradiating a recording film surface with a laser spot, a circuit for the focusing servo mechanism, a laser drive circuit for modulating a power of the laser, a time interval analyzer for measuring a jitter value of the reproduced signal, and a rotation control mechanism for rotating the optical disk.

Figure 7:
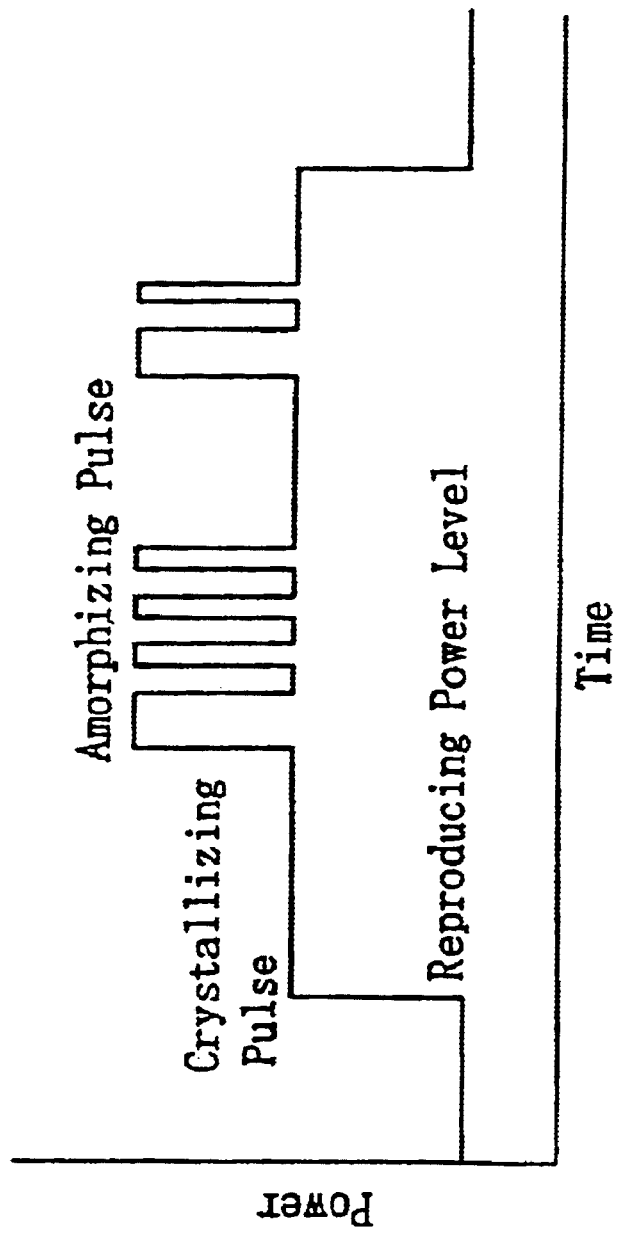
FIG. 7 shows an example of a laser modulation waveform for recording and reproducing au information signal relative to the optical information recording medium according to the present invention.

When the signal is recorded or overwritten, in the first place, the disk is rotated at a predetermined rate. The linear motor is operated so that the optical head is moved to the optional track position. Next, the focusing servo mechanism is operated so that the laser spot is focused on the recording film surface. Next, the tracking servo mechanism is operated so that the laser beam is tracked to an optional track. Next, the laser drive circuit is operated so that the power of the outputted laser is modulated corresponding to the information signal between an amorphizing pulse portion having a power level whose irradiation energy is relatively high and a crystallizing pulse portion having a power level whose irradiation energy is relatively low, as shown in FIG. 7. The optical information recording medium is irradiated with the laser beam, thereby such a state that an amorphous state and a crystalline state alternately exist is formed.

A peak pulse portion comprises a usually so-called multi-path formed by further narrow pulse sequence. After the irradiated portion in the amorphizing pulse portion is melted in an instant, the portion is quenched, thereby the portion is in the amorphous state. The irradiated portion in the crystallizing pulse portion is annealed, thereby the portion is in the crystalline state.

Next, when the signal is reproduced, the irradiation power of the laser beam is set to a reproducing power level lower than the power level used for the crystallization in such a manner that the optical information recording medium is not further changed. The optically changed portion is irradiated with the laser beam, and a detector receives and detects a strength change generated corresponding to a difference between the amorphous state and the crystalline state of the reflecting light or the transmitted light.

Figure 8:
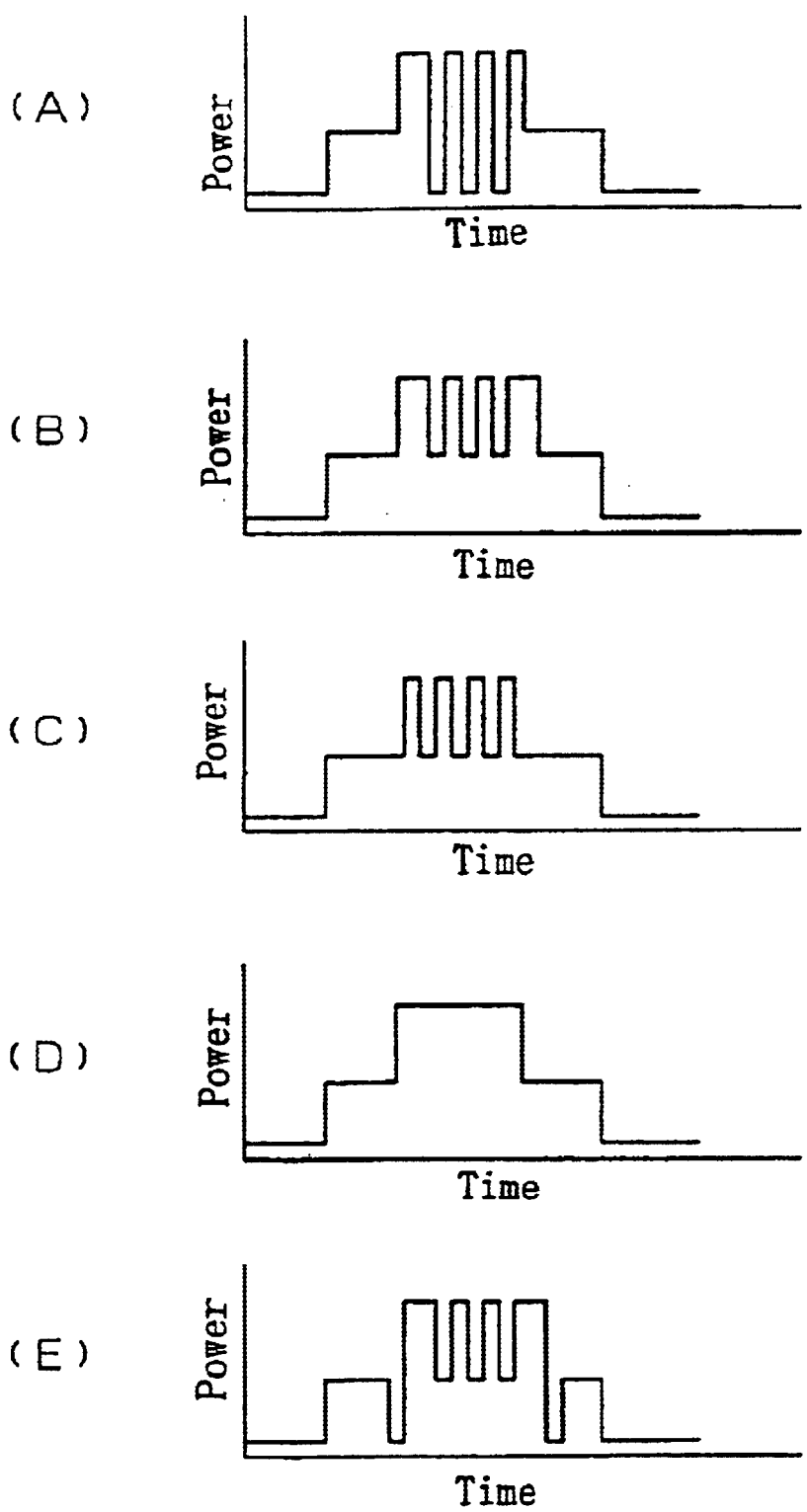
FIG. 8 shows another example of a laser modulation waveform for recording and reproducing an information signal relative to the optical information recording medium according to the present invention.

A pulse waveform is not limited to the waveform shown in FIG. 7. For example, as shown in FIG. 8, (A) the amorphizing pulse is modulated between the amorphizing power level and the level less than the reproducing power level, (B) only pulse widths of a top pulse and a tail pulse are relatively longer than the pulse width of a intermediate pulse, (C) the amorphizing pulse width makes equal, (D) when the laser beam is amorphized, without a pulse modulation, the beam is irradiated, (E) such a period that the pulse has the power level less than the reproducing power level is necessarily provided before and/or after the amorphizing pulse, or the waveforms as shown in (A) to (E) are combined to one another, etc. Thereby, various recording systems, reproducing systems and erasure systems can be applied.

A signal system is EFM, a shortest recording mark length is 0.61 $\mu$m, and a shortest bit length is 0.41 $\mu$m. The disk is fixed to a turn table, and it is rotated at 2045 rpm. At the position whose recording radius is 28 mm (linear rate 6 m/s), the overwrite of a random signal for recording a mark length within the range from 3T to 11T on the groove track is repeated. The change of the signal amplitude and the jitter value (the ratio ($\sigma$sum/Tw) of $\sigma$ sum, that is, a sum of a standard deviation $\sigma$ of the jitter value of each signal mark 3T-11T to a window width Tw(=34 ns), the jitter value can be only 12.8% or less) is examined.

For a comparison, three kinds of disks (A), (B), (C) are made on an experimental basis and estimated. The disks are as follows: (A) two disks comprising the structure according to the embodiment (a disk A1 is a Ge—N barrier layer disk, a disk A2 is a Ge—N—O barrier layer disk), (B) a disk comprising a conventional structure, that is, the structure of the disk (A) except for the Ge—N barrier layer or the Ge—N—O barrier layer, and (C) a disk comprising the conventional structure in which an $Si_3N_4$ interface layer is formed instead of the Ge—N barrier layer or the Ge—N—O barrier layer of the disk (A) according to the embodiment.

According to a first estimate item, after the record is repeated at 100,000 times, the jitter value (measured by such a method that the jitter between each mark front end and the jitter between each mark rear end are independently measured) is estimated. Such a case that both of the jitter between the mark front end and the front end and the jitter between the mark rear end and the rear end are less than a reference value and the jitter value is scarcely changed is represented by ⊚. Such a case that although the jitter value is changed, the jitter value itself remains less than the reference value is represented by ○. Such a case that after 100,000-time repeating, the jitter slightly exceeds the reference value is represented by Δ. Such a case that after 10,000-time repeating, the jitter value already exceeds the reference value is represented by X. The power for estimate is set to a higher value by about 10% than a lowest limit jitter value, where the lowest limit jitter value denotes the value when an initial jitter value satisfies the value less than 12.8%.

According to a second estimate item, after 100,000-time repeating in the above experimental track, the amplitude value is observed, and the result is estimated. Such a case that less change is found is represented by ⊚. Such a case that about 10% change is found is represented by ○. Such a case that about 20% change is found is represented by Δ. Such a case that the amplitude value is reduced to more than 20% is represented by X.

A third estimate item is a weather-proof. After the disks are left to stand under a high-temperature (90° C.) and high-humidity (80%RH) environment for 200 hours and for 400 hours, the disks are examined with a microscope. Such a case that no change is found even after 400 hours is represented by ⊚. Such a case that a slight peeling, etc. is found after 200 hours is represented by ○. Such a case that a slight peeling is observed in 200 hours is represented by Δ. Such a case that a large peeling is observed within 200 hours is represented by X.

The above experimental results are shown in Table 2. Thus, the structure according to the present invention is superior to the conventional structure in view of the repeating characteristic and the weatherproof.

Next, in order that the effect of the barrier layer relative to the erasure performance is confirmed, the result of a comparative test is shown. A disk (D) comprising the structure shown in FIG. 3B in which the barrier layer is used only at the reflecting layer side of the recording layer in Table 1, and a disk (E) comprising the structure shown in FIG. 3C in which the barrier layer is used at both sides of the recording layer are produced by the above method. The disks (D) and (E) are initialized. The composition of the reflecting layer and the recording layer is same as that of the disks (A) and (B).

The disks (D1) and (D2) comprise a laminated-layer structure, in which a ZnS—$SiO_2$ protective layer (86 nm), a Ge—Sb—Te recording layer (20 nm), a Ge—N or Ge—N—O barrier layer (5 nm), a ZnS—$SiO_2$ protective layer (18 nm) and an Al—Cr reflecting layer (150 nm) on the substrate. The disks (E1) and (E2) comprise a laminated-layer structure, in which a ZnS—$SiO_2$ protective layer (86 nm), a Ge—N or Ge—N—O barrier layer (5 nm), a Ge—Sb—Te recording layer (20 nm), a Ge—N or Ge—N—O barrier layer (5 nm), a ZnS—$SiO_2$ protective layer (12 nm), and an Al—Cr reflecting layer (150 nm).

Here, when the Ge—N layer or the Ge—N—O layer is formed at the reflecting layer side of the recording layer, compared to the case that the Ge—N layer or the Ge—N—O layer is formed at the substrate side, the pressure ratio of the $N_2$ gas relative to Ar gas is reduced. The gas is introduced at the ratio of 80% Ar gas to 20% $N_2$ gas, or in the ratio of 80% Ar gas to 19.5% $N_2$ gas to 0.5% $O_2$ gas. The sputtering is carried out at the total pressure of 20 mTorr. As a result, the average composition of the Ge—N layer at the reflecting layer side is $Ge_{65}N_{35}$, and the composition of the Ge—N—O layer at the reflecting layer side is $Ge_{60}N_{30}O_{10}$.

The disks (A) to (E) are rotated at the linear rate 6 m/s, and the result is recorded according to the above method. Here, a single signal having a 3T mark length is recorded. And after C/N ratio is measured, immediately the overwrite of a 11T signal is recorded. Thereby the 3T signal is erased, and a damping factor ratio (a degree of erasure) is measured. Next, after another signal is recorded, the disks are left to stand in a dryer at 90° C., the overwrite of the 11T signal is recorded, and the degree of erasure is measured. The leaving time is two conditions, that is, 100 hours and 200 hours. The result is shown in Table 3.

In Table 3, ⊚ denotes that a sufficiently high erasure ratio more than 35 dB is obtained. ○ denotes that the erasure ratio more than 30 dB is obtained. Δ denotes that the erasure ratio more than 26 dB is obtained. X denotes that the erasure ratio is reduced to less than 26 dB. Thereby, the Ge—N barrier layer or the Ge—N—O barrier layer is applied, thereby the erasure performance is enhanced. More specifically, when the barrier layer is formed at the reflecting layer side of the recording layer, a higher effect can be obtained.

TABLE 2

Result 1 of comparing the characteristics of the optical disk applying the barrier layer according to the present invention to those of the prior art

| | Estimate Items | | |
|---|---|---|---|
| Disk | Jitter | Signal Amplitude | Weather-proof (Peeling, etc.) |
| A1 | ⊚ | ⊚ | ⊚ |
| A2 | ⊚ | ⊚ | ⊚ |
| B | Δ | Δ | ⊚ |
| C | ○ | ○ | X |

TABLE 3

Result 2 of comparing the characteristics of the optical disk applying the interface layer according to the present invention to those of the prior art

| | Estimate Items | | |
|---|---|---|---|
| Disk | Immediately After | 100H | 200H |
| A1 | ⊚ | ○ | Δ |
| A2 | ⊚ | ○ | Δ |
| B | ⊚ | Δ | X |

TABLE 3-continued

Result 2 of comparing the characteristics of the
optical disk applying the interface layer according
to the present invention to those of the prior art Estimate Items

| Disk | Immediately After | 100H | 200H |
|---|---|---|---|
| C | ⊚ | Δ | X |
| D1 | ⊚ | ⊚ | ○ |
| D2 | ⊚ | ⊚ | ○ |
| E1 | ⊚ | ⊚ | ⊚ |
| E2 | ⊚ | ⊚ | ⊚ |

Figure 9:
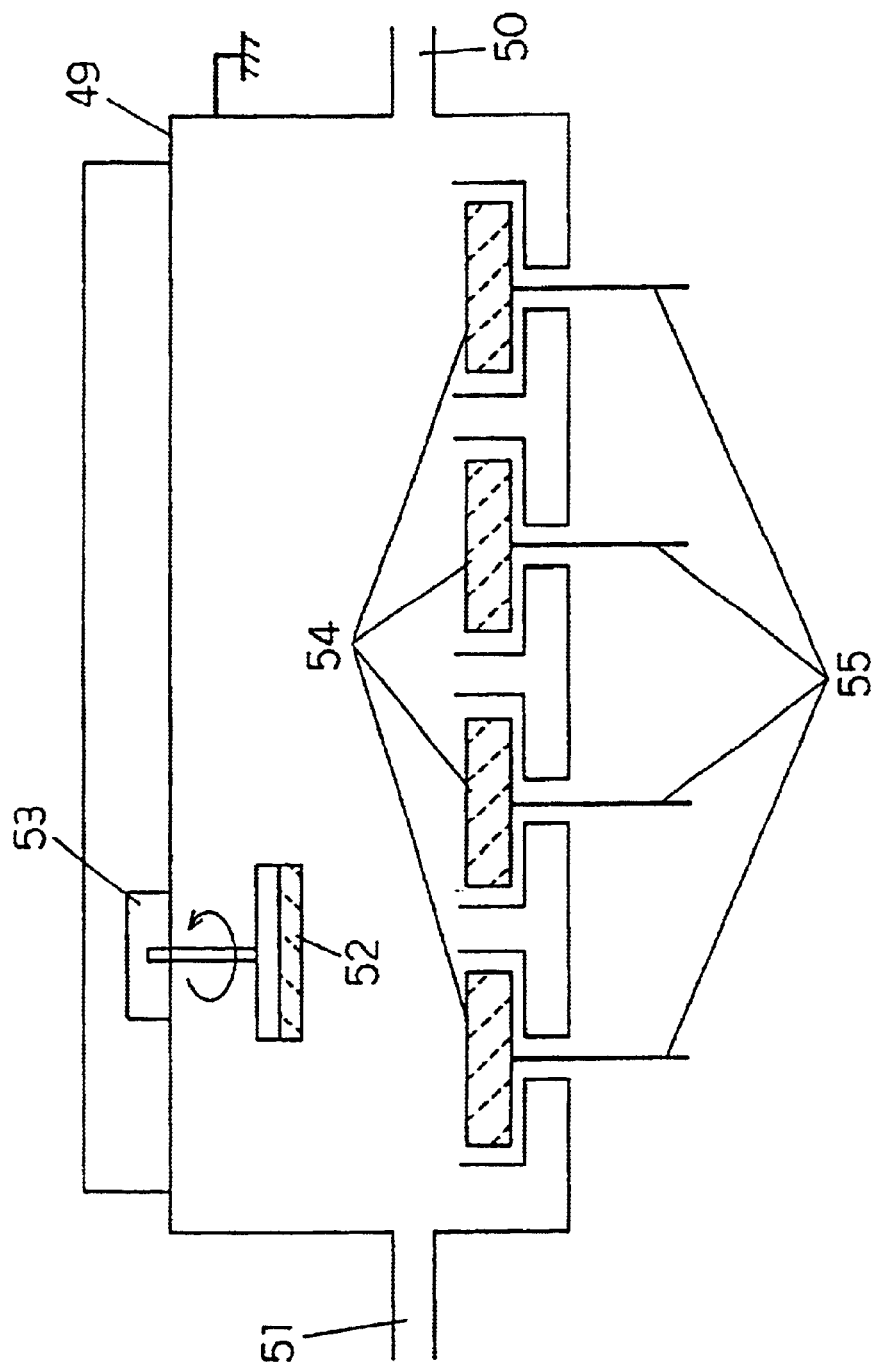
FIG. 9 shows another structure of apparatus of preparing the optical information recording medium by using the present invention.

Henceforth, according to more detailed experimental data, the present invention will be explained in detail. FIG. 9 schematically shows a film formation apparatus used for the following experiment. A vacuum pump (not shown) is connected to a vacuum container 49 through an air outlet 50 so that a high vacuum can be kept in the vacuum container 49. From a gas supplying opening 51, the Ar gas, the nitrogen gas, the oxygen gas or the mixed gas of them can be appropriately provided at a constant flow rate on demand. A numeral 52 denotes a substrate. The substrate 52 is mounted to a drive apparatus 53 for rotating the substrate 52. A numeral 54 denotes a sputter target. The sputter target 54 is connected to a negative electrode 55. Here, a disc-shaped material having a diameter of 10 cm and a thickness of 6 mm is used as the target. The negative electrode 55 is connected to a direct current power source or a high-frequency power source through a switch (not shown). Furthermore, the vacuum container 49 is grounded, thereby the vacuum container 49 and the substrate 52 are kept a positive electrode.

Figure 17:
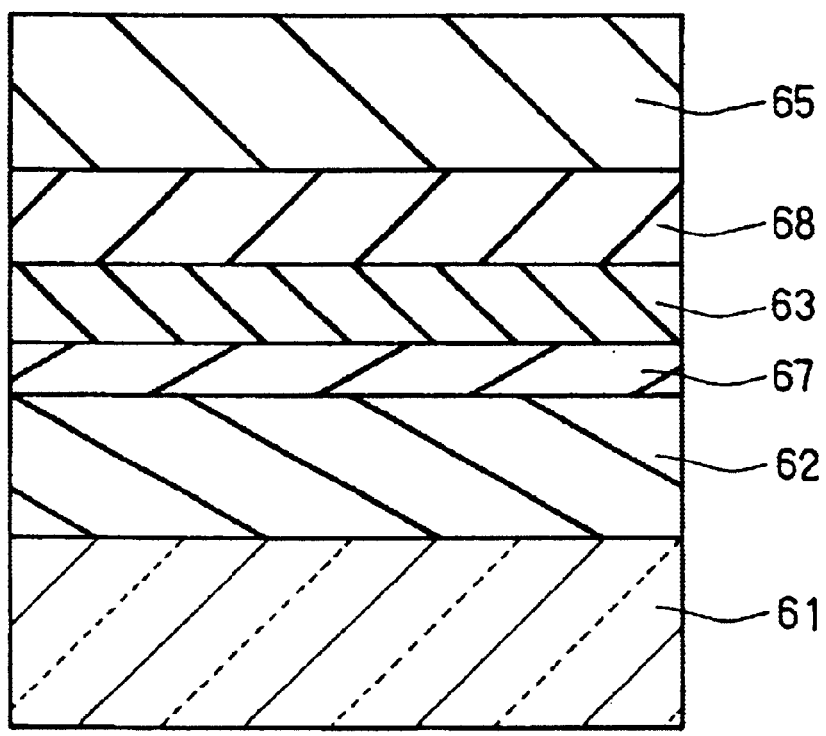
FIG. 17 is a cross-sectional view illustrating an exemplary structure of a layer of an optical information recording medium of the present invention.

FIG. 17 shows an exemplary structure of a layer of an optical information recording medium of the present invention. This optical information recording medium includes a protective layer 62, a first diffusion preventing layer (Ge-containing layer) 67, a recording layer 63, a second diffusion preventing layer (Ge-containing layer) 68, and a reflection layer 65, which are laminated on a substrate 61 in this order.

Optical information can be recorded, erased and reproduced on the recording layer 63.

The diffusion preventing layer is preferably formed on at least one surface of the recording layer 63. The diffusion preventing layers 67 and 68 are formed for the purpose of preventing atoms from diffusing between the recording layer 63 and layers adjacent to the recording layer 63. When the protective layer comprises sulfur or a sulfide, the diffusion preventing layer is particularly effective to prevent these components from diffusing. Although the diffusion preventing layer can be formed on either one surface or both faces of the recording layer 63, it is preferable to form on both faces of the recording layer in order to prevent atoms from diffusing between the layers more effectively, as shown in FIG. 17. When the diffusion preventing layer is formed on only one surface of the recording layer, it is preferable to form the diffusion preventing layer on the side that has a larger load of heat at the recording layer interface, namely, on the side where the temperature-rise at the recording layer interface at the time of marking and erasing is large. This is generally the side the laser beams strike.

The components included in the diffusion preventing layer may diffuse to the recording layer after recording information repeatedly. However, the selection of a suitable composition of a material for the diffusion preventing layer that hardly interferes with a change in the optical characteristics of the recording layer can prevent a harm caused by such diffusion.

In this embodiment, the diffusion preventing layers 67 and 68 are mainly composed of GeXN or GeXON, where X represents at least one element selected from the group consisting of elements belonging to Groups IIIa, IVa, Va, VIa, VIIa, VIII, Ib and IIb, and C. X is not particularly limited, but X is preferably at least one element selected from the group consisting of Ti, V, Cr, Mn, Cu, Zn, Zr, Nb, Mo, Pd, Ag, Cd, Hf, Ta, W, Fe, Co, Ni, Y, La and Au, more preferably at least one element selected from the group consisting of Cr, Mo, Mn, Ti, Zr, Nb, Ta, Fe, Co, Ni, Y and La, and further more preferably at least one element selected from the group consisting of Cr, Mo, Mn, Ni, Co and La.

The reason why the addition of X improves the durability of the medium is believed to be that the added X suppresses the introduction of moisture into the diffusion preventing layer, although this is not firmly confirmed. A possible mechanism is as follows. In a GeN or GeON layer, Ge—N bonds change to Ge—O or Ge—OH bonds under the conditions of high temperature and high humidity and are ready to corrode. When X that is oxidized relatively easily is added to the layer, the phenomenon of oxidation or hydration of Ge is suppressed. It is also possible that the production of dangling bonds of Ge present in a GeN or GeON layer is suppressed by the addition of X, and thus the formation of Ge—OH bonds is suppressed. It is believed that this is the reason why preferable examples of X are Cr; Mo, Mn, Ti, Zr, Nb, Ta, Fe, Co, Ni, Y and La (further more preferably Cr, Mo, Mn, Ni, Co and La).

These diffusion preventing layers 67 and 68 differ from conventional layers including a nitride such as boron nitride, aluminum nitride, silicon nitride or the like, in that the diffusion preventing layers 67 and 68 comprise a nitride or a nitrogen oxide of germanium as the basic component. The conventionally used nitride provides poor adhesiveness between the diffusion preventing layer and the recording layer or the substrate due to the internal stress, the slip property or the like. On the other hand, germanium nitride or germanium nitrogen oxide provides good adhesiveness with the recording layer or the like and has an effect of suppressing the movement of elements. The addition of the above-described X to such germanium nitride (nitrogen oxide) provides the diffusion preventing layers 67 and 68 with better durability and characteristics in repetitive recording.

However, the optical information recording medium is not limited to the structure as described above but can have other structures. For example, the protective layer 62 can be formed of the material of the diffusion preventing layer 67; a layer formed of another material (e.g., a semiconductor such as Si or Ge, a metal such as Cr, Mo or Nb, a variety of dielectrics, combinations thereof or the like) can be formed between the diffusion preventing layer 68 and the reflection layer 65; a dielectric layer can be formed in a relatively large thickness between the diffusion preventing layer 68 and the reflection layer 65, which is a so-called annealing structure; a reflection layer need not to be formed; the reflection layer can be composed of two layers; or another film made of another material can be formed between the substrate 61 and the protective layer 62. Any of these structures and others can make use of the present invention.

The substrate 61 is preferably formed of a resin such as polycarbonate, PMMA or glass and preferably includes a guiding groove for guiding laser beams.

The protective layer 62 is formed for the purpose of protecting the recording layer, improving the adhesiveness with the substrate, adjusting the optical characteristics of the medium or the like. The protective layer 62 is preferably formed of a dielectric such as a sulfide such as ZnS, an oxide such as $SiO_2$, $Ta_2O_5$ or $Al_2O_3$, a nitride such as $Ge_3N_4$, $Si_3N_4$ or AlN, a nitrogen oxide such as GeON, SiON or AlON, a carbide, a fluoride or the like, or combinations thereof (e.g., ZnS—$SiO_2$).

The reflection layer 65 is preferably formed of a metal such as Au, Al, Cr, Ni or the like, or an alloy of metals suitably selected from these metals.

The recording layer 63 is preferably formed of a phase-changeable material such as a Ge—Sb—Te based material, a Te—Sn—Ge based material, a Te—Sb—Ge—Se based material, a Te—Sn—Ge—Au based material, an Ag—In—Sb—Te based material, an In—Sb—Se based material, an In—Te—Se based material, more specifically, an alloy of each material. The recording layer 63 is preferably formed of a phase-changeable material comprising Te, Se or Sb as the main component, and more preferably a phase-changeable material comprising three elements of Ge, Te and Sb as the main component.

The thickness of the recording layer 63 is preferably in the range from 5 nm to 25 nm. When the thickness is less than 5 nm, the recording material is hardly formed into a layer. When the thickness is more than 25 nm, heat transfer becomes large in the recording layer, so that erasion is likely to occur in adjacent portions during high-density recording.

The recording layer 63 may comprise impurities such as sputtering components such as Ar, Kr, or the like, or H, C, $H_2O$ or the like, but it does not matter even if impurities are included, as long as the object of the present invention can be achieved. Furthermore, the diffusion preventing layers 67 and 68 and the protective layer 62 may comprise impurities such as sputtering components such as Ar, Kr, or the like, or H, C, $H_2O$ or the like, as in the case of the recording layer 63, but it does not matter even if impurities are included, as long as the object of the present invention can be achieved.

Hereinafter, the diffusion preventing layers 67 and 68 will be detailed.

The composition of the diffusion preventing layer is preferably represented by $(Ge_{1-y}X_y)_gO_hN_i$, where $g>0$, $h \geq 0$, $i>0$, and $g+h+i=100$; and y is a value larger than 0 and smaller than 1, preferably 0.5 or smaller for the reason discussed later.

Figure 18:
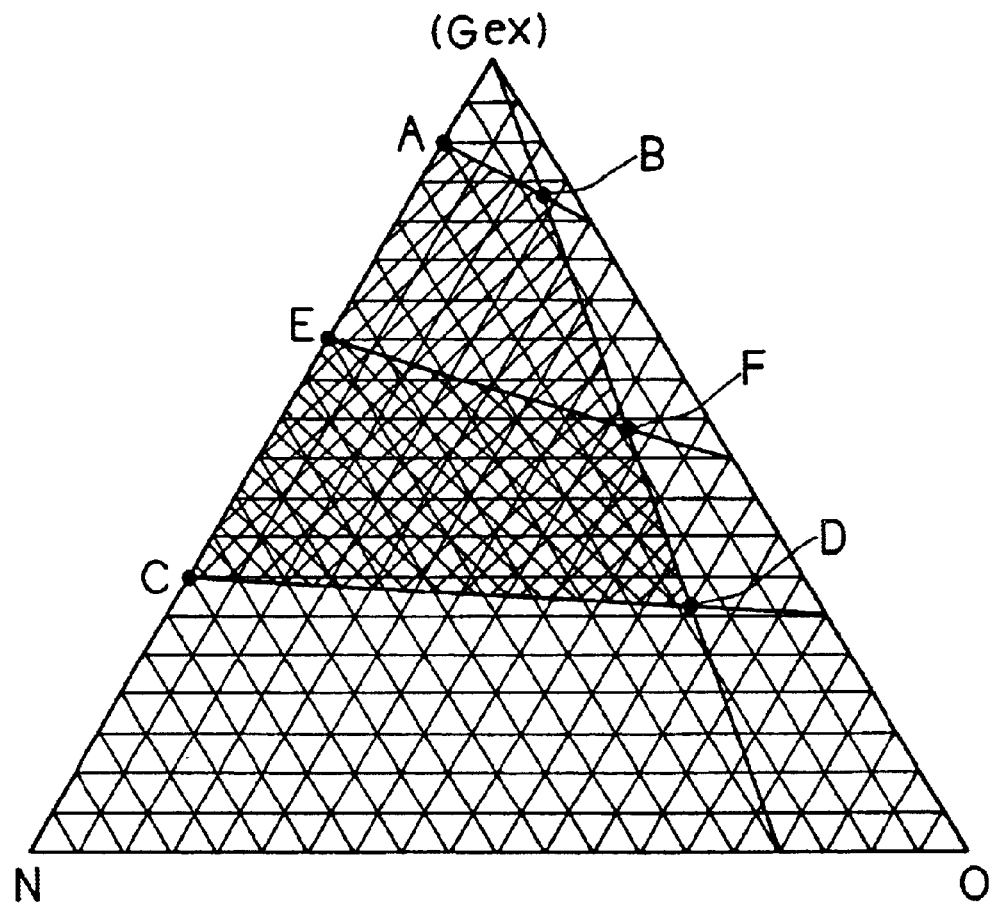
FIG. 18 is a ternary phase diagram of (GeX), O and N showing a preferable composition range of a diffusion preventing layer in the optical information recording medium of the present invention.

In order to reduce excess atoms, the composition ratio of (GeX), O and N in the diffusion preventing layers 67 and 68 preferably has numerical values which lie within the range represented by the area ABDC in the ternary phase diagram of (GeX), O and N of FIG. 18, where the points A, B, C and D are as follows:

A $((GeX)_{90.0}O_{0.0}N_{10.0})$, B $((GeX)_{83.4}O_{13.3}N_{3.3})$,
C $((GeX)_{35.0}O_{0.0}N_{65.0})$, D $((GeX)_{31.1}O_{55.1}N_{13.8})$, and more preferably the area EFDC in the ternary phase diagram of FIG. 18, where additional points E and F are as follows:
E $((GeX)_{65.0}O_{0.0}N_{35.0})$, F $((GeX)_{53.9}O_{9.20}N_{36.9})$, where (GeX) represents the total amount of Ge and X.

Since the diffusion preventing layer is susceptible to heat load during repetitive recording, the composition ratio in this layer is preferably within the range represented by the area EFDC (in order words, a stoichiometric composition in the vicinity of $Ge_3N_4$—$GeO_2$ line in the ternary phase diagram). On the other hand, it is preferable not to comprise excess N or O in the composition ratio of the diffusion preventing layer 68 in view of the adhesiveness with the recording layer. Therefore, the composition ratio is preferably slightly on the side of the apex of GeX than the $Ge_3N_4$—$GeO_2$ line.

When Ge or X that is not bonded to nitrogen or oxygen is present excessively, the excess Ge or X diffuses to the recording layer. This may interfere with the change in the optical characteristics of the recording layer. On the other hand, if nitrogen or oxygen that is not bonded to Ge or X is present excessively, the excess atoms of nitrogen and oxygen flood into the recording layer. This may interfere with recording. Therefore, the diffusion preventing layers 7 and 8 preferably have (GeX) at such a composition ratio that X is 50 atom % or less (i.e., $0<y \leq 0.5$ in $Ge_{1-y}X_y$). When the content of X is more than 50 atom % of the content of GeX, the substance X floods into the recording layer after repeated recording, and this tends to interfere with the change in the optical characteristics of the recording layer. For the same reason, the content of X is more preferably 40 atom % or less of the content of GeX, and most preferably 30 atom % or less. On the other hand, the content of X is preferably 10 atom % or more of the content of GeX. The content of X of less than 10 atom % may not provide as useful an effect from the addition of the substance X.

The thickness of the diffusion preventing layer is preferably 1 nm or more. The thickness of less than 1 nm reduces the effect as the diffusion preventing layer. The upper limit of the thickness of the diffusion preventing layer, for example the diffusion preventing layer on the side closer to irradiation of laser beams than the recording layer, is in the range where a sufficient intensity of laser beams so as to record information in or reproduce information from the recording layer can be obtained. The intensity of the laser beams can be suitably set depending on the laser power or the material used for the recording layer.

In the case where the diffusion preventing layers are formed in contact with both faces of the recording layer, it is preferable to use diffusion preventing layers having different compositions. For example, since the layer on the surface on which laser beams are incident is susceptible to the load of heat during repetitive recording, the layer preferably has a smaller content of X than the layer on the opposite surface. Furthermore, the layer formed immediately after the formation of the recording layer has a lower adhesiveness than the layer formed immediately before the formation of the recording layer. Therefore, it is preferable that the diffusion preventing layer formed immediately after the formation of the recording layer has a larger content of X than the layer formed immediately before the formation of the recording layer. Therefore, in the case where the diffusion preventing layer on the surface on which laser beams are incident has a composition represented by $(Ge_{1-m}X_m)_aO_bN_c$ ($a>0$, $b \geq 0$, $c>0$, $0<m<1$, preferably $0<m \leq 0.5$), and the diffusion preventing layer on the opposite surface has a composition represented by $(Ge_{1-n}X_n)_dO_eN_f$ ($d>0$, $e \geq 0$, $f>0$, $0<n<1$, preferably $0<n \leq 0.5$), m is preferably smaller than n. In the case where the diffusion preventing layer is formed in contact with the substrate, in order to improve adhesiveness between the substrate and the diffusion preventing film, it is preferable to form the diffusion preventing layer of a material comprising oxygen or to increase the content of oxygen at the interface between the diffusion preventing layer and the substrate.

Figure 19:
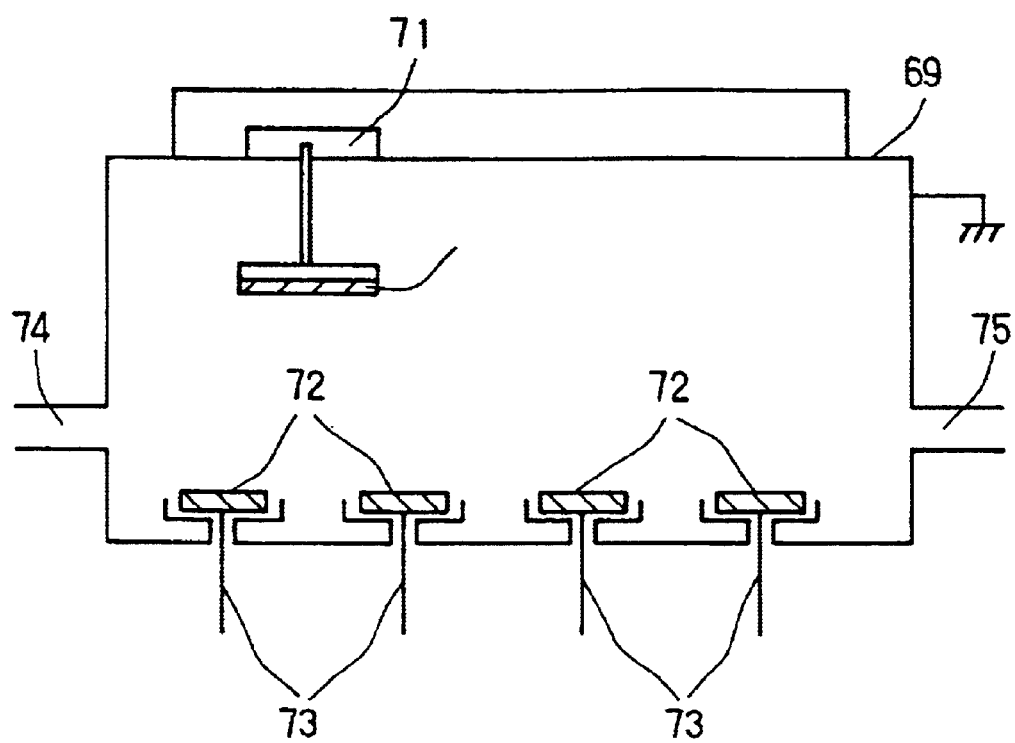
FIG. 19 is a view illustrating an exemplary film-forming apparatus of the optical information recording medium of the present invention.

Next, a method for producing the optical information recording medium of the present invention will be described. A multilayer structure forming the optical information recording medium can be produced by sputtering, a vacuum evaporation method, a chemical vapor deposition (CVD) method or the like. In this embodiment, sputtering is used. FIG. 19 is a schematic view showing an exemplary film-forming apparatus.

A vacuum pump (not shown) is connected to a vacuum container 69 through an air outlet 75 so that a high degree of vacuum can be maintained in the vacuum container 69. A constant flow rate of Ar, nitrogen, oxygen or a mixed gas thereof can be supplied from a gas supply inlet 74. A substrate 70 is attached to a driving apparatus 71 for revolving the substrate 70. Each sputtering target 72 is connected to a cathode 73. The shape of the target is, for example, a disk having a diameter of about 10 cm and a thickness of about 6 mm. The cathode 73 is connected to a direct current power source or a high frequency power source (not shown) through a switch. Furthermore, the vacuum container 69 is grounded so that the vacuum container 69 and the substrate 70 are utilized as anodes.

In the process for producing the optical information recording medium performed by using such an apparatus, a diffusion preventing layer is formed before and/or after a process for forming a recording layer.

As a target for forming the recording layer 63, for example, a GeTeSb target can be used.

When the diffusion preventing layers 67 and 68 are formed by reactive sputtering, a film with good quality can be obtained. It is preferable to use an alloy of Ge and X or a mixture of Ge and X. Moreover, nitrogen can be included in the target. For example, in the case where GeCrN is formed as a diffusion preventing layer, a GeCr target or a GeCr target further provided with N can be used. Furthermore, it is preferable to use a mixed gas of rare gas and nitrogen ($N_2$) as a film-forming gas. A mixed gas of rare gas and gas containing nitrogen atoms such as $N_2O$, $NO_2$, NO, $N_2$ or a mixture thereof can be used as a film-forming gas. Furthermore, in order to avoid a rigid film or a film having a large stress, it is preferable to add a trace of oxygen to the film-forming gas. A film with good quality may be obtained. The total pressure of the film-forming gas is preferably 1.0 mTorr or more.

Furthermore, the partial pressure of nitrogen is preferably 10% or more of the total pressure of the film-forming gas, because an excessively low partial pressure makes it difficult to form a nitride and thus difficult to form a nitride having a desired composition. A preferable upper limit of the partial pressure is in the range that provides stable discharge, for example, about 60%.

Next, a method for reproducing and erasing information recorded in the thus obtained optical information recording medium of the present invention will be described.

For reproducing and erasing signals, a semiconductor laser light source, an optical head including an object lens, a driving apparatus for guiding laser beams to a predetermined position for irradiation, a tracking control apparatus and a focusing control apparatus for controlling a position orthogonal to a track direction and a surface of a film, a laser driving apparatus for adjusting laser power, and a rotation control apparatus for rotating the medium are used. These apparatuses are conventionally used by those skilled in the art.

For recording and erasing signals, laser beams are focused on a microspot by an optical system, and the medium rotated by the rotation control apparatus is irradiated with the laser beams. Herein, a power level for the formation of an amorphous state that allows a portion in the recording layer to reversibly change to an amorphous state by irradiation of laser beams is represented by $P_1$. A power level for the formation of a crystalline state that allows a portion in the recording layer to reversibly change to a crystalline state by irradiation of laser beams is represented by $P_2$. By adjusting the power of the irradiated laser beams between $P_1$ and $P_2$, marks are recorded or erased portions are formed, and recording, erasing or overwriting information can be performed selectively. In this embodiment, a so-called multiple pulse, where pulse trains are formed in a portion irradiated with laser beams having a power level of $P_1$, is formed. However, other types of pulse than the multiple pulse can be used.

On the other hand, signals from the medium obtained by irradiating the medium with laser beams having a power level $P_3$ are read by a detector so as to reproduce the information signals. Herein, $P_3$ is a reproduction power level lower than the power levels $P_1$ and $P_2$, and the irradiation of laser beams having $P_3$ does not influence the optical state of the recorded marks and provides a sufficient reflectance so as to reproduce the recorded marks from the medium.

Examples of the conditions are as follows: the wavelength of the laser beams is 650 nm; the numerical aperture of the used object lens is 0.60; the signal system is an EFM modulation system; the minimum bit length is 0.41 μm; the scanning speed of the laser beams in the track direction is 6 m/s; the track pitch is 1.48 μm, i.e., a groove and a land (a portion between grooves) are alternately formed at every 0.74 μm on a substrate. However, a substrate may include grooves and lands formed at a different width ratio.

In the method for using the optical information recording medium, the conditions are not limited to those described above.

Furthermore, it is preferable to perform so-called "land-groove recording" where recording, reproducing and erasing information signals are performed in both the groove portion and the land portion in a guiding groove, because this allows a medium to have a large capacity. In this case, it is necessary to form a suitable depth and shape of the guiding groove and a structure having a suitable reflectance of the medium so that cross-talk or cross-erase does not occur.

EXAMPLE 1

The optical disks having the layer structure shown in FIGS. 3A and 3B (a disk (1) and a disk (3) in a table 4) are made on a experimental basis. The recording layer 3 comprises a phase change material whose main component is a Ge2Sb2.3Te5 alloy, and the dielectric protective layers 2 and 4 comprises a $ZnS$—$SiO_2$ film. When the film is formed, the gas is supplied in such a manner that each total pressure of the Ar gas becomes 1.0 mTorr and 0.5 mTorr, respectively, and each of the powers DC1.27 W/cm$^2$ and RF6.37 W/cm$^2$ is introduced into the negative electrode 55, respectively. Furthermore, when the reflecting layer (AlCr) 5 is formed, the Ar gas is supplied in such a manner that the total pressure becomes 3.0 mTorr, thereby the power DC 4.45 W/cm$^2$ is introduced.

In the disk (1), after the dielectric protective layer is formed, sequentially, the barrier layer 8 is formed. In the disk (3), after the recording layer 3 is formed, sequentially, the barrier layer 8 is formed. In this case, Ge is used as the target, and the mixture of Ar and nitrogen is used as the sputter gas. Furthermore, the sputter gas pressure is 20 mTorr, the partial pressure ratio of Ar to nitrogen in the sputter gas is 2:1, and the sputter power is RF700 W. Since the target is a disc whose diameter is 10 cm, converted into a sputter power density, the sputter power density is 6.37 W/cm$^2$.

The film thickness of each layer is as follows: the disk (1) comprises the dielectric protective layer 2 having 86 nm, the barrier layer 8 having 5 nm, the recording layer 3 having 20 nm, the dielectric protective layer 4 having 17.7 nm and the reflecting layer 5 having 150 nm, and the disk (3) comprises the dielectric protective layer 2 having 91 nm, the recording layer 3 having 20 nm, the barrier layer 8 having 10 nm, the dielectric protective layer 4 having 15.2 nm and the reflecting layer 5 having 150 nm. As a comparative example, the conventional structure shown in FIG. 1 (a disk (0)) having no barrier layer is similarly produced, and it is compared to the disks (1) and (3). The disk (0) is provided with the dielectric protective layers 2 and 4 comprising the mixture of ZnS and SiO$_2$, and each layer film thickness is 91 nm and 17.7 nm, respectively. Furthermore, the recording layer 3 comprising a Ge2Sb2.8Te5 alloy has the film thickness of 20 nm. The reflecting layer 5 comprising AlCr has the film thickness of 150 nm.

The repeating characteristic of the disks (1), (3), (0) is shown in Table 4. In Table 4, the repeating record characteristic is examined by the following method. That is, as described above, the EFM signal system is used. When the shortest mark length becomes 0.61 µm, the marks 3T to 11T are recorded. The value resulted from dividing the jitter value between each front end and the jitter value between each rear end by the window width T (henceforth, referred to as the jitter value) is examined. As a result, the case that after 150,000-time repeating record, both of the jitter value between the front ends and the jitter value between the rear ends do not exceed 13% is represented by ⊚. The case that after 150,000-time repeating, although at least either the jitter value between the front ends or the jitter value between the rear ends exceeds 13%, after 100,000-time repeating, both of them do not exceed 13% is represented by ○. The case that after 100,000-time repeating, at least either the jitter value between the front ends or the jitter value between the rear ends exceeds 13% is represented by X. Thereby, in the disk provided with the barrier layer 8 having the structure according to the present invention, compared to the prior art, the repeating characteristic is enhanced.

EXAMPLE 2

All the protective layers at the substrate side of the disk (1) in Table 4 in the example 1 are changed to the Ge—N layer or the Ge—N—O layer, thereby a disk (5) is formed (accordingly, the Ge—N protective layer or the Ge—N—O protective layer whose thickness is 91 nm is formed at the substrate side of the recording layer). Furthermore, all the protective layers at the reflecting layer side of the disk (3) in Table 4 are changed to the Ge—N layer or the Ge—N—O layer, thereby a disk (6) is formed (accordingly, the Ge—N protective layer or the Ge—N—O protective layer whose thickness is 25.2 nm is formed at the reflecting layer side of the recording layer). The repeating characteristic of disks (5) and (6) is examined by the same method as the example 1. Both of them can similarly obtain the result ⊚. That is, the Ge—N layer or the Ge—N—O layer can be formed in such a manner that the Ge—N layer or the Ge—N—O layer can obtain a thickness necessary for the protective layer. Furthermore, even in this case, the excellent repeating performance can be obtained.

EXAMPLE 3

Next, the recording layer 3 comprises a phase change material whose main component is a Ge2Sb2.3Te5 alloy, when the barrier layer 8 is formed, Sb is used as the target, and the mixture of Ar and nitrogen is used as the sputter gas. On the above condition, the films comprising the structure shown in FIGS. 3A and 3B are formed (a disk (2), a disk (4)). In this case, the film thickness of each layer is same as the thickness in the above case that Ge is used as the target. The spatter gas pressure of the barrier layer 8 is 20 mTorr, and the partial pressure ratio of Ar to nitrogen in the sputter gas is 3 to 1. In this case, the result of the repeating characteristic is shown in disk numbers (2) and (4) in Table 4.

According to Table 4, compared to the case that Ge is used as the target so that the film is formed, although the number of repeatable times is inferior, better repeating characteristic can be obtained than the comparative example.

TABLE 4

Result 3 of comparing the characteristics of the optical disk applying the barrier layer according to the present invention to those of the prior art

Figure 1:
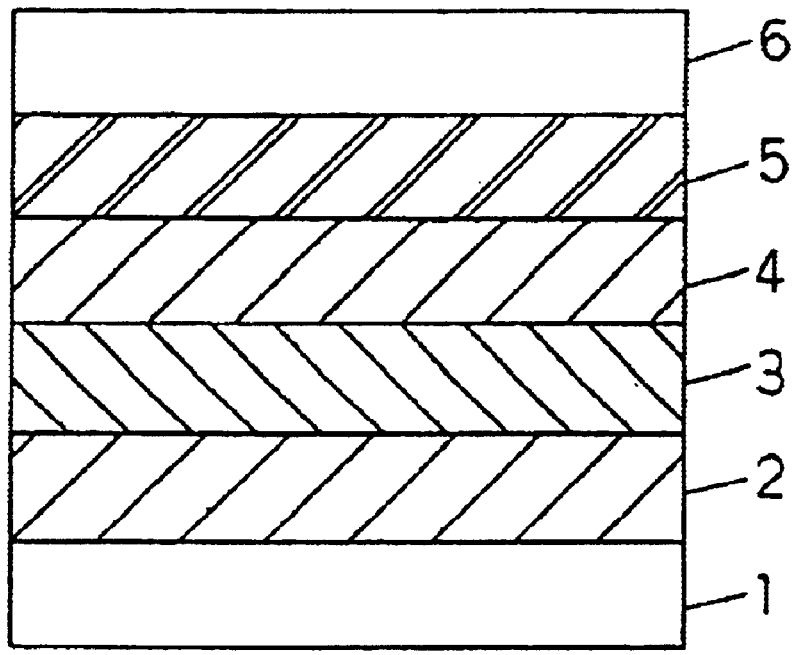
FIG. 1 is a cross-sectional view showing a conventional structure of a phase change optical recording medium comprising four layers.

| Disk Number | Layer Structure | Target of the Barrier Layer | Repeating Characteristic |
|---|---|---|---|
| (0) | FIG. 1 | No Target | X |
| (1) | FIG. 3A | Ge | ⊚ |
| (2) | FIG. 3A | Sb | ○ |
| (3) | FIG. 3B | Ge | ⊚ |
| (4) | FIG. 3B | Sb | ○ |

EXAMPLE 4

Next, when the layer structure is constructed as shown in FIG. 3A, and Ge is used as the target for forming the barrier layer 8, the range of the film formation condition which can obtain a better characteristic is examined.

According to the embodiment, the total sputter gas pressure is constantly set to 20 mTorr, and the partial pressure ratio of Ar and nitrogen in the sputter gas has three kinds of ratio, that is, 2:1, 1:1 and 1:2. The sputter power of Ge is RF100 W, 300 W, 500 W, 700 W, 710 W, 750 W, 1 kW, 1.5 kW and 2 kW. That is, since the target is the disc whose diameter is 10 cm, when the sputter power is converted into the power density, the respective sputter powers are changed to 1.27 W/cm$^2$ 3.82 W/cm$^2$, 6.37 W/cm$^2$, 8.91 W/cm$^2$, 9.04 W/cm$^2$, 9.55 kW/cm$^2$, 12.7 kW/cm$^2$ 19.1 kW/cm$^2$ and 25.5 W/cm$^2$, respectively. Thereby, the film is formed, and the characteristic of the disks is examined. When the partial ratio of Ar and nitrogen is changed to 2:1, 1:1 and 1:2, respectively, the flow rate of nitrogen is constantly set to 50 sccm, and the flow rate of Ar is changed to 100 sccm, 50 sccm and 25 sccm corresponding to the flow rate of nitrogen 50 sccm. The main valve of the vacuum pump is throttled, thereby the sputter gas total pressure is set to 20 mTorr.

The layer structure is constructed similarly to the disks (1) and (2). The film thickness of each layer is as follows. The dielectric layer 2 is 86 nm, the barrier layer 8 is 5 nm, the recording layer 3 is 20 nm, the dielectric layer 4 is 17.7 nm and the reflecting layer 5 is 150 nm. The repeating characteristic is examined by the method shown in the example 1. The result is shown in Table 5. Furthermore, the adhesiveness is adopted as the estimate item of the weather-proof. The acceleration test is carried out at 90° C. at 80%, a sampling is carried out in 100 hours, 150 hours and 200 hours, and the sample is observed with an optical microscope in order to find whether the peeling exists or not. The result is shown in Table 6A. In this case, the generated peeling is substantially ranging from 1 µm to 10 µm. ⊚ denotes the case that the sampling after 200 hours is not peeled at all. ○ denotes the case that although the sampling after 100 hours and 150 hours is not peeled, the sampling after 200 hours is peeled, even if slightly. Δ denotes the case that although the sampling after 100 hours is not peeled, the sampling after 150 hours is peeled, even if slightly. X denotes the case that the sampling after 100 hours is peeled, even if slightly.

TABLE 5

Relationship between a film formation condition of a barrier layer applied to a substrate side of a recording layer and a cycle performance

| Sputter Power | (Ar partial pressure):(Nitrogen partial pressure) | | |
|---|---|---|---|
| (W) | 2:1 | 1:1 | 1:2 |
| 100 | X | X | X |
| 300 | ○ | ○ | X |
| 500 | ○ | ○ | X |
| 700 | ○ | ○ | X |
| 710 | ○ | ○ | ○ |
| 750 | ○ | ○ | ○ |
| 1000 | ○ | ○ | ○ |
| 1500 | ○ | ○ | ○ |
| 2000 | ○ | ○ | ○ |

TABLE 6A

Relationship between a condition of forming a film of a barrier layer applied to a substrate side of a recording layer and a weatherproof

| Sputter Power | (Ar partial pressure):(Nitrogen partial pressure) | | |
|---|---|---|---|
| (W) | 2:1 | 1:1 | 1:2 |
| 100 | ○ | ○ | X |
| 300 | ○ | ○ | X |
| 500 | ○ | ○ | X |
| 700 | ⊙ | ○ | X |
| 710 | ⊙ | ⊙ | Δ |
| 750 | ⊙ | ⊙ | ○ |
| 1000 | ⊙ | ⊙ | ○ |
| 1500 | ⊙ | ⊙ | ⊙ |
| 2000 | ⊙ | ⊙ | ⊙ |

Thereby, in view of the repeating characteristic, when the sputter power is more than RF300 W, better characteristic can be obtained. In view of the adhesiveness, when the sputter power is more than RF100 W, better good characteristic can be obtained. In either cases, the higher the sputter power becomes, the better the characteristic can be obtained. This reason is that the higher the sputter power becomes, the denser film can be formed.

Relating to the nitrogen partial pressure, in case of (Ar partial pressure):(nitrogen partial pressure)=1:2, better characteristic can be obtained only within the sputter power range more than 710 W. When the nitrogen partial pressure is higher than an appropriate condition, since a surplus nitrogen not combined to Ge exists in the barrier layer, it is assumed that the peeling is generated due to the surplus nitrogen. On the same condition of the nitrogen partial pressure, when the sputter power is increased, there is reduced a possibility that the Ge atom sputtered on the target surface is combined to the nitrogen until the sputtered Ge atom is attached to the substrate surface. Thereby, since a mixture amount of the surplus nitrogen is reduced, it is expected that the region where better characteristic can be obtained exists.

As an analyzing result of the average composition ratio of the barrier layer 8 which can obtain better characteristic, in any case, the average composition ratio of Ge, O and N is within the range surrounded by four composition points shown the three-element composition diagram in FIG. 5, ($Ge_{50.0}N_{50.0}$), G1($Ge_{35.0}N_{65.0}$), G4($Ge_{31.1}N_{13.8}O_{55.1}$), E4($Ge_{42.3}N_{11.5}O_{46.2}$).

In general, when Ge or Ge—N is used as the target and the mixed gas of the rare gas and nitrogen is provided so that the film is formed, there is a tendency that if the sputter power is relatively small, the Ge—N—O film containing a lot of oxygen is formed, and if the sputter power is relatively large, the Ge—N film whose oxygen-content is only an impurity level is formed.

As described above, preferably, the sputter power has the power density more than 1.27 $W/cm^2$. When the power density is more than 3.82 $W/cm^2$, better adhesiveness and recorded repeating characteristic can be obtained In this case, a film formation rate is 18 nm/minute, when Ar partial pressure: nitrogen partial pressure=1:1. Preferably, the film formation rate is 18 nm/minute or more.

EXAMPLE 5

Next, the difference of the disk characteristic is examined according to the difference of the partial pressure ratio of the sputter gas pressure and the nitrogen partial pressure in the sputter gas. Thus, the layer structure comprises the same structure in FIGS. 3A and 3E. Ge is used as the target, and the sputter power is constantly set to RF700 W. When the total pressure of the sputter gas, Ar partial pressure and the nitrogen partial pressure are changed, the characteristic is examined. A FIG. 3A-type disk comprises a ZnS—SiO₂ protective layer whose film thickness is 86 nm, a Ge—N or Ge—N—O barrier layer whose film thickness is 5 nm, a Ge—Sb—Te recording layer whose film thickness is 20 nm, a ZnS—SiO₂ protective layer whose film thickness is 17.7 nm and an AlCr reflecting layer whose film thickness is 150 nm. A FIG. 3E-type disk comprises a ZnS—SiO₂ protective layer whose film thickness is 91 nm, a Ge—Sb—Te recording layer whose film thickness is 20 nm, a Ge—N or Ge—N—O barrier layer whose film thickness is 17.7 nm, and an AlCr reflecting layer whose film thickness is 150 nm.

The repeating characteristic is estimated by the same method as the example 1 to 3. The weather-proof is estimated by the same method as the example 4. Table 6B shows the film formation condition and the estimate result. In Table 6B the disk (0) denotes the conventional disk in the example 1. Furthermore, marks are represented two by two, where the left mark and the right mark correspond to the result of the FIG. 3A-type disk and the result of the FIG. 3E-type disk, respectively.

TABLE 6B

Relationship between a sputter condition of a barrier layer applied to a substrate side of a recording layer and a disk performance

| | Total pressure | Partial pressure | Weather-proof | | Repeating characteristic | |
|---|---|---|---|---|---|---|
| Disk No. | (mTorr) | ratio | 2A | 2E | 2A | 2E |
| (0) | — | — | ⊙ | | X | |
| (5) | 1.0 | 1:2 | X | X | X | X |
| (6) | 3.0 | 1:2 | X | X | X | X |
| (7) | 10.0 | 1:2 | X | X | X | X |
| (8) | 20.0 | 1:2 | X | X | X | X |
| (9) | 30.0 | 1:2 | X | X | X | X |
| (10) | 1.0 | 2:3 | Δ | X | X | X |
| (11) | 3.0 | 2:3 | Δ | X | ○ | ○ |
| (12) | 10.0 | 2:3 | Δ | X | ○ | ○ |
| (13) | 20.0 | 2:3 | Δ | X | ○ | ○ |
| (14) | 30.0 | 2:3 | Δ | X | ○ | ○ |
| (15) | 1.0 | 1:1 | ○ | Δ | X | X |

TABLE 6B-continued

Relationship between a sputter condition of a barrier layer applied to a substrate side of a recording layer and a disk performance

| Disk No. | Total pressure (mTorr) | Partial pressure ratio | Weather-proof 2A | Weather-proof 2E | Repeating characteristic 2A | Repeating characteristic 2E |
|---|---|---|---|---|---|---|
| (16) | 3.0 | 1:1 | ○ | Δ | ○ | ○ |
| (17) | 10.0 | 1:1 | ○ | Δ | ○ | ○ |
| (18) | 20.0 | 1:1 | ○ | Δ | ○ | ○ |
| (19) | 30.0 | 1:1 | ○ | Δ | ○ | ○ |
| (20) | 1.0 | 3:2 | ○ | Δ | ○ | ○ |
| (21) | 3.0 | 3:2 | ○ | Δ | ○ | ○ |
| (22) | 10.0 | 3:2 | ○ | Δ | ○ | ○ |
| (23) | 20.0 | 3:2 | ○ | Δ | ○ | ○ |
| (24) | 30.0 | 3:2 | ○ | Δ | ○ | ○ |
| (25) | 1.0 | 2:1 | ◎ | ○ | X | X |
| (26) | 3.0 | 2:1 | ◎ | ○ | ○ | ○ |
| (27) | 10.0 | 2:1 | ◎ | ○ | ○ | ○ |
| (28) | 20.0 | 2:1 | ◎ | ○ | ○ | ○ |
| (29) | 30.0 | 2:1 | ◎ | ○ | ○ | ○ |
| (30) | 20.0 | 80:20 | ◎ | ◎ | ○ | ○ |
| (31) | 20.0 | 85:15 | ◎ | ◎ | ○ | ○ |
| (32) | 20.0 | 88:12 | ◎ | ◎ | ○ | ○ |
| (33) | 20.0 | 90:10 | ◎ | ◎ | X | ○ |
| (34) | 20.0 | 95:5 | ◎ | ◎ | X | ○ |
| (35) | 20.0 | 100:0 | ◎ | ◎ | X | X |
| (36) | 10.0 | 75:25 | ◎ | ◎ | ○ | ○ |
| (37) | 10.0 | 80:20 | ◎ | ◎ | X | ○ |
| (38) | 10.0 | 85:15 | ◎ | ◎ | X | ○ |
| (39) | 10.0 | 90:10 | ◎ | ◎ | X | X |
| (40) | 10.0 | 100:0 | ◎ | ◎ | X | X |

FIGS. 10 and 11, and FIGS. 12 and 13 show respective cases of the repeating characteristic and the weather-proof. Here, the nitrogen partial pressure is represented by an abscissa axis, and Ar partial pressure is represented by an ordinate axis.

Figure 10:
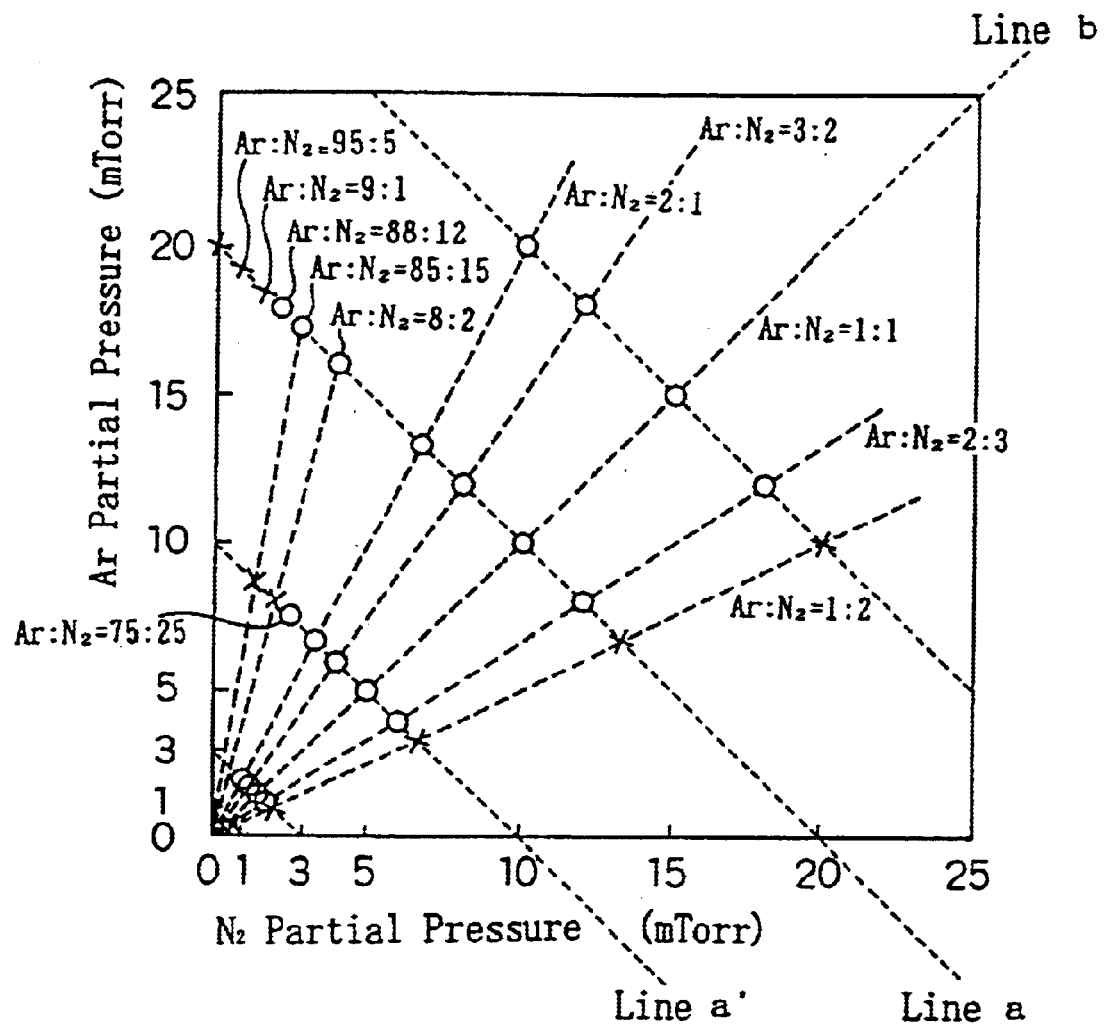
FIG. 10 shows a difference of a repeating characteristic by using a sputter gas pressure.

In the first place, in case of the 3A-type disk as shown in FIG. 10, the film formation condition which can obtain better repeating characteristic is the case that the total pressure of the sputter gas exceeds 1 mTorr. Furthermore, when the total pressure is 10 mTorr, the nitrogen gas partial pressure in the sputter gas is ranging from 25% to 60%. Furthermore, when the total pressure is 20 mTorr, the nitrogen gas partial pressure in the sputter gas is ranging from 12% to 60%.

Figure 12:
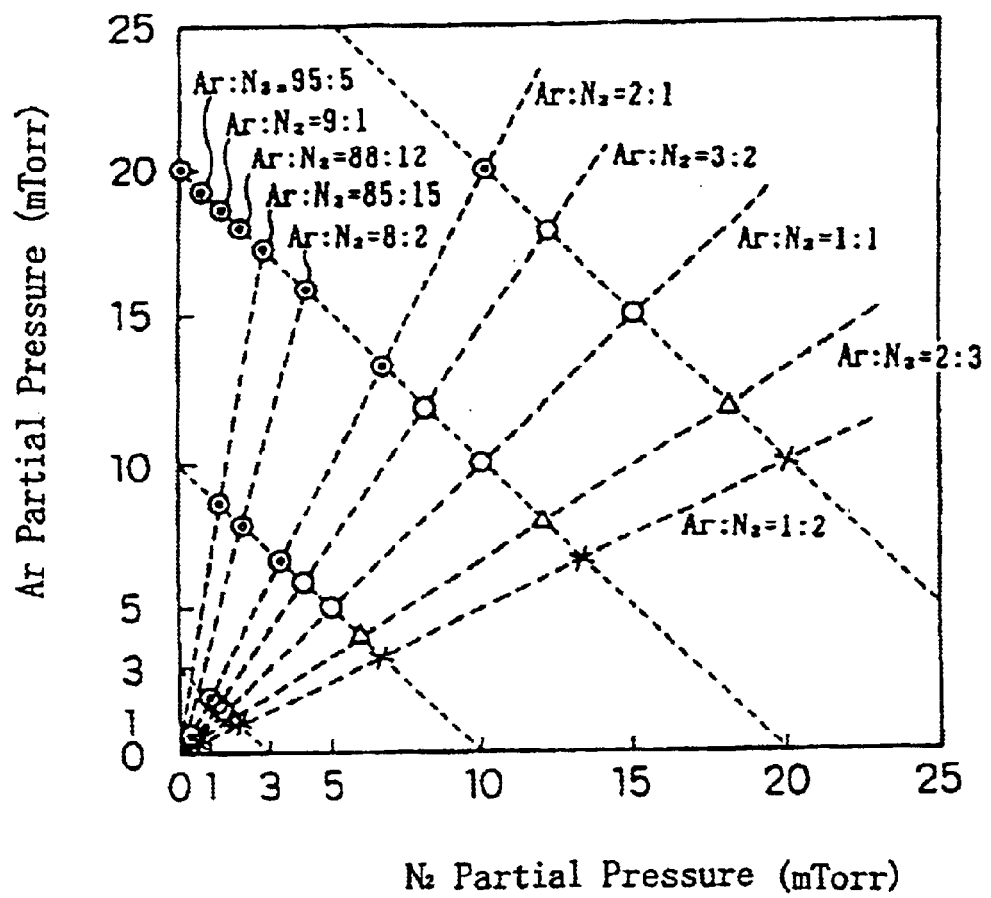
FIG. 12 shows a difference of an adhesiveness by using the sputter gas pressure.

Furthermore, as shown in FIG. 12, the film formation condition which can obtain better weather-proof (adhesiveness) is the case that the total pressure of the sputter gas is more than 1 mTorr, similarly to the case of the repeating characteristic. In both cases of the total pressure 10 mTorr and the total pressure 20 mTorr, similarly, the nitrogen gas partial pressure in the sputter gas is within the range of 60% or less, preferably 50% or less.

Figure 11:
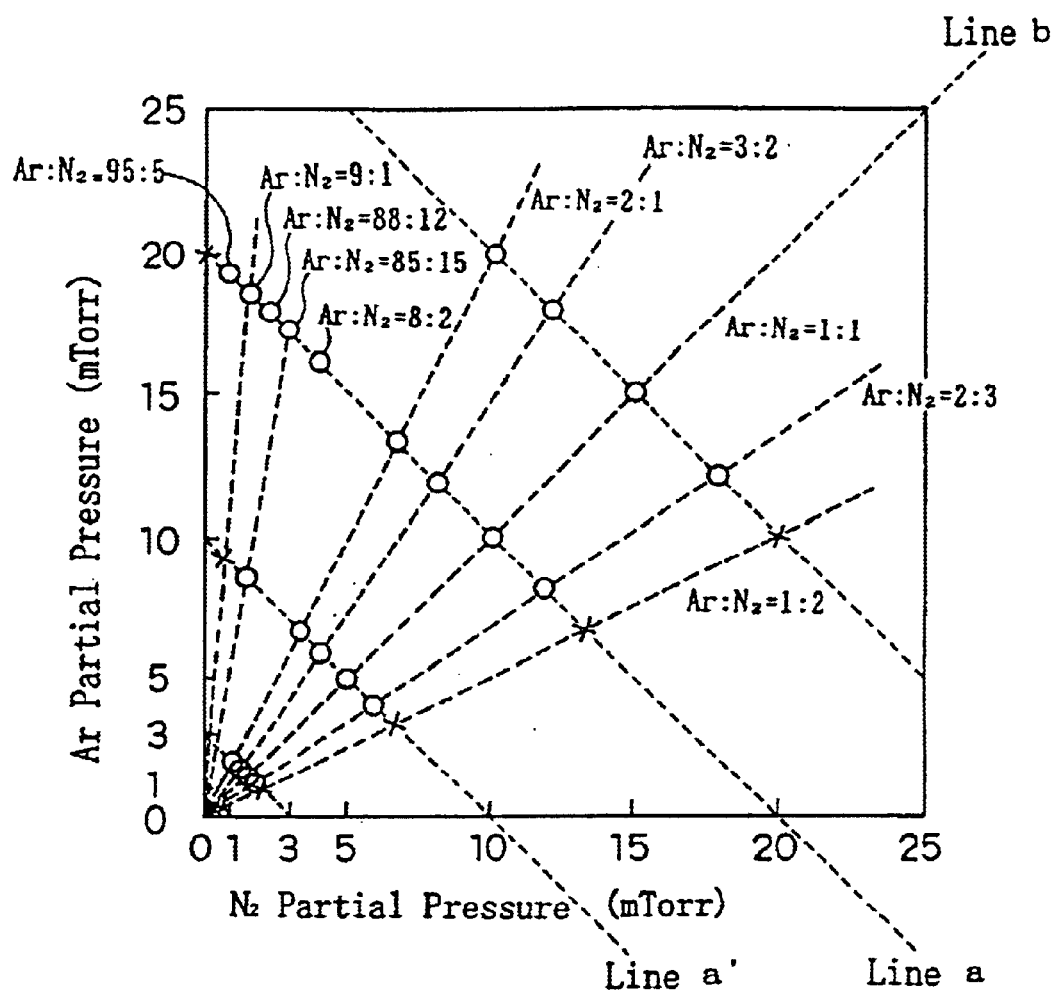
FIG. 11 shows the difference of the repeating characteristic by using the sputter gas pressure.
Figure 13:
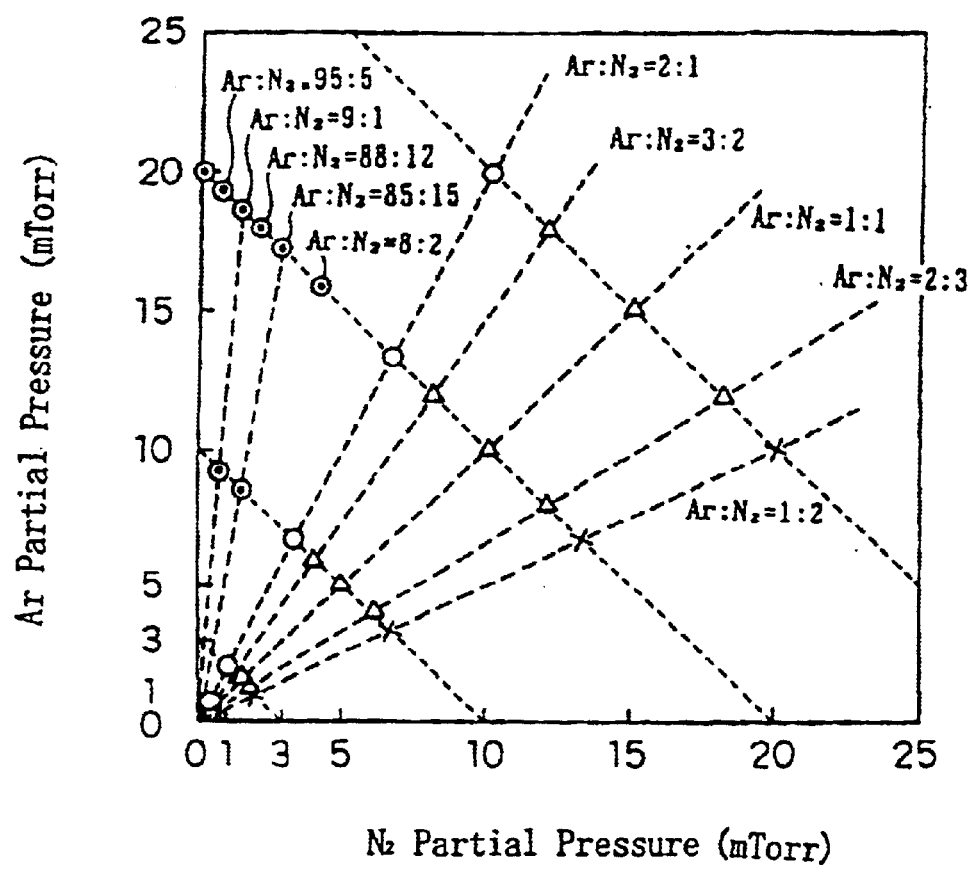
FIG. 13 shows the difference of the adhesiveness by using the sputter gas pressure.

Next, in case of the 3E-type disk, as shown in FIG. 11, the film formation of the barrier layer condition which can obtain better repeating characteristic is the case that the total pressure of the sputter gas exceeds 1 mTorr. Furthermore, when the total pressure is 10 mTorr, the nitrogen gas partial pressure in the sputter gas is ranging from 15% to 60%. Furthermore, when the total pressure is 20 mTorr, the nitrogen gas partial pressure in the sputter gas is ranging from 5% to 60%. Furthermore, as shown in FIG. 13, the film formation condition which can obtain better weather-proof (adhesiveness) is the case that the total pressure of the sputter gas is 1 mTorr or more, similarly to the case of the repeating characteristic. In both cases of the total pressure 10 mTorr and the total pressure 20 mTorr, similarly, the nitrogen gas partial pressure in the sputter gas is within the range of 40% or less, preferably 33% or less.

According to this analysis, the composition range of the Ge—N or Ge—N—O layer which can obtain better characteristic is examined. When this material layer is disposed at the substrate side of the recording layer, as shown in the triangular composition diagram shown in FIG. 5, the average composition ratio is within the region surrounded by four points, $D1(Ge_{60.0}N_{40.0})$, $D4(Ge_{48.8}N_{10.2}O_{41.0})$, $G1(Ge_{35.0}N_{65.0})$, $G4(Ge_{31.1}N_{13.8}O_{55.1})$.

Furthermore, when the material layer is disposed at the side opposite to the substrate of the recording layer, the average composition ratio is within the range surrounded by four composition points, $B1(Ge_{90.0}N_{10.0})$, $B4(Ge_{83.4}N_{3.3}O_{13.3})$, $F1(Ge_{42.9}N_{57.1})$, $F4(Ge_{35.5}N_{12.9}O_{51.6})$, more preferably, the composition range surrounded by four composition points, $C1(Ge_{65.0}N_{35.0})$, $C4(Ge_{53.9}N_{9.2}O_{36.9})$, $F1(Ge_{42.9}N_{57.1})$, $F4(Ge_{35.5}N_{12.9}O_{51.6})$.

Regarding the repeating characteristic, when the nitrogen partial pressure in the sputter gas is low, since a lot of surplus Ge not connected to the nitrogen exists in the barrier layer. Accordingly, the composition of the recording layer is changed, accompanied by the rewrite of the signal. Thereby, better characteristic cannot be obtained. Since a temperature rise at the reflecting layer side of the recording layer is lower than that at the substrate side, a degree of the atom diffusion is relatively small, thereby the condition that the $N_2$ partial pressure is low can be used. On the contrary, when the nitrogen partial pressure in the sputter gas is too high, a lot of surplus nitrogen exists in the film. In this case, better repeating characteristic cannot be obtained.

Regarding the adhesiveness, when the nitrogen partial pressure in the sputter gas is high and a lot of surplus nitrogen exists in the film, the peeling is generated after the acceleration test. When the nitrogen partial pressure is low and the surplus Ge not combined to the nitrogen exists, the peeling is not generated. It is expected that the more Ge not combined to the nitrogen and oxygen exists, the higher an affinity for the recording layer component becomes.

As described above, in order to obtain the disk having better repeating characteristic of the record and the adhesiveness, the sputter gas condition (gas pressure, component ratio) is clear. When the sputter gas total pressure exceeds 50 mTorr, the film formation rate becomes small. Accordingly, it is not practical.

The film formation condition is the case that when the Ge—N or Ge—N—O layer is formed, the power density to be introduced into the target is 8.91 W/cm² When the power to be introduced into the target is more than 8.91 W/cm², a time until the Ge atom sputtered on the target surface is attached to the substrate surface becomes shorter than the above case, thereby nitriding and nitriding-oxidation are hardly generated. In this case, according to the rate, the nitrogen partial pressure in the sputter gas is appropriately increased, thereby the similar effect to the case that the power density is 8.91 W/cm² can be obtained. On the contrary, when the introducing power is less than 8.91 W/cm², since the nitriding and nitriding-oxidation are excessively generated, according to the rate, the nitrogen partial pressure can be only adjusted in such a manner that the nitrogen partial pressure of the sputter gas is appropriately reduced.

When the nitrogen partial pressure ratio in the sputter gas is more than about 90%, the sputtering is more or less unstable and it is not preferable. The value of the sputter power and the film formation rate is set to an optional value within the range in which the nitride or nitride-oxide can be formed. As described above, preferably, the sputter power density exceeds 1.27 W/cm$^2$, and the film formation rate is 18 nm/minute or more.

EXAMPLE 6

Figure 14:
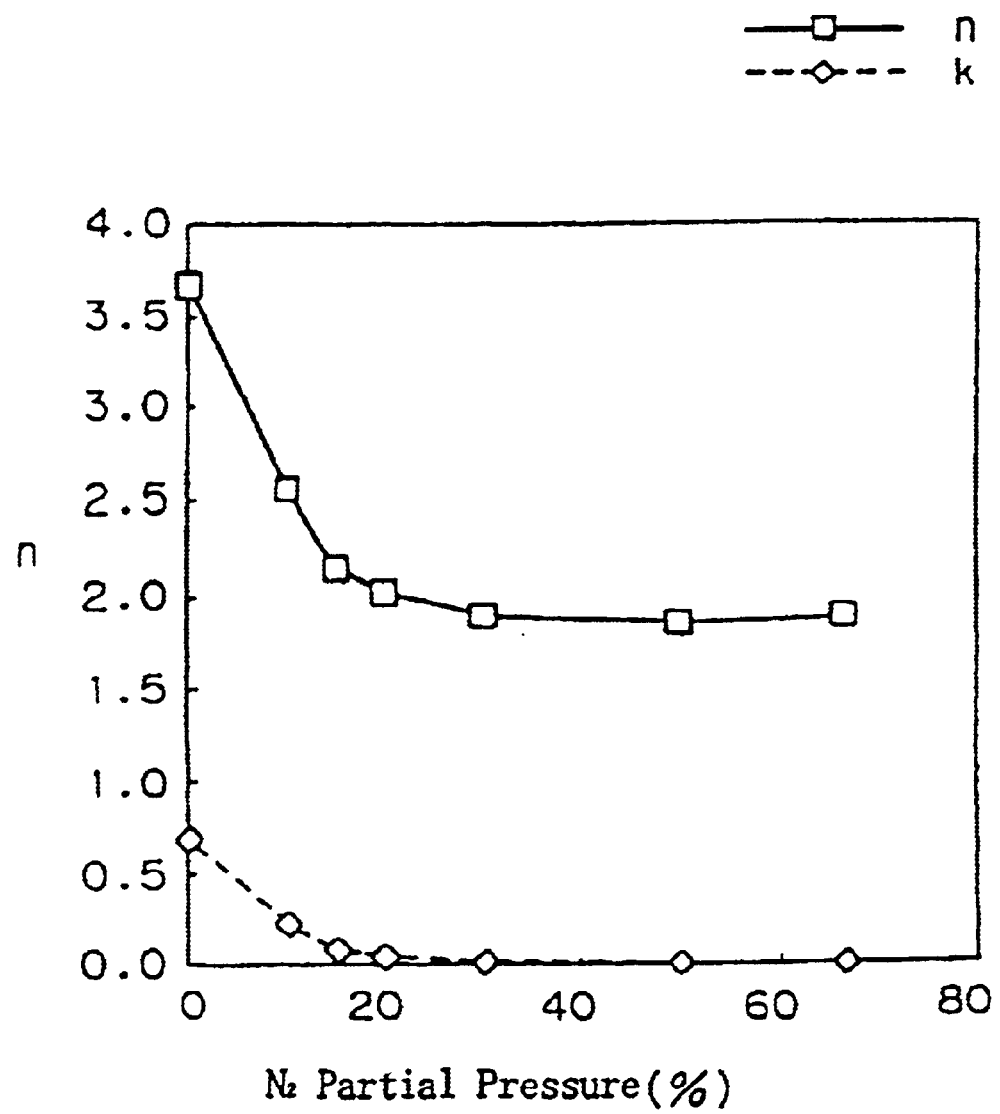
FIG. 14 shows a relationship between a nitrogen partial pressure in the sputter gas and an optical constant.
Figure 15:
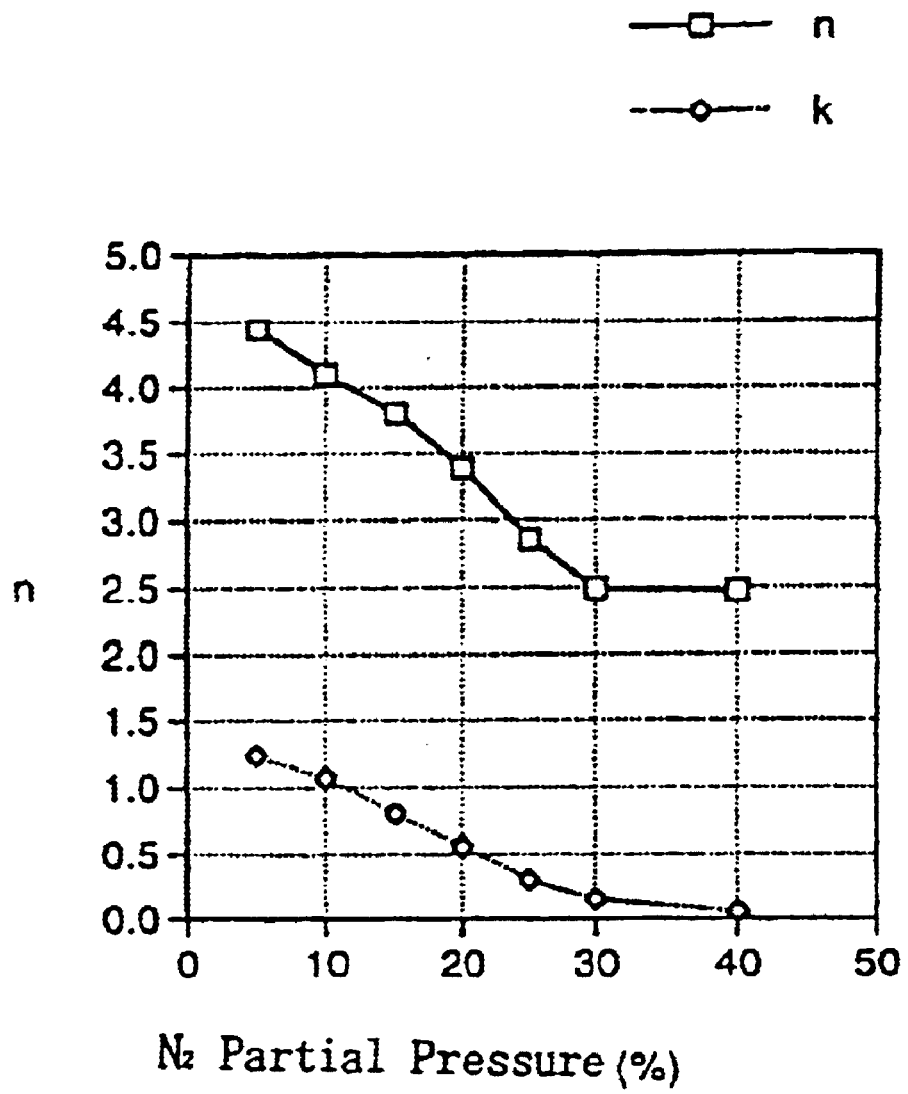
FIG. 15 shows the relationship between the nitrogen partial pressure in the sputter gas and the optical constant.
Figure 16:
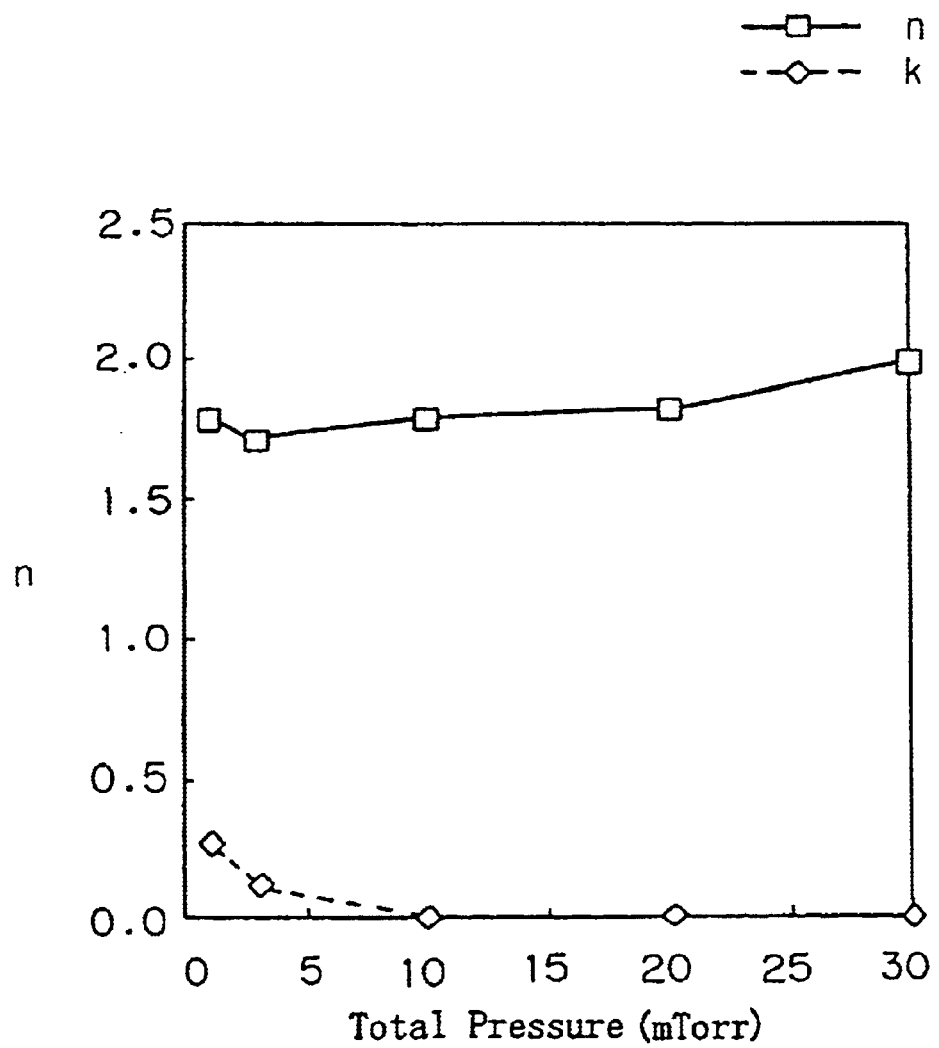
FIG. 16 shows a relationship between a total sputter gas pressure and the optical constant.

Next, when the film formation condition is changed, the change of the optical constant of the barrier layer is examined. In the first place, the sputter power of Ge is set to 700 W, and the sputter total pressure is constantly set to 20 mTorr. When the nitrogen partial pressure ratio in the sputter gas is changed, that is, the change of the complex refractive index of the film on a line a in FIGS. 10 and 11 is examined. The result is shown in FIG. 14. Furthermore, the sputter power is 700 W, and the sputter total pressure is constantly set to 10 mTorr. When the nitrogen partial pressure ratio in the sputter gas is changed, that is, the change of the complex refractive index of the film on a line a' in FIGS. 10 and 11 is examined. The result is shown in FIG. 15. Next, the partial pressure ratio of Ar and the nitrogen in the sputter gas is constantly set to 1:1, and the gas total pressure is changed. In this case, FIG. 16 shows the change of the optical constant of the film on a line b in FIGS. 10 and 11.

These graphs are combined to the above application range of the nitrogen partial pressure. When the barrier layer is used at the substrate side of the recording layer, preferably, the complex refractive index value n+ik of the barrier layer satisfies the range of $1.7 \leq n \leq 2.8$ and $0 \leq k < 0.3$. Furthermore when the barrier layer is used at the side opposite to the substrate of the recording layer, preferably, the complex refractive index value n+ik of the barrier layer satisfies the range of $1.7 \leq n \leq 3.8$ and $0 < k \leq 0.8$.

When the film composition is analyzed, if the film is formed by using the sputter total pressure 10 mTorr, the oxygen density is ranging about from 5% to 8%. In case of the sputter total pressure 20 mTorr, the oxygen density is ranging about from 10% to 20%, which is little more than the case of 10 mTorr.

In view of producing method, even if the film formation condition such as the sputter power, the sputter gas or the like is changed, the film is formed in such a manner that the complex refractive index of the Ge—N film or the Ge—O—N film satisfies the above range. Thereby, better characteristic can be obtained.

EXAMPLE 7

Next, except that the structure comprises a barrier layers 8 whose film thickness are 10 nm, 20 nm, respectively, and a ZnS—SiO$_2$ protective layers 2 of the substrate side whose film thickness are 81 nm, 65.8 nm, respectively, a 2A-type disk having the same layer structure and the film thickness as the example 4 is produced. The film formation condition of the barrier layer 8 is as follows: the sputter power is RF700 W, that is, the power density 8.91 W/cm$^2$, the sputter gas total pressure is 20 mTorr, Ar partial pressure: the nitrogen partial pressure=2:1, and the gas flow rate is similar to the above case.

As a result of examining the repeating characteristic and the weather-proof of the disk, similarly to the above case, a very good characteristic can be obtained.

EXAMPLE 8

Next, the effect when the barrier layer is applied is shown by comparing the disks having different layer structure to one another. Table 7 shows the structure of the experimentally made disks and the estimate result of the cycle performance thereof In Table 7, DL denotes the protective layer containing ZnS—SiO$_2$, AL denotes the recording layer containing Ge2Sb2.2Te5, BL denotes the barrier layer containing Ge50N45O5, and RL denotes the reflecting layer containing AlCr. More specifically, when the material is changed or the material is specified, the description such as DL(Ge—N—O) is included in parentheses.

The estimate method is the same as the case of Table 2. That is, the jitter value and the amplitude value are estimated. After 100,000-time repeating record, the jitter value (measured by such a method that the jitter between each mark front end and the jitter between each mark rear end are independently measured) is estimated. Such a case that both of the jitter between the mark front ends and the jitter between the mark rear ends are less than a reference value and the jitter value is scarcely changed is represented by ⊚. Such a case that although the jitter value is changed, the jitter value itself remains less than the reference value is represented by ○. Such a case that after 100,000-time repeating, the jitter slightly exceeds the reference value is represented by Δ. Such a case that after 10,000-time repeating, the jitter value already exceeds the reference value is represented by X. The estimate power is set to a higher value by about 10% than the lowest limit jitter value, where the lowest limit jitter value denotes the value when an initial jitter value satisfies the value less than 12.8%. Furthermore, after 100,000-time repeating, the amplitude value is observed. Such a case that less change is found is represented by ⊚. Such a case that about 10% or less change is found is represented by ○. Such a case that about 20% change is found is represented by Δ. Such a case that the jitter value is reduced to more than 20% is represented by X. Table 7 shows the followings:

1) in case of no reflecting layer (a disk 41), the amplitude value is severely reduced, and the jitter value rise is large. However, the barrier layer is provided, thereby it is possible to obtain a considerable effect of the jitter performance and the amplitude performance (disks 42 and 43), 2) even if the reflecting layer is provided, when the reflecting layer id thin, or if the layer between the reflecting layer and the recording layer is thick (a disk 44: in general, a so-called annealing structure), the same effect as the case that the reflecting layer is thick or the layer between the reflecting layer and the recording layer is thin (a disk 47: in general, a so-called quenching structure) cannot be obtained, 3) if the barrier layer is applied to the annealing structure, a considerable effect can be obtained (disks 45 and 46), 4) in the quenching structure, the barrier layer is only disposed at one side of the recording layer, thereby the considerable effect can be obtained.

That is, in the structure having no reflecting layer or in the structure in which the protective layer having a thickness (for example, 80 nm or more) is formed between the recording layer and the reflecting layer, the barrier layer is considerably effective relative to the jitter value reduction and to the suppression of the amplitude reduction due to the repeating record. When many repeating times is necessary, the barrier layer is essential. Recently, in many cases, the above annealing structure can be applied to the optical disk overwriting at a high speed (for example, Noboru Yamada et al. "Thermally balanced structure of phase-change optical disk for high speed and high density recording." Trans. Mat. Res. Soc. Jpn., Vol. 15B, 1035, (1993)). Accordingly, a combination of the annealing structure and barrier layer generates a large effect.

On the other hand, the structure having a thin protective layer (for example, 60 nm or less) formed between the recording layer and the reflecting layer is provided with the barrier layer as the protective layer. Thereby, more specifically, the amplitude performance can be enhanced. Accordingly, much more repeating times can be achieved.

that the jitter value rise and the amplitude value reduction are clearly less than the reference value. Δ means that a little effect is obtained. X means that no effect is obtained. Furthermore, regarding the weather-proof, ○ means that no change is detected. X means that such a change as the peeling, etc. is detected. Δ means that a little change such as the peeling, etc. is detected. Thus, regarding the cycle performance, there is a tendency that both of groups (A) and

TABLE 7

Effect comparison of the barrier layer relative to various layer structure

| Disk number | Disk layer structure | | | | | Repeating performance | |
|---|---|---|---|---|---|---|---|
| | | | | | | Jitter | Amplitude |
| 41 | DL 90 nm | | AL 22 nm | DL 82 nm | | X | X |
| 42 | DL 80 nm | BL 10 nm | AL 22 nm | DL 82 nm | | ○ | ○ |
| 43 | DL 80 nm | BL 10 nm | AL 22 nm | DL 10 nm | DL 72 nm | ⊙ | ⊙ |
| 44 | DL 90 nm | | AL 22 nm | DL 80 nm | RL(Au) 10 nm | Δ | X |
| 45 | DL 80 nm | BL 10 nm | AL 22 nm | DL 90 nm | RL(Au) 10 nm | ○ | ○ |
| 46 | DL 80 nm | BL 10 nm | AL 22 nm | DL(GeNO) 90 nm | RL(Au) 10 nm | ⊙ | ⊙ |
| 47 | DL 90 nm | | AL 22 nm | DL 60 nm | RL 150 nm | ○ | Δ |
| 48 | DL 90 nm | BL 10 nm | AL 22 nm | DL 60 nm | RL 150 nm | ⊙ | ⊙ |
| 49 | DL 90 nm | | AL 22 nm | DL(GeNO) 60 nm | RL 150 nm | ⊙ | ⊙ |
| 50 | DL 90 nm | BL 10 nm | AL 22 nm | DL(GeNO) 60 nm | RL 150 nm | ⊙ | ⊙ |

EXAMPLE 9

Whether or not the material layer except for the Ge—N, Ge—N—O layer can be used as the barrier layer is examined. As a material candidate, Si—N, Si—N—O, SiC, Sb—N—O, Zr—N—O, Ti—N, Al—N and Al—N—O are selected. In any case, the sputter condition is selected. Two kinds of compositions, that is, (A) a stoichiometric composition and (B) the composition containing about 5% more Si, Al, Ti, or the like than the stoichiometric composition are tested. The medium structure is a FIG. 3G-type structure. The barrier layer has the thickness of 10 nm. The medium structure comprises a ZnSe-SiO$_2$ protective layer whose thickness is 80 nm, the barrier layer, a Ge2Sb2.5Te5 recording layer whose thickness is 20 nm, a barrier material layer whose thickness is 20 nm, and an Au reflecting layer whose thickness is 50 nm deposited on a polycarbide substrate whose thickness is 1.2 mm by the sputtering method. After overcoating, a hot melt adhesive is used so that a defense plate is laminated. Next an initial crystallization is carried out by the laser method. Furthermore for a comparison, the structure in which the barrier layer is not used is also prepared. These disks are rotated at a linear rate of 3.5 m/s, and an EFM signal (random signal) having the 3T mark whose length is 0.6 μm is repeatedly overwritten, and the cycle performance is estimated. Furthermore, these disks are left to stand under the acceleration condition of 90° C. and 80% RH for 100 hours, and the state of the disks is estimated.

The result is shown in Table 8. In Table 8, regarding the cycle performance, ○ means that after 100,000-repeating, the effect is obtained. That is, there is such an advancement (B) are improved. Regarding the weather-proof, the group (B) is sprier to the group (A), that is, there is more possibility that the composition containing little less N, O or the like than the stoichiometric composition can be applied to the barrier layer.

TABLE 8

Comparison of barrier materials

| | | A | | B | |
|---|---|---|---|---|---|
| | Material composition | Cycle | Weather-proof | Cycle | Weather-proof |
| 51 | Si—N | Δ | X | Δ | Δ |
| 52 | Si—N—O | Δ | X | ○ | ○ |
| 53 | SiC | Δ | X | ○ | Δ |
| 54 | Sb—N | Δ | X | Δ | ○ |
| 55 | Sb—N—O | Δ | X | Δ | ○ |
| 56 | Zr—N | Δ | X | ○ | ○ |
| 57 | Zr—N—O | Δ | X | ○ | ○ |
| 58 | Ti—N | Δ | X | ○ | Δ |
| 59 | Al—N | Δ | X | ○ | Δ |
| 60 | Al—N—O | Δ | X | ○ | ○ |

As described above, according to the present invention, it is possible to provide the optical information recording medium in which the change of the recording characteristic and the reproducing characteristic due to repeating the record and reproduction is lower and further the weather-proof is excellent, the producing method thereof and a method of recording and reproducing the information.

EXAMPLE 10

In the Examples, the weather resistance and the characteristics in repetitive recording were evaluated in the following manner. For the evaluation of the weather resistance, an accelerated test was performed at 90° C. and 80% humidity for 200 hours, and it was observed with an optical microscope at every 100 hours whether or not the peeling of the film occurred. As a result, examined samples were classified into "A", "B" and "C". In a sample denoted by "A", no peeling was observed for 200 hours. In a sample denoted by "B", no peeling was observed for the first 100 hours but peeling occurred after 200 hours. In a sample denoted by "C", peeling occurred after 100 hours.

For the evaluation of the characteristics in repetitive recording, random marks having lengths from 3 T to 11 T when the minimum mark length is 0.61 μm in EFM signal system were recorded. In a sample denoted by "A", neither the ratio of a jitter value between front ends of the marks to a window width T nor the ratio of a jitter value between rear ends to a window width T exceeded 13% after 200,000 times repetitive recording. In a sample denoted by "B", neither of the ratios for the front ends or the rear ends exceeded 13% after 100,000 times repetitive recording, but at least one of the ratios for the front ends and the rear ends exceeded 13% after 200,000 times repetitive recording. In a sample denoted by "C", at least one of the ratios for the front ends and the rear ends exceeded 13% after 100,000 times repetitive recording.

The optical information recording medium having the same structure as shown in FIG. 1 was produced by sputtering as described above. A disk-shaped polycarbonate resin having a thickness of 0.6 mm and a diameter of 120 mm was used for a substrate 61. A material comprising ZnS and 20 mol % of $SiO_2$ was used for a protective layer 62. A phase-changeable material comprising Ge—Sb—Te alloy was used for a recording layer 63, and an Al alloy was used for a reflection layer 65. The composition of the recording layer 63 was $Ge_{22.0}Sb_{25.0}Te_{53.0}$ in this example, but other compositions can be used.

A medium comprising a diffusion preventing layer 67 formed of GeN and a diffusion preventing layer 68 formed of GeNiN was referred to as sample 101. A medium comprising a diffusion preventing layer 67 formed of GeN and a diffusion preventing layer 68 formed of GeCrN was referred to as sample 102. A medium comprising a diffusion preventing layer 67 formed of GeN and a diffusion preventing layer 68 formed of GeCoN was referred to as sample 103. A medium comprising a diffusion preventing layer 67 formed of GeN and a diffusion preventing layer 68 formed of GeMoN was referred to as sample 104. A medium comprising a diffusion preventing layer 67 formed of GeN and a diffusion preventing layer 68 formed of GeMnN was referred to as sample 105. A medium comprising a diffusion preventing layer 67 formed of GeN and a diffusion preventing layer 68 formed of GeLaN was referred to as sample 106. A medium comprising a diffusion preventing layer 67 formed of GeN and a diffusion preventing layer 68 formed of GeTiN was referred to as sample 107. A medium comprising a diffusion preventing layer 67 formed of GeN and a diffusion preventing layer 68 formed of GeZrN was referred to as sample 108. A medium comprising a diffusion preventing layer 67 formed of GeN and a diffusion preventing layer 68 formed of GeNbN was referred to as sample 109. For comparison, sample 100 comprising diffusion preventing layers 67 and 68 both formed of GeN was produced.

When forming a GeMN layer X=Ni, Cr, Co, Mo, Mn, La, Ti, Zr or Nb) and a GeN layer, GeM and Ge, respectively, were used as target materials, and the content of M contained in the GeMN layer was 25 atom % of the total content of Ge and M. This ratio was analyzed by ICP (ICP Emission Spectrometry).

Furthermore, the thicknesses of the diffusion preventing layers 67 and 68 of samples 100 to 109 were 10 nm and 20 nm, respectively, which were common between samples 100 to 109. Similarly, there was no difference between samples 100 to 109 for the thickness of the protective layer 2 of 120 nm, the thickness of the recording layer 3 of 20 nm, and the thickness of the reflection layer 5 of 150 nm.

In order to form the protective layer 62 and the recording layer 63, a mixed gas comprising Ar and 2.5 vol % of nitrogen was supplied at a constant flow rate and a total pressure of 1.0 mTorr and 0.5 mTorr, respectively, and DC powers of 1.27 W/cm² and RF 5.10 W/cm², respectively, were supplied to cathodes. The nitrogen gas was mixed with the sputtering gas in order to suppress the movement of the substances in the medium after repetitive recording. The advantageous effect of the present invention can be obtained in the case where nitrogen is not supplied from the sputtering gas or oxygen is mixed with the sputtering gas. In order to form the reflection layer 65, Ar gas was supplied at a total pressure of 3.0 mTorr, and a DC power of 4.45 W/cm² was supplied. Other rare gases than Ar such as Kr can be contained in the sputtering gas, as long as it allows sputtering.

When forming the diffusion preventing layers 67 and 68, there was no difference between samples 100 to 109 as to the sputtering gas, which was a mixed gas comprising Ar and nitrogen, a sputtering gas pressure of 10 mTorr, and a sputtering power density of 6.37 W/cm². When forming the diffusion preventing layer 67, the partial pressure of nitrogen in the sputtering gas was constantly 40% (40 vol % nitrogen). When forming the diffusion preventing layer 68, the partial pressure of nitrogen in the sputtering gas was changed to 10%, 20%, 30% and 40%. In this case, the content of nitrogen contained in the diffusion preventing layer 67 was 56 atom % and the contents of nitrogen contained in the diffusion preventing layer 68 were 22 atom %, 37 atom %, 50 atom %, and 56 atom %, respectively. Furthermore, the contents of oxygen contained in the diffusion preventing layers 67 and 68 were 4 atom %, 5 atom %, 6 atom %, and 7 atom %, respectively. The oxygen was contained because impurity oxygen present in the chamber was absorbed in the layers. The ratios of nitrogen and oxygen were analyzed by RBS (Rutherford Backscattering Spectroscopy).

The results of the evaluation of the characteristics of the produced disk-shaped media are shown in Table 9.

TABLE 9

| | Diffusion preventing layer | | Partial Pressure of Nitrogen in Film-Forming Gas | | | | | | |
|---|---|---|---|---|---|---|---|---|---|
| | | | 10% | | 20% | | 30% | | 40% |
| Medium No. | 67 | 68 | a* | b* | a* | b* | a* | b* | a* | b* |
| Sample 100 | GeN | GeN | A | B | A | A | B | A | C | A |
| Sample 101 | GeN | GeNiN | A | B | A | A | A | A | A | A |
| Sample 102 | GeN | GeCrN | A | B | A | A | A | A | A | A |
| Sample 103 | GeN | GeCoN | A | B | A | A | A | A | B | A |
| Sample 104 | GeN | GeMoN | A | B | A | A | A | A | B | A |
| Sample 105 | GeN | GeMnN | A | B | A | A | A | A | B | A |

TABLE 9-continued

| Medium No. | Diffusion preventing layer | | Partial Pressure of Nitrogen in Film-Forming Gas | | | | | | |
|---|---|---|---|---|---|---|---|---|---|
| | | | 10% | | 20% | | 30% | | 40% |
| | 67 | 68 | a* | b* | a* | b* | a* | b* | a* | b* |
| Sample 106 | GeN | GeLaN | A | B | A | A | A | A | B | A |
| Sample 107 | GeN | GeTiN | A | B | A | A | A | A | B | A |
| Sample 108 | GeN | GeZrN | A | B | A | A | A | A | B | A |
| Sample 109 | GeN | GeNbN | A | B | A | A | A | A | B | A | a*: Weather resistance
b*: Repetition characteristics

Furthermore, samples 110 to 118 were produced under the same conditions as samples 101 to 109, except that the diffusion preventing layer 68 is formed of GeN, the diffusion preventing layer 67 is formed of GeMN (M represents the elements as described above), when forming the diffusion preventing layer 68, the partial pressure of nitrogen in the sputtering gas was constantly 30%, and when forming the diffusion preventing layer 67, the partial pressure of nitrogen in the sputtering gas was changed to 40%, 50% and 60%. Sample 100' is a medium in which the diffusion preventing layers 67 and 68 were both formed of GeN. Table 10 shows the results of the evaluation of these media.

TABLE 10

| Medium No. | Diffusion preventing layer | | Partial Pressure of Nitrogen in Film-Forming Gas | | | | | |
|---|---|---|---|---|---|---|---|---|
| | | | 40% | | 50% | | 60% | |
| | 67 | 68 | a* | b* | a* | b* | a* | b* |
| Sample 100' | GeN | GeN | B | A | B | A | C | A |
| Sample 110 | GeNiN | GeN | A | A | A | A | A | A |
| Sample 111 | GeCrN | GeN | A | A | A | A | A | A |
| Sample 112 | GeCoN | GeN | A | A | A | A | A | A |
| Sample 113 | GeMoN | GeN | A | A | A | A | A | A |
| Sample 114 | GeMnN | GeN | A | A | A | A | A | A |
| Sample 115 | GeLaN | GeN | A | A | A | A | A | A |
| Sample 116 | GeTiN | GeN | A | A | A | A | B | A |
| Sample 117 | GeZrN | GeN | A | A | A | A | B | A |
| Sample 118 | GeNbN | GeN | A | A | A | A | B | A | a*: Weather resistance
b*: Repetition characteristics

As seen from the results shown in Tables 9 and 10, when GeMN is used for the diffusion preventing layer, weather resistance is improved without impairing the repetition characteristics in recording, compared with the diffusion layer formed of GeN.

Next, disks including the diffusion preventing layers 67 and 68 formed of GeN and GeCrN, respectively, and having different ratios of the content of Cr to the total content of Ge and Cr in the GeCrN layer of 5%, 10%, 20%, 30%, 40%, 50%, and 60% were produced. These media were referred to as samples 119, 120, 121, 122, 123, 124 and 125. The structures of the layers of the disks were the same as that of the disk of sample 102. When forming the diffusion preventing layer 67, the partial pressure of nitrogen in the sputtering gas was constantly 40%. When forming the diffusion preventing layer 68, the partial pressure of nitrogen in the sputtering gas was changed to 20%, 30% and 40%. Table 11 shows the results of the evaluation of the disks.

TABLE 11

| Medium No. | Cr/ (Ge + Cr) | Partial Pressure of Nitrogen in Film-Forming Gas | | | | | |
|---|---|---|---|---|---|---|---|
| | | 20% | | 30% | | 40% | |
| | | a* | b* | a* | b* | a* | b* |
| Sample 100 | 0 | A | A | B | A | C | A |
| Sample 119 | 5 | A | A | B | A | B | A |
| Sample 120 | 10 | A | A | A | A | A | A |
| Sample 121 | 20 | A | A | A | A | A | A |
| Sample 122 | 30 | A | A | A | A | A | A |
| Sample 123 | 40 | A | A | A | A | A | A |
| Sample 124 | 50 | A | B | A | A | A | A |
| Sample 125 | 60 | A | C | A | B | A | B | a*: Weather resistance
b*: Repetition characteristics

Table 11 reveals that when the content of Cr is 10% or more, the effect of the addition of Cr is particularly desirable. However, when the content of Cr is 60% or more, the repetition characteristics deteriorate. This is believed to be because Cr atoms, which are difficult to be bonded to nitrogen compared with Ge atoms, were excessively present in the film, so that the Cr atoms flooded into the recording layer so as to deteriorate the characteristics in repetitive recording. Therefore, the content of Cr in the GeCrN film is preferably 50% or less, more preferably 40% or less of the total content of Ge and Cr.

Next, disks were produced in the same manner except that Mo or Ti was used in place of Cr. Tables 12 and 13 show the results of the evaluation of the thus produced disks.

TABLE 12

| Medium No. | Mo/ (Ge + Mo) | Partial Pressure of Nitrogen in Film-Forming Gas | | | | | |
|---|---|---|---|---|---|---|---|
| | | 20% | | 30% | | 40% | |
| | | a* | b* | a* | b* | a* | b* |
| Sample 100 | 0 | A | A | B | A | C | A |
| Sample 126 | 5 | A | A | B | A | B | A |
| Sample 127 | 10 | A | A | A | A | B | A |
| Sample 128 | 20 | A | A | A | A | B | A |
| Sample 129 | 30 | A | A | A | A | B | A |
| Sample 130 | 40 | A | A | A | A | B | A |
| Sample 131 | 50 | A | A | A | A | B | A |
| Sample 132 | 60 | A | C | A | B | B | B | a*: Weather resistance
b*: Repetition characteristics

TABLE 13

| Medium No. | Ti/ (Ge + Ti) | Partial Pressure of Nitrogen in Film-Forming Gas | | | | | |
|---|---|---|---|---|---|---|---|
| | | 20% | | 30% | | 40% | |
| | | a* | b* | a* | b* | a* | b* |
| Sample 100 | 0 | A | A | B | A | C | A |
| Sample 133 | 5 | A | A | B | A | B | A |
| Sample 134 | 10 | A | A | A | A | B | A |
| Sample 135 | 20 | A | A | A | A | B | A |
| Sample 136 | 30 | A | A | A | A | B | A |
| Sample 137 | 40 | A | A | A | A | B | A |

TABLE 13-continued

| | | Partial Pressure of Nitrogen in Film-Forming Gas | | | | | |
|---|---|---|---|---|---|---|---|
| | Ti/ | 20% | | 30% | | 40% | |
| Medium No. | (Ge + Ti) | a* | b* | a* | b* | a* | b* |
| Sample 138 | 50 | A | B | A | B | B | B |
| Sample 139 | 60 | A | C | A | B | B | B | a*: Weather resistance
b*: Repetition characteristics

EXAMPLE 11

Optical information recording media were produced in the same manner as in Example 10 except that the diffusion preventing layers were changed as follows.

A medium comprising a diffusion preventing layer 67 formed of GeON and a diffusion preventing layer 68 formed of GeNiON was referred to as sample 140. A medium comprising a diffusion preventing layer 67 formed of GeON and a diffusion preventing layer 68 formed of GeCrON was referred to as sample 141. A medium comprising a diffusion preventing layer 67 formed of GeON and a diffusion preventing layer 68 formed of GeCoON was referred to as sample 142. A medium comprising a diffusion preventing layer 67 formed of GeON and a diffusion preventing layer 68 formed of GeMoON was referred to as sample 143. A medium comprising a diffusion preventing layer 67 formed of GeON and a diffusion preventing layer 68 formed of GeMnON was referred to as sample 144. A medium comprising a diffusion preventing layer 67 formed of GeON and a diffusion preventing layer 68 formed of GeLaON was referred to as sample 145. A medium comprising a diffusion preventing layer 67 formed of GeON and a diffusion preventing layer 68 formed of GenON was referred to as sample 146. A medium comprising a diffusion preventing layer 67 formed of GeON and a diffusion preventing layer 68 formed of GeZrON was referred to as sample 147. A medium comprising a diffusion preventing layer 67 formed of GeON and a diffusion preventing layer 68 formed of GeNbON was referred to as sample 148. For comparison, sample 100" comprising diffusion preventing layers 67 and 68 both formed of GeON was produced. In this example, the content of M contained in the GeMON layer was 25 atom % of the total content of Ge and M.

When forming the diffusion preventing layers 67 and 68, there was no difference between samples 140 to 148 as to the sputtering gas, which was a mixed gas comprising Ar, nitrogen and oxygen, a sputtering gas pressure of 10 mTorr, and a sputtering power density of 6.37 W/cm². When forming the diffusion preventing layer 67, the partial pressure of nitrogen in the sputtering gas was constantly 40% and the partial pressure of oxygen was 3%. When forming the diffusion preventing layer 68, the partial pressure of nitrogen in the sputtering gas was changed to 10%, 20%, 30% and 40%, and the partial pressure of oxygen was constantly 3%. In this case, the contents of nitrogen contained in the diffusion preventing layer 67 was 68 atom % and the contents of oxygen was 20 atom %. Furthermore, the contents of nitrogen contained in the diffusion preventing layer 68 were 24 atom %, 40 atom %, 51 atom % and 58 atom %, respectively. The contents of oxygen contained in the diffusion preventing layer 68 were 8 atom %, 13 atom %, 17 atom % and 20 atom %, respectively.

The results of the evaluation of the characteristics of the produced disk-shaped media are shown in Table 14.

TABLE 14

| | Diffusion preventing layer | | Partial Pressure of Nitrogen in Film-Forming Gas | | | | | | | |
|---|---|---|---|---|---|---|---|---|---|---|
| | | | 10% | | 20% | | 30% | | 40% | |
| Medium No. | 67 | 68 | a* | b* | a* | b* | a* | b* | a* | b* |
| Sample 100" | GeON | GeON | A | A | B | A | C | A | C | A |
| Sample 140 | GeON | GeNiON | A | A | A | A | A | A | B | A |
| Sample 141 | GeON | GeCrON | A | A | A | A | A | A | B | A |
| Sample 142 | GeON | GeCoON | A | A | A | A | A | A | B | A |
| Sample 143 | GeON | GeMoON | A | A | A | A | A | A | B | A |
| Sample 144 | GeON | GeMnON | A | A | A | A | A | A | B | A |
| Sample 145 | GeON | GeLaON | A | A | A | A | A | A | B | A |
| Sample 146 | GeON | GeTiON | A | A | A | A | B | A | B | A |
| Sample 147 | GeON | GeZrON | A | A | A | A | B | A | B | A |
| Sample 148 | GeON | GeNbON | A | A | A | A | B | A | B | A | a*: Weather resistance
b*: Repetition characteristics

As seen from Table 14, when GeMON is used for the diffusion preventing layer, the weather resistance is improved without impairing the characteristics in repetitive recording compared with the case where GeON is used. When a layer containing oxygen is used for the diffusion preventing layer, the repetition characteristics are improved compared with the case where the content of oxygen is on an impurity level. However, the weather resistance deteriorates slightly.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. An optical information recording medium comprising a substrate and a multilayer film, the multilayer film comprising:
    a barrier layer;
    a first protective layer that comprises sulfur; and
    a recording layer generating a reversible phase-change which can be optically detected according to an irradiation of an energy beam;
    wherein said barrier layer is formed between said first protective layer and said recording layer and in contact with said first protective layer and said recording layer, and includes one selected from the group consisting of GeXN and GeXNO, where X is at least one element selected from the group consisting of Al, B, Ba, Bi, C, Ca, Ce, Cr, Dy, Eu, Ga, Hf, In, K, La, Mn, Nb, Ni, Pb, Pd, Sn, Ta, Ti, V, W, Yb, Zn, and Zr, and
    wherein the content of X to the total content of Ge and X in said barrier layer is 10 to 40 atom %, and the content of N in said barrier layer is 40 atom % or more.

2. The optical information recording medium according to claim 1, further comprising a second protective layer disposed at a side of said recording layer opposite to said barrier layer.

3. The optical information recording medium according to claim 2, wherein said first protective layer and said second protective layer include a first barrier material and a second barrier material, respectively, said first and second barrier materials are represented by $M_aX_b$ (where M denotes either one of a single non-gas element and a compound of a plurality of different non-gas elements, and X denotes either one of a single gas element and a compound of a plurality of different gas elements), and a value b/(a+b) of either one of said first and second barrier materials disposed at an energy beam-incident side of said recording layer is equal to or larger than the value of the other of said first and second barrier materials disposed a the side opposite to the energy beam-incident side.

4. The optical information recording medium according to claim 3, wherein each of said first and second barrier materials is either one selected from the group consisting of a nitride of a non-gas element and an oxynitride of a non-gas element.

5. The optical information recording medium according to claim 4, wherein said non-gas element comprises a non-gas element selected from the group consisting of Ge, Sb, Si Zr, Ti and Al.

6. The optical information recording medium according to claim 2, wherein said first protective layer and said second protective layer include a first barrier material and a second barrier material, respectively, and a composition of each of said first and second barrier materials is one composition existing within a region surrounded by four composition points $B1(Ge_{90.0}N_{10.0})$, $B4(Ge_{83.4}N_{3.3}O_{13.3})$, $G1(Ge_{35.0}N_{65.0})$, $G4(Ge_{31.1}N_{13.8}O_{55.1})$ in a three element composition diagram whose vertices are Ge, N, and O.

7. The optical information recording medium according to claim 6, wherein a composition of either one of said first and second barrier materials in a layer disposed at the energy beam-incident side of said recording layer is one composition existing within a region surrounded by four composition points $D1(Ge_{60.0}N_{40.0})$, $D4(Ge_{48.8}N_{10.2}O_{41.0})$, $G1(Ge_{35.0}N_{65.0})$, $G4(Ge_{31.1}N_{13.8}O_{55.1})$ in a three element composition diagram whose vertices are Ge, N, and O.

8. The optical information recording medium according to claim 6, wherein a composition of either one of said first and second barrier materials in a layer disposed at the side opposite to the energy beam-incident side of said recording layer is one composition existing within a region surrounded by four composition points $B1(Ge_{90.0}N_{10.0})$, $B4(Ge_{83.4}N_{3.3}O_{13.3})$, $F1(Ge_{42.9}N_{57.1})$, $F4(Ge_{35.5}N_{12.9}O_{51.6})$ in a three element composition diagram whose vertices are Ge, N, and O.

9. The optical information recording medium according to claim 8, wherein said composition is one composition existing within a region surrounded by four composition points $C1(Ge_{65.0}N_{35.0})$, $C4(Ge_{53.9}N_{9.2}O_{36.9})$, $F1(Ge_{42.9}N_{57.1})$, $F4(Ge_{35.5}N_{12.9}O_{51.6})$ in a three element composition diagram whose vertices are Ge, N, and O.

10. The optical information recording medium according to claim 1, further comprising a reflecting layer disposed at the side of said recording layer opposite to an energy beam-incident side of said recording layer.

11. The optical information recording medium according to claim 4, further comprising a second protective layer disposed adjacent said recording layer, wherein said second protective layer is disposed between said reflecting layer and said recording layer, and has a thickness of 60 nm or less.

12. The optical information recording medium according to claim 11, wherein said first barrier layer is disposed at the energy beam-incident side of said recording layer.

13. The optical information recording medium according to claim 1, wherein said first protective layer has a thickness of 80 nm or more.

14. The optical information recording medium according to claim 1, wherein said barrier layer includes a barrier material in which at least one selected from the group consisting of nitrogen and oxygen is less than a stoichiometric composition.

15. The optical information recording medium according to claim 1, wherein said barrier layer contains at least one element selected from the group consisting of Cr and Al and a density of said element is equal to or less than a density of a non-gas element in said barrier layer.

16. The optical information recording medium according to claim 1, further comprising: a second protective layer disposed at a side of said recording layer opposite to said barrier layer; wherein each of said first and second protective layers includes Ge, said recording layer is formed between said first and second protective layers, and a Ge density in either one of said first and second protective layers disposed at an energy beam-incident side of said recording layer is equal to or less than a Ge density in the other of said first and second, protective layers disposed opposite to the energy beam-incident side of said recording layer.

17. The optical information recording medium according to claim 1, wherein said barrier layer includes Ge and a density of the Ge is in the range between 35% and 90%.

18. The optical information recording medium according to claim 1, wherein said barrier layer is disposed at an energy beam-incident side of said recording layer and includes Ge, and a Ge density of said barrier layer is in the range between 35% and 60%.

19. The optical information recording medium according to claim 1, wherein said barrier layer is disposed at a side opposite to an energy beam-incident side of said recording layer and includes Ge, and a Ge density of said barrier layer is in the range between 40% and 90%.

20. The optical information recording medium according to claim 1, wherein said barrier layer is disposed at a side opposite to an energy beam-incident side of said recording layer and includes Ge, and a Ge density of said barrier layer is in the range between 40% and 65%.

21. The optical information recording medium according to claim 1, wherein a value n and a value k included in a complex refractive index n+ik of a barrier material of said barrier layer are within the range of $1.7 \leq n \leq 3.8$ and $0 \leq k \leq 0.8$, respectively.

22. The optical information recording medium according to claim 21, wherein the value n and the value k included in the complex refractive index (n+ik) of said barrier material are within the range of $1.7 \leq n \leq 2.8$ and $0 \leq k \leq 0.3$, respectively.

23. The optical information recording medium according to claim 1, wherein said recording layer includes a phase-change material containing at least one of Te, Sb said Se.

24. The optical information recording medium according to claim 23, wherein said phase-change material contains Ge—Sb—Te.

25. A method of recording/erasing/reproducing an optical information by recording, reproducing, and erasing an optical information on the optical information recording medium as in claim 1 by irradiating a laser beam with controlling power of the laser beam.

26. A method of recording/erasing/reproducing optical information, comprising the steps of:

providing an optical information recording medium comprising a substrate and a multilayer film, the multilayer film comprising a recording layer generating a reversible phase-change which can be optically detected according to an irradiation of au energy beam, a barrier layer, and a protective layer that comprises sulfur;

recording a signal to said recording layer by irradiating said recording layer with a modulated laser beam erasing a signal recorded on said recording layer by irradiating said recording layer with a laser beam having a predetermined power level;

reproducing a signal recorded on said recording layer by irradiating a laser beam to said recording layer and detecting a light strength of a reflection light or a transmitted light from said recording layer, wherein said barrier layer is formed between said protective layer and said recording layer and in contact with said protective layer and said recording layer, and includes one selected from the group consisting of GeXn and GeXNO, where X is at least one element selected from the group consisting of Al, B, Ba, Bi, C, Ca, Ce, Cr, Dy, Eu, Ga, Hf, Tn, K, La, Mn, Nb, Ni, Pb, Pd, Sn, Ta, Ti V, W, Yb, Zn, and Zr, and wherein the content of X to the total content of Ge and X is said barrier layer is 10 atom % to 40 atom %, and the content of N in said barrier layer is at least 40 atom %.

27. An optical information recording medium comprising a substrate and a multilayer film, the multilayer film comprising phase-change recording layer having reversibly changeable optical characteristics and a Ge-containing layer comprising one selected from the group consisting of GeXN and GeXON as a main component, and a protective layer comprising sulfur, wherein the Ge-containing layer is formed between the phase-change recording layer and the protective layer, wherein X is at least one element selected from the group consisting of elements belonging to Groups IIIa, IVa, Va, VIa, VIIa, VIII, Ib and fib and carbon, and wherein the content of X to the total content of Ge and X in said Ge-containing layer is 10 atom % to 40 atom %, and the content of N in said Ge-containing layer is at least 40 atom %.

28. The optical information recording medium according to claim 27, wherein the Ge-containing layer is in contact with at least one surface of the phase-change recording layer.

29. The optical information recording medium according to claim 28, wherein the Ge-containing layer prevents atoms from diffusing between the phase-change recording layer and a layer adjacent to the recording layer.

30. The optical information recording medium according to claim 29, the medium comprising a first Ge-containing layer and a second Ge-containing layer, the first Ge-containing layer and the second Ge-containing layer comprising either one selected from the group of GeXN and GeXON as a main component, wherein X is at least one element selected from the group consisting of elements belonging to Groups IIIa, IVa, Va, VIa, VIIa, VIII, Ib and IIb and carbon, the phase-change recording layer having a first surface on which laser beams are incident in use and a second surface on the other side, wherein the first Ge-containing layer is in contact with the first surface and the second Ge-containing layer is in contact with the second surface.

31. The optical information recording medium according to claim 30, wherein the content of X in the first Ge-containing layer is different from the content of X in the second Ge-containing layer.

32. The optical information recording medium according to claim 27, wherein a composition ratio of (GeX), O and N in the Ge-containing layer has numerical values which lie within the range represented by the area ABDC in a ternary phase diagram of (GeX), O and N, where the points A, B, C and D are as follows:

A $((GeX)_{90.0}O_{0.0}N_{10.0})$, B $((GeX)_{83.4}O_{13.3}N_{3.3})$,
C $((GeX)_{35.0}O_{0.0}N_{65.0})$, D $((GeX)_{31.1}O_{55.1}N_{13.8})$.

33. The optical information recording medium according to claim 32, wherein a composition ratio of Ge and X in the Ge-containing layer is represented by $Ge_{1-p}X_p$ ($0<p\leq0.5$).

34. The optical information recording medium according to claim 27, wherein a thickness of the Ge-containing layer is at least 1 nm.

35. The optical information recording medium according to claim 27, wherein X is at least one element selected from the group consisting of Cr, Mo and Mn.

36. The optical information recording medium according to claim 27, wherein X is at least one element selected from the group consisting of Ti, Zr, Nb and Ta.

37. The optical information recording medium according to claim 27, wherein X is at least one element selected from the group consisting of Fe, Co and Ni.

38. The optical information recording medium according to claim 27, wherein X is at least one element selected from the group consisting of Y and La.

39. The optical information recording medium according to claim 27, wherein the phase-change recording layer comprises a phase-changeable material including any one selected from the coup consisting of Te, Se and Sb as a main component.

40. The optical information recording medium according to claim 27, wherein the phase-change recording layer comprises a phase-changeable material including Te, Sb and Ge as a main component.

41. An optical information recording medium comprising a substrate and a multilayer film, the multilayer film comprising:

a barrier layer;

a first protective layer that comprises sulfur; and a recording layer generating a reversible phase-change which can be optically detected according to an irradiation of an energy beam;

wherein said barrier layer is formed between said first protective layer and said recording layer and in contact with said first protective layer and said recording layer, and includes GeXNO, where X is at least one element selected from the group consisting of Al, B, Ba, Bi, C, Ca, Ce, Cr, Dy, Lu, Ga, Hf, In, K, La, Mn, Nb, Ni, Pb, Pd, Si, Sn, Ta, Ti, V, W, Th, Zn and Zr, and wherein the content of X to the total content of Ge and X in said barrier layer is 5 atom % to 40 atom %.

42. Au optical information recording medium comprising a substrate and a multilayer film, the multilayer film comprising phase-change recording layer having reversibly changeable optical characteristics and a Ge-containing layer comprising GeXON as a main component, wherein X is at least one element selected from the group consisting of elements belonging to Groups IIIa, IVa, Va, Via, Vila, VIII, Ib and IIb and carbon, and wherein the content of X to the total content of Ge and X in said Ge-containing layer is 5 atom % to 40 atom %.

* * * * *

UNITED STATES PATENT AND TRADEMARK OFFICE
CERTIFICATE OF CORRECTION

PATENT NO. : 6,821,707 B2
DATED : November 23, 2004
INVENTOR(S) : Uno et al.

It is certified that error appears in the above-identified patent and that said Letters Patent is hereby corrected as shown below:

Column 51,
Line 8, "disposed a the" should read -- disposed at the --.
Line 56, "to claim 4," should read -- to claim 10 --.

Column 52,
Line 64, "of au energy" should read -- of an energy --.

Column 53,
Line 14, "Hf, Tn, K" should read -- Hf, In, K --.
Line 31, "Ib and fib and" should read -- Ib and IIb and --.

Column 54,
Line 48, "Dy, Lu, Ga" should read -- Dy, Eu, Ga --.
Line 49, "W, Th, Zn" should read -- W, Yb, Zn --.
Line 52, "Au optical" should read -- An optical --.
Line 59, "Va, Via, Vila" should read -- Va, Vla, Vlla --.

Signed and Sealed this

Twenty-fourth Day of January, 2006

JON W. DUDAS
*Director of the United States Patent and Trademark Office*